United States Patent [19]
Sano

[11] Patent Number: 5,842,754
[45] Date of Patent: Dec. 1, 1998

[54] TURN CONTROL APPARATUS FOR A VEHICLE

[75] Inventor: Yoshiaki Sano, Tokyo, Japan

[73] Assignee: Mitsubishi Jidosha Kogyo Kabushiki Kaisha, Tokyo, Japan

[21] Appl. No.: 776,822

[22] PCT Filed: Jun. 7, 1996

[86] PCT No.: PCT/JP96/01560

§ 371 Date: Feb. 7, 1997

§ 102(e) Date: Feb. 7, 1997

[87] PCT Pub. No.: WO96/41737

PCT Pub. Date: Dec. 27, 1996

[30] Foreign Application Priority Data

Jun. 9, 1995 [JP] Japan .................................. 7-143712

[51] Int. Cl.⁶ ................................ B60T 8/24; B60T 8/58
[52] U.S. Cl. ........................................ 303/147; 303/113.5
[58] Field of Search ............................ 303/113.5, 9.62, 303/139, 140, 146–149

[56] References Cited

U.S. PATENT DOCUMENTS

| | | | |
|---|---|---|---|
| 4,998,593 | 3/1991 | Karnopp | 303/146 |
| 5,302,010 | 4/1994 | Ehmer et al. | 303/147 |
| 5,303,989 | 4/1994 | Yasuno et al. | 303/113.5 |
| 5,455,770 | 10/1995 | Hadeler et al. | 303/147 |

*Primary Examiner*—Matthew C. Graham

[57] ABSTRACT

A vehicle turn control apparatus has an electronic control unit including a control start/end determination section (80) in which two threshold values associated with the start timing of yaw moment control in the understeer and oversteer modes respectively. The determination section (80) outputs a control beginning flag (Fymc=1) when the absolute value of required moment ($\gamma$ d) exceeds the absolute value of either threshold value. By providing such a control start condition, smooth yaw moment control can be achieved. Also, by setting the absolute value of threshold value in the oversteer mode at a value smaller than the absolute value of threshold value in the understeer mode, the yaw moment control in the oversteer mode is started at early timing. A restoration moment is quickly produced on the vehicle in the oversteer mode, thereby preventing spinning of the vehicle.

8 Claims, 37 Drawing Sheets

TURN CONTROL APPARATUS FOR A VEHICLE

TECHNICAL FIELD

The present invention relates to a turn control apparatus for a vehicle, and more specifically, to an apparatus for controlling yawing of a vehicle.

BACKGROUND ART

Yaw rate sensors for detecting yaw rates that indicate the degree of yawing of objects go into actual use and are used in operation control for vehicles. For example, in the brake force control apparatus disclosed in Jpn. Pat. Appln. KOKAI Publication No. 5-105048, when a vehicle is judged to be in the oversteer mode in accordance with an actual yaw rate detected by a yaw rate sensor and a target yaw rate computed based on a steering angle and vehicle speed, the braking forces for the right and left front wheels are controlled to produce a restoration moment on the vehicle, and when judged to be in the understeer mode, the braking forces for the right and left rear wheels are controlled to produce a turning moment, whereby the vehicle turn is controlled.

For the vehicle turn control apparatus of this type, generally, whichever the vehicle is in the oversteer mode or the understeer mode, the turn control is started after a given time has elapsed from the point of time when yawing begins to be detected by a yaw rate sensor.

However, in the case where the turn control is started at a given timing regardless of whether the vehicle is in the oversteer mode or the understeer mode, when the degree of oversteer is great, there is a possibility of the occurrence of spinning of the vehicle before a required restoration moment is produced on the vehicle by the execution of turn control. In this case, it is difficult to recover the vehicle posture by the execution of turn control.

In the apparatus disclosed in Jpn. Pat. Appln. KOKAI Publication No. 5-105048, the turn control is started as soon as a deviation between the actual yaw rate and the target yaw rate occurs. In this case, the yaw control sometimes cannot be carried out smoothly.

DISCLOSURE OF THE INVENTION

An object of the present invention is to provide a turn control apparatus for a vehicle, which can quickly prevent spinning of a vehicle in the oversteer mode and achieve smooth yaw control.

To achieve the above object, according to the present invention, there is provided a turn control apparatus for a vehicle, which includes a control unit for selectively carrying out yaw acceleration control where a braking force difference to generate a turning moment on the vehicle is produced between target wheels to be controlled and yaw inhibition control where a braking force difference to generate a restoration moment on the vehicle is produced between the target wheels to be controlled, in accordance with a state variable representing at least one of the vehicle operating state and the vehicle behavior. This apparatus comprises timing means for setting the start timing of the yaw inhibition control and the start timing of the yaw acceleration control. The start timing of the yaw inhibition control is set so as to be earlier than the start timing of the yaw acceleration control.

The advantage of the present invention is that when a brake force difference for accelerating or inhibiting yawing of the vehicle is produced between the wheels, the yaw inhibition control can be started at earlier timing than the yaw acceleration control. When the vehicle is oversteer-prone, therefore, the required restoration moment can quickly be produced on the vehicle, thereby preventing spinning of the vehicle. Also, since the yaw control is started at the required timing, the yaw control is not started suddenly, so that smooth yaw control can be achieved.

In the present invention, preferably, the control unit includes required control value calculating means for deriving a required control value associated with the yaw inhibition control and the yaw acceleration control in accordance with the state variable. The timing means sets a discrimination value associated with the start timing of the yaw inhibition control at a first predetermined value, and sets a discrimination value associated with the start timing of the yaw acceleration control at a second predetermined value which is larger than the first predetermined value. The turn control apparatus further includes brake force difference producing means for producing a brake force difference between the target wheels to be controlled in accordance with the required control value under the control of the control unit when the required control value exceeds either one of the discrimination values respectively associated with the yaw acceleration control and the yaw inhibition control.

According to this preferred mode, by merely setting the discrimination values (the first and second predetermined values) associated with the yaw inhibition control and the yaw acceleration control respectively, the start timing for the yaw inhibition control and yaw acceleration control can be set easily and accurately.

Preferably, the turn control apparatus further includes yaw rate detection means for detecting an actual yaw rate for the vehicle. The required control value calculating means derives the required control value based on the actual yaw rate detected by the yaw rate detection means. More preferably, the control unit further includes target yaw rate computing means for computing a target yaw rate for the vehicle. The required control value calculating means derives the required control value in accordance with a yaw rate deviation between the actual yaw rate and the target yaw rate or a time derivative of the yaw rate deviation. According to these preferred modes, the required control value can be derived accurately in accordance with the actual yaw rate, and preferably the yaw rate deviation or time derivative thereof, so that the required braking force difference can be produced surely between the target wheels to be controlled.

In the present invention, preferably, the control unit selects only an outside front wheel and inside rear wheel in a turn as the target wheels to be controlled when the vehicle is braked while turning. The braking force difference producing means increases the braking force of one of these wheels and decreases the braking force of the other wheel. According to this preferred mode, the required turning moment or restoration moment can be produced effectively on the vehicle when the vehicle is braked while turning whereby satisfactory turn control can be carried out.

BEST MODE FOR CARRYING OUT THE INVENTION

The following is a description of a brake system furnished with a vehicle turn control apparatus according to one embodiment of the present invention.

Figure 1:
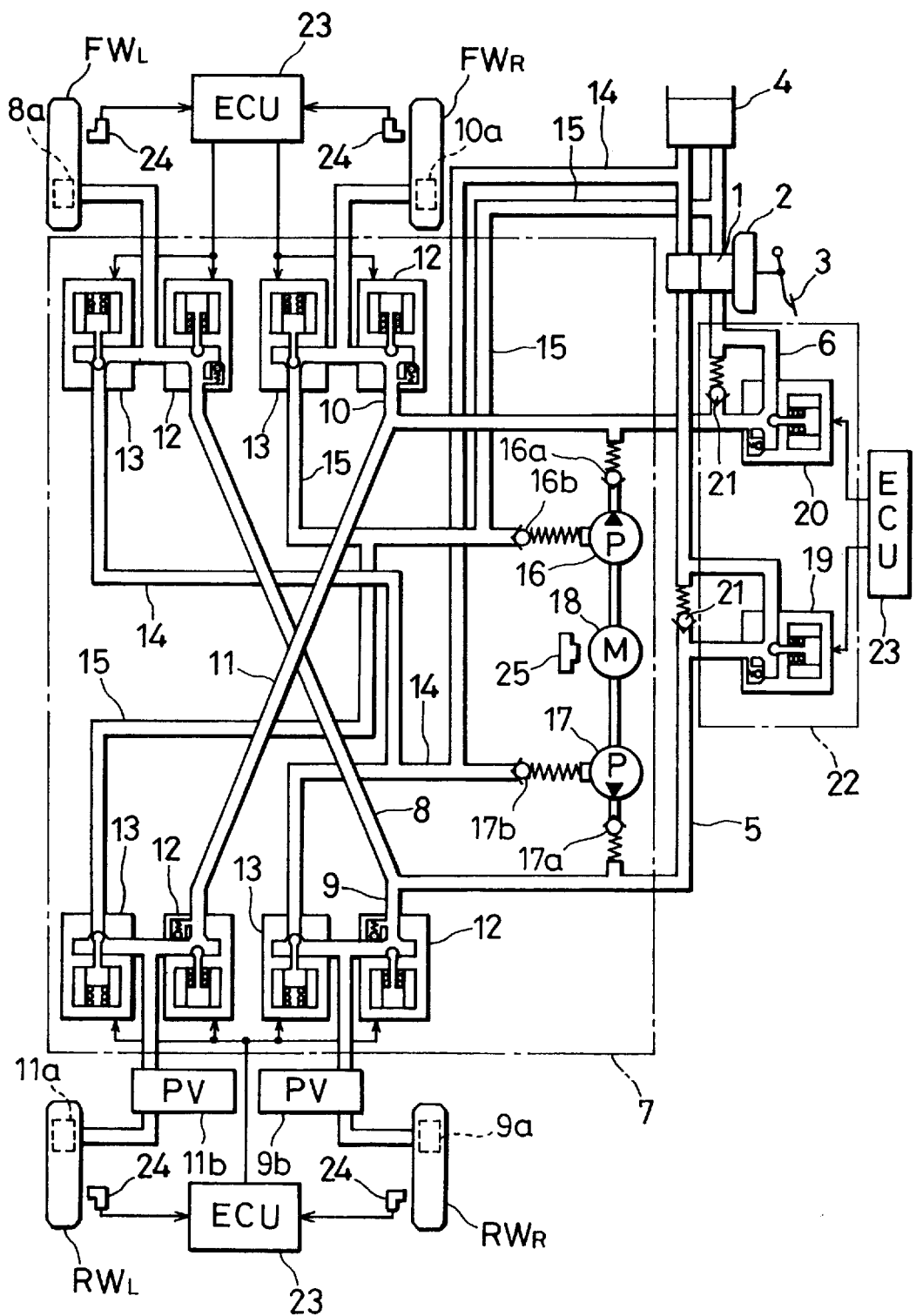
FIG. 1 is a schematic view showing a brake system provided with a turn control apparatus according to one embodiment of the present invention.

Referring to FIG. 1, the brake system comprises a tandem master cylinder 1, which is connected to a brake pedal 3 through a vacuum brake booster 2. A pair of pressure chambers of the master cylinder 1 are connected to a reservoir 4 individually on one side, and to main brake lines 5 and 6, individually, on the other side. The lines 5 and 6 extend in a hydraulic unit (HU) 7, and branch into a pair of branch brake lines each.

Brake lines 8 and 9, which diverge from the main brake line 5, are connected to wheel brakes 8a and 9a for front-left and rear-right wheels $FW_L$ and $RW_R$, respectively. On the other hand, brake lines 10 and 11, which diverge from the main brake line 6, are connected to wheel brakes 10a and 11a for front-right and rear-left wheels $FW_R$ and $RW_L$, respectively. Thus, the wheel brakes 8a to 11a for the four wheels are connected to the tandem master cylinder 1 in a cross-piping form.

A solenoid valve is inserted in each of the branch brake lines 8, 9, 10 and 11. Each solenoid valve is composed of an inlet valve 12 and an outlet valve 13. Each of the outlet valves 13 attached to the branch brake lines 8, 9, 10 and 11 is connected to the reservoir 4 by means of a return line 14 or 15. Thus, the brake pressure for each wheel can be controlled by opening or closing the inlet and outlet valves to supply or discharge the hydraulic pressure to or from each wheel brake. Numerals 9b and 11b denote proportional valves, which are interposed between the rear-left and rear-right wheel brakes 9a and 11a and the solenoid valves corresponding thereto in order to distribute properly a braking force, which is generated by brake pedal operation, between the front and rear wheels.

The following is a description of the vehicle turn control apparatus used in the brake system.

Part of the turn control apparatus is composed of some components (e.g., brake lines 5 to 11, wheel brakes 8a to 11a, inlet valves 12, and outlet valves 13) of the brake system. The turn control apparatus further includes pumps 16 and 17. The respective discharge ports of the pumps 16 and 17 communicate with the intermediate portions of their corresponding main brake lines 6 and 5 through check valves 16a and 17a, respectively, while the intake ports of the pumps 16 and 17 are connected to the return lines 15 and 14 through check valves 16b and 17b, respectively. Also, the pumps 16 and 17 are operatively coupled to a common motor 18.

Further, cutoff valves 19 and 20, formed of solenoid valves, are inserted in the main brake lines 5 and 6, respectively, on the upstream side of the junctions between the line 5 and the pump 17 and between the line 6 and the pump 16. The cutoff valves 19 and 20 constitute a cutoff valve unit (CVU) 22. Moreover, the main brake lines 5 and 6 include bypass lines that bypass the cutoff valves 19 and 20, respectively, and are provided with a relief valve 21 each.

The turn control apparatus is provided with an electronic control unit (ECU) 23, which comprises a microprocessor, memories, such as RAM and ROM, input and output interfaces, etc. The output interface of the ECU 23 is connected with the aforesaid inlet and outlet valves 12 and 13, cutoff valves 19 and 20, and motor 18. The input interface of the ECU 23 is connected electrically with wheel velocity sensors 24, which are attached individually to the wheels, and a rotational speed sensor 25 for detecting the rotational speed of the motor 18. For ease of illustration in FIG. 1, the connections between the motor 18 and the ECU 23 and between the rotational speed sensor 25 and the ECU 23 are omitted.

Figure 2:
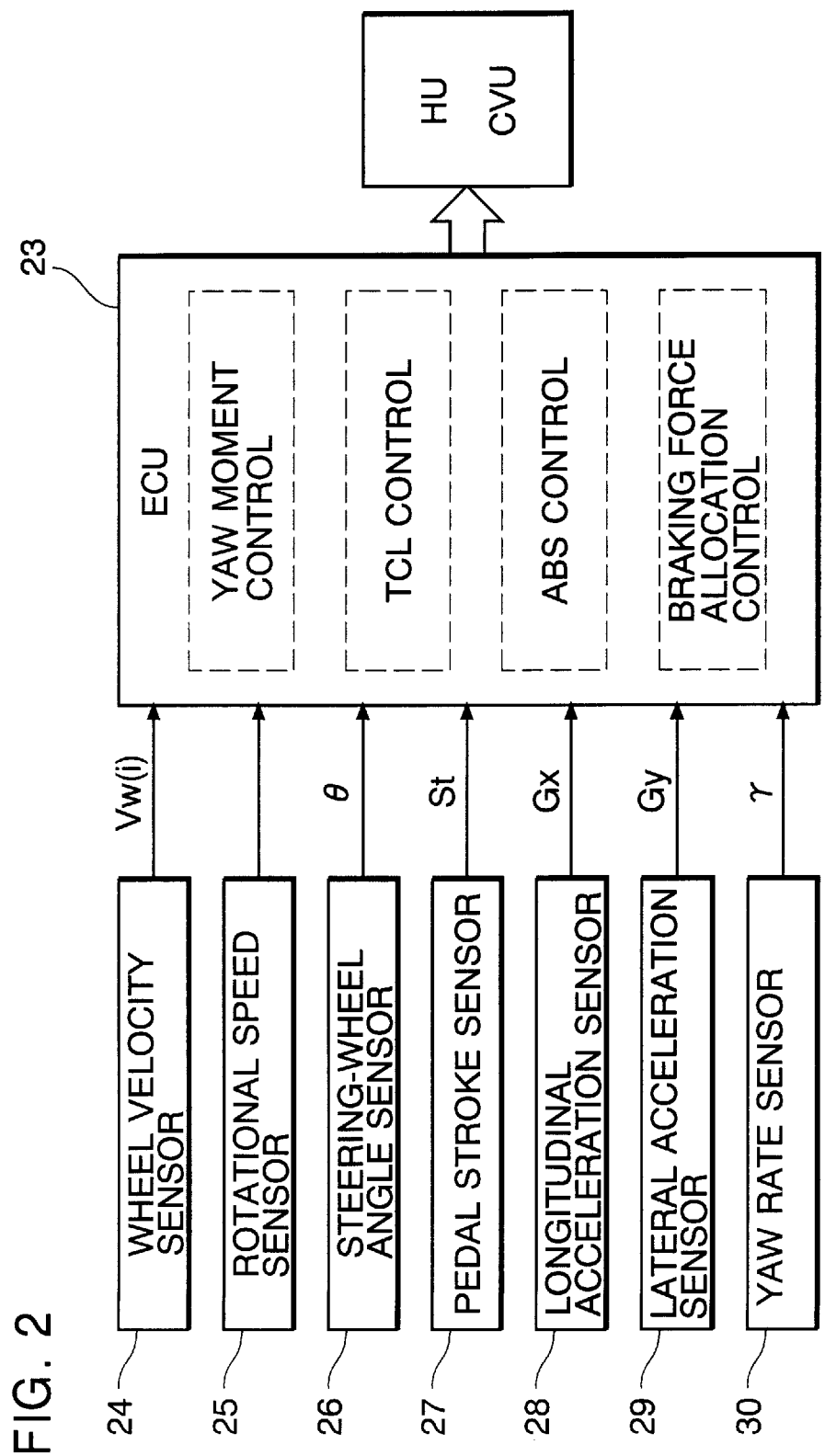
FIG. 2 is a block diagram showing the way an electronic control unit (ECU) shown in FIG. 1 is connected with various sensors and a hydraulic unit (HU)

As shown in FIG. 2, moreover, the input interface of the ECU 23 is connected electrically with a steering-wheel angle sensor 26, pedal stroke sensor 27, longitudinal acceleration sensor 28, lateral acceleration sensor 29, and yaw rate sensor (yaw rate detecting means) 30, as well as the wheel velocity sensor 24 and the rotational speed sensor 25.

The steering-wheel angle sensor 26 detects the steerage of a steering-wheel angle of a vehicle, that is, steering-wheel angle, while the pedal stroke sensor 27 detects the depth of depression of the brake pedal 3, that is, pedal stroke. The longitudinal and lateral acceleration sensors 28 and 29 detect longitudinal and lateral accelerations that act in the longitudinal and lateral directions of the vehicle, respectively. The yaw rate sensor 30 detects the vehicle yaw angular velocity around a vertical axis that passes through the center of gravity of the vehicle.

Based on sensor signals from the aforementioned various sensors, the ECU 23 controls the operations of the HU 7 and the CVU 22, thereby effecting various vehicle motion control operations. As shown in the block for the ECU 23 in FIG. 2, the vehicle motion control operations include traction control (TCL), anti-skid brake (ABS) control, braking force allocation control, and yaw moment control (yaw control) that is carried out while the vehicle is turning.

Figure 3:
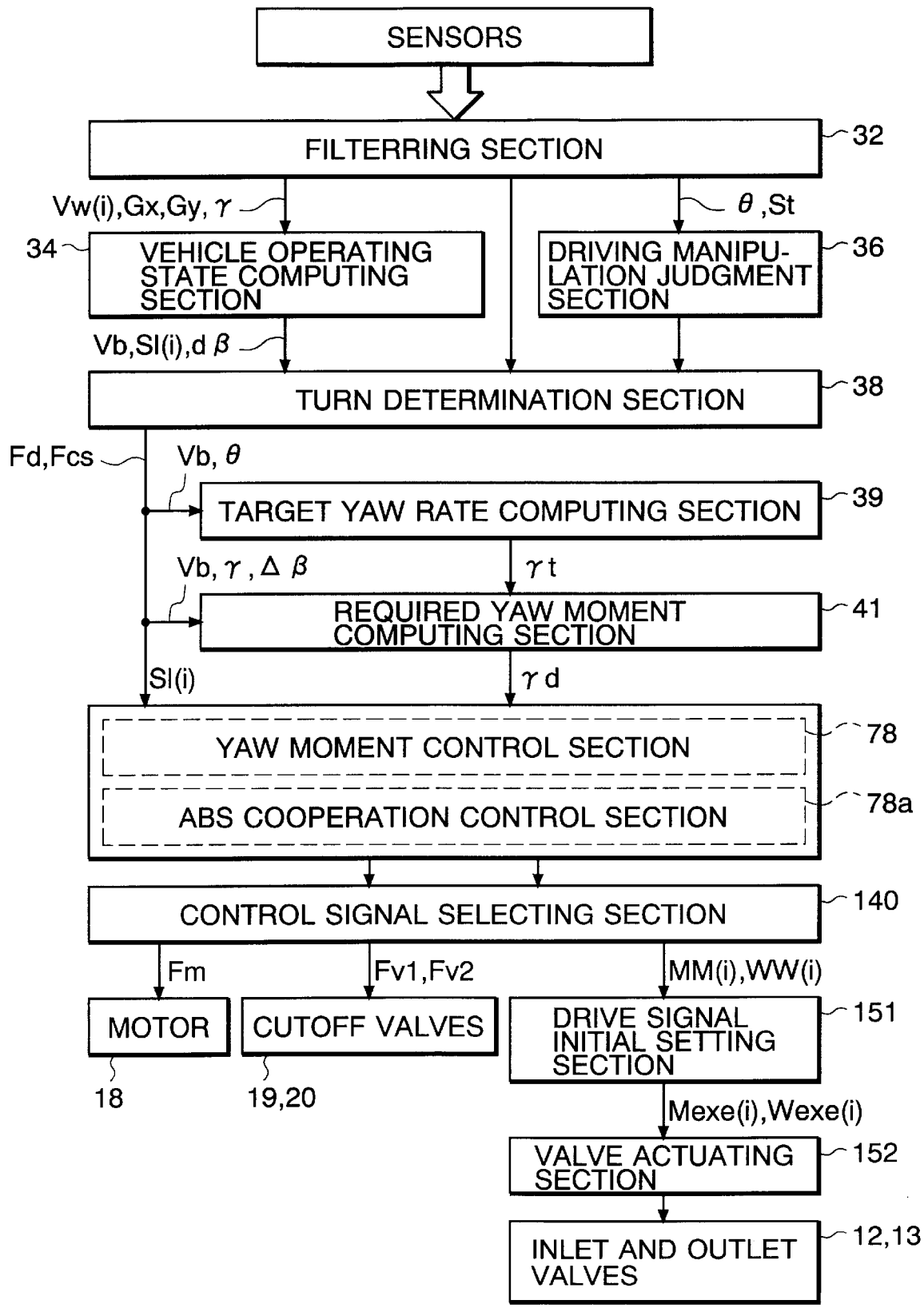
FIG. 3 is a functional block diagram schematically showing the function of the ECU.
Figure 4:
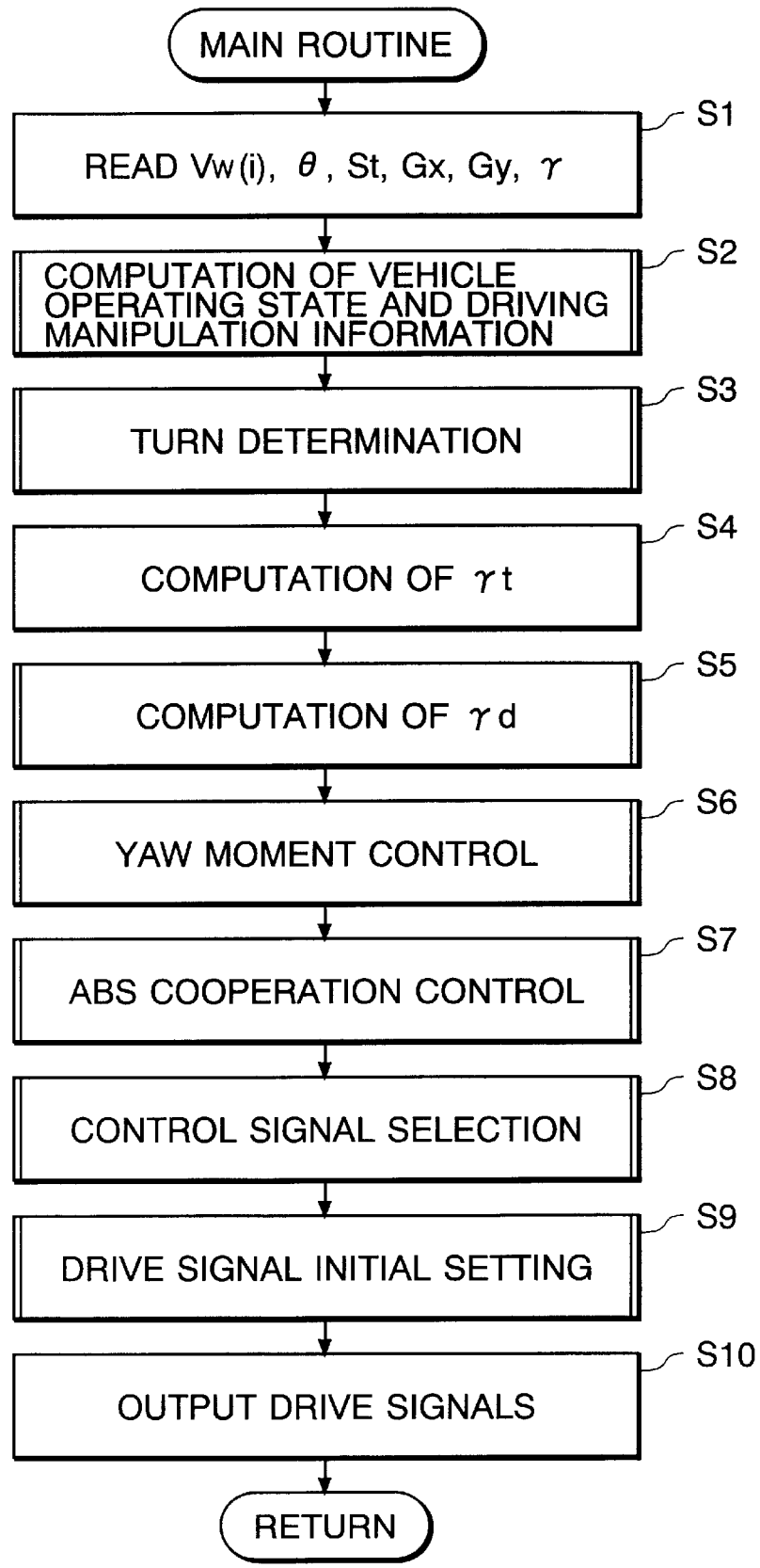
FIG. 4 is a flowchart showing a main routine the ECU executes.

Functionally, the ECU 23 includes various operating sections associated with the yaw moment control, as shown in FIG. 3, and executes a main routine shown in FIG. 4.

More specifically, the ECU 23 comprises a filtering section 32, computing section 34, judgment section 36, and determination section 38. The filtering section 32 receives sensor signals, indicative of wheel velocities Vw(i), longitudinal acceleration Gx, lateral acceleration Gy, yaw rate r, steering-wheel angle θ, and pedal stroke St, from the aforesaid various sensors, and subjects these sensor signals to filtering processes. The computing section 34 computes a vehicle operating state (vehicle body velocity Vb, slip factor Sl(i), and slip angular velocity dβ at the gravity-center of vehicle) in accordance with the filtered sensor signals Vw(i), Gx, Gy, and γ. The judgment section 36 judges driving manipulations by the driver (e.g., driver's manipulations on the steering wheel, brake pedal, etc.) or vehicle behavior based on the filtered sensor signals θ and St. The determination section 38 makes determinations on the vehicle turn direction and countersteer in accordance with the vehicle operating state and the driving manipulation state (vehicle behavior).

Also, the ECU 23 comprises target yaw rate computing sections 39 and 41, a yaw moment control section 78, and an ABS cooperation control section 78a. The computing section (target yaw rate computing means) 39 computes a target yaw rate γt for the vehicle in accordance with the steering-wheel angle θ and vehicle body velocity Vb. The computing section (required control value calculating means) 41 computes a required yaw moment (required control value) γd in accordance with the target yaw rate γt and actual yaw rate γ. The yaw moment control section 78 delivers a yaw moment control signal in accordance with the required yaw moment γd, while the ABS cooperation control section 78a delivers a cooperation control signal for executing yaw moment control in cooperation with the ABS control when the vehicle turns during the ABS control.

Further, the ECU 23 comprises a control signal selecting section 140 for delivering a control signal obtained in response to the yaw moment control signal from the control section 78 and the cooperation control signal from the control section 78a, a drive signal initial setting section 151, and a valve actuating section 152. The elements 151 and 152, in cooperation with the selecting section 140, actuate the inlet and outlet valves 12 and 13, cutoff valves 19 and 20, and motor 18.

As described later, in the yaw moment control, the yaw inhibition control (yaw moment control at the time of oversteering) and the yaw acceleration control (yaw moment control at the time of understeering) are carried out selectively in accordance with the state variable representing at least one of the vehicle operating state and the vehicle behavior. When the yaw inhibition control is carried out, a braking force difference such as to generate a restoration moment on the vehicle is produced between the target wheels to be controlled. When the yaw acceleration control is carried out, a braking force difference such as to generate a turning moment on the vehicle is produced between the target wheels to be controlled.

During the execution of yaw moment control, the brake lines 5 to 11, wheel brakes 8a to 11a, inlet valves 12, outlet valves 13, pumps 16 and 17, and motor 18 function as braking force difference producing means for producing a braking force difference between the target wheels to be controlled in accordance with the required control value (required moment γd) under the control of the ECU 23 (more specifically, the control sections 78 and 78a, control signal selecting section 140, drive signal initial setting section 151, and valve actuating section 152).

Figure 15:
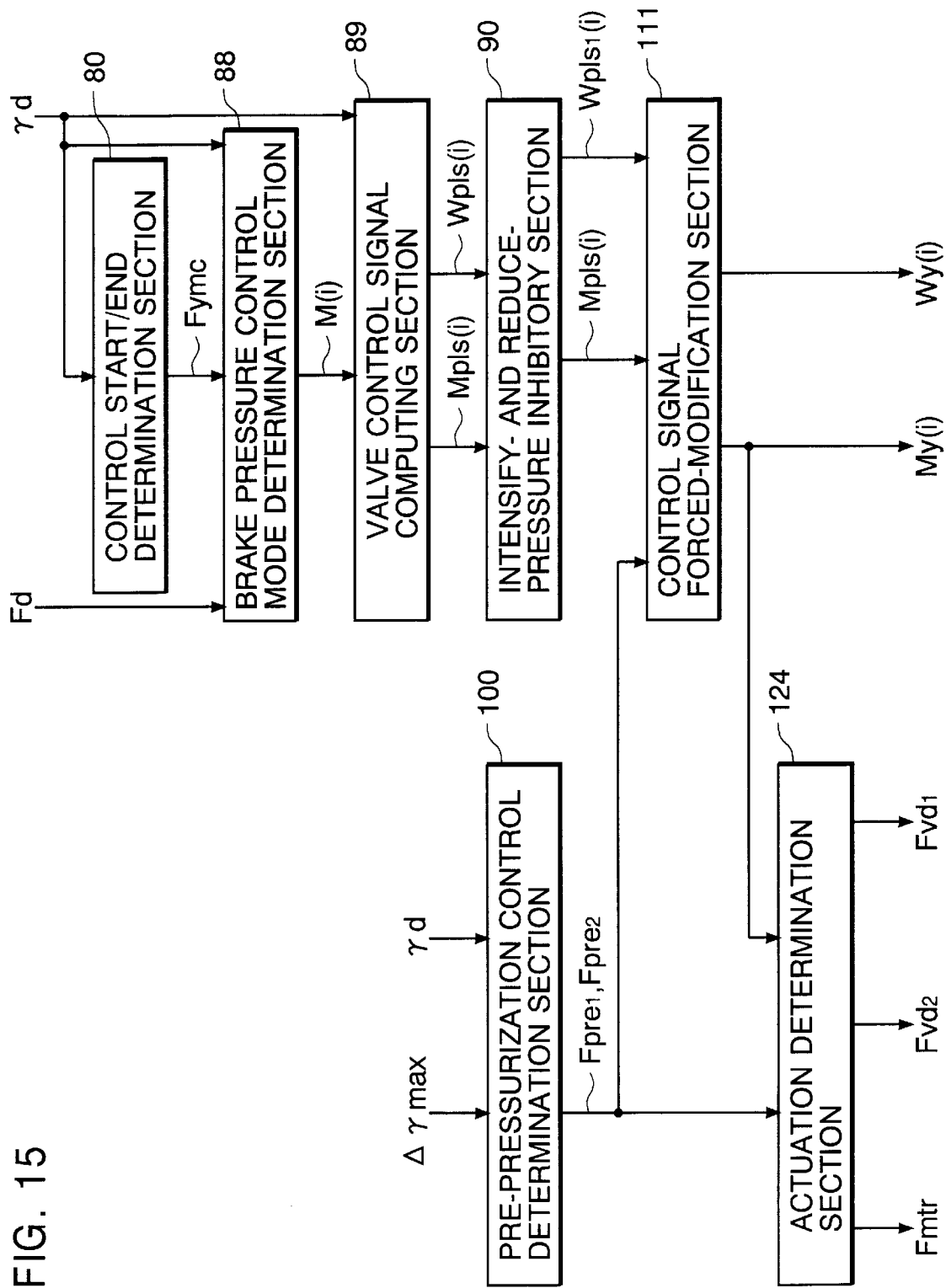
FIG. 15 is a block diagram showing the details of a yaw moment control section shown in FIG. 3.
Figure 16:
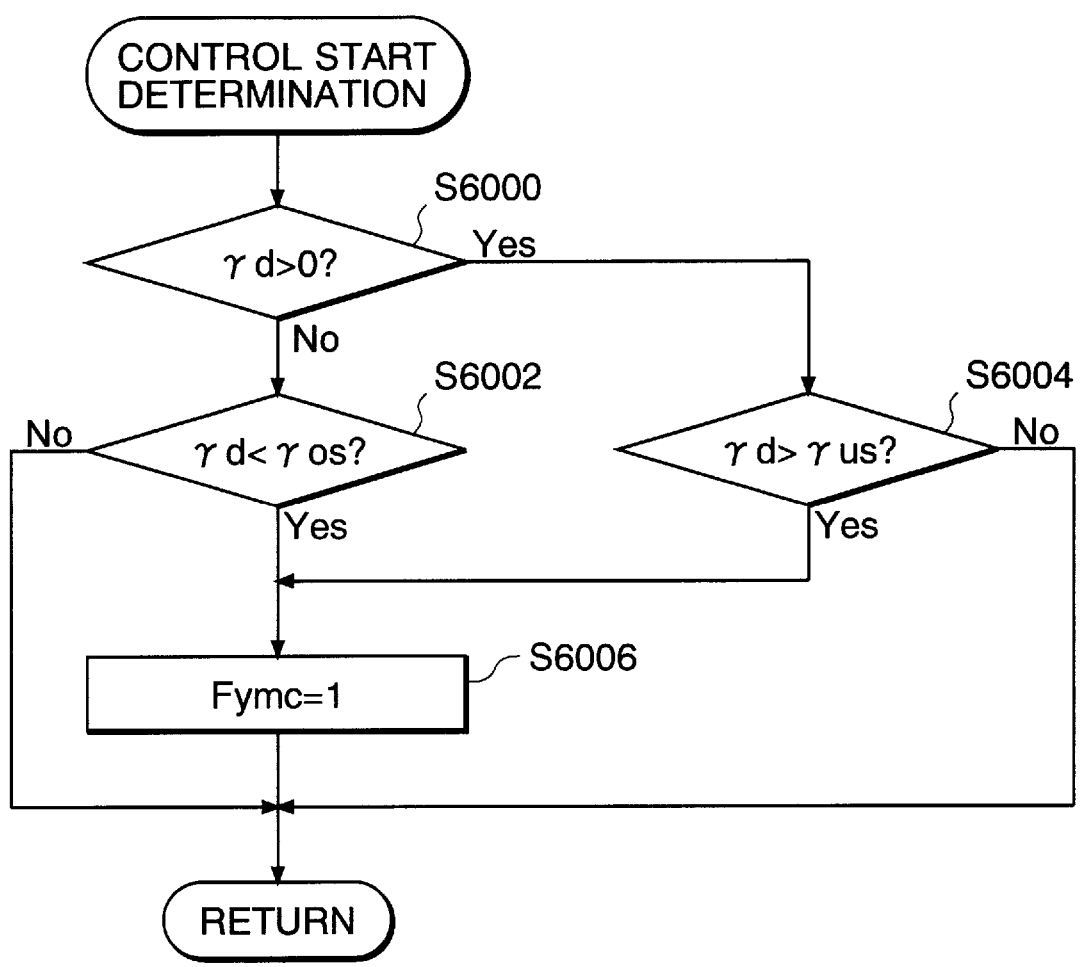
FIG. 16 is a flowchart showing a control start determination routine executed in the control start/end determination section in FIG. 15.

The yaw moment control section 78 has timing means (the control start/end determination section 80 shown in FIG. 15) for setting the start timing of yaw acceleration control and the start timing of yaw inhibition control. The determination section 80 outputs a control beginning flag Fymc=1 when the absolute value of the required moment γd exceeds the absolute value of threshold value γ os or γ us (FIG. 16). In response to this, the yaw moment control is started. As described later, the absolute value of the discrimination value γ os associated with the yaw inhibition control is set to be smaller than the absolute value of the discrimination value γ us associated with the yaw acceleration control, so that the yaw inhibition control start timing is set to be earlier than the yaw acceleration control start timing.

The yaw moment control function of the ECU 23 will now be described in detail.

Main Routine for Yaw Moment Control

The ECU 23 carries out yaw moment control (turn control) by executing the main routine of FIG. 4 at intervals of a control period T of, for example, 8 msec.

Filtering of Sensor Signals

In the main routine, the aforesaid various sensor signals are read by the filtering section 32 of the ECU 23 in Step S1. In Step S2, the various sensor signals are subject to filtering (e.g., a recursion type first-order low-pass filtering) in the filtering section 32.

A recursion type first-order low-pass filtering is also used in the filtering processes mentioned later, unless otherwise specified.

Computation of Vehicle Operating State Signals

Among the filtered sensor signals, the signals indicative of the wheel velocities Vw(i), longitudinal acceleration Gx, lateral acceleration Gy, and yaw rate γ are supplied to the computing section 34. Symbol Vw(i) is used to designate the respective wheel velocities Vw of the four wheels collectively. Character i suffixed to symbol Vw may be any of integers 1, 2, 3 and 4, and suffixes 1, 2, 3 and 4 correspond to the front-left wheel $FW_L$, front-right wheel $FW_R$, rear-left wheel $RW_L$, and rear-right wheel $RW_R$, respectively. In the description to follow, character i suffixed to reference symbols will be used in the same sense.

Based on the filtered signals Vw(i), Gx, Gy, and γ, the computing section 34 successively computes some pieces of information indicative of the vehicle operating states, such as the vehicle body velocity Vb, slip factor Sl(i), and gravity-center slip angular velocity dβ (gravity-center slip angle βg).

Computation of Vehicle Body Velocity Vb

First, the computing section 34 selects a reference wheel velocity Vs among the wheel velocities Vw(i). Preferably, the velocity of the wheel that is not susceptible to a slip is set as the reference wheel velocity Vs. More specifically, a faster one of the velocities Vw of driven wheels is selected as the reference wheel velocity Vs when the vehicle is not braked, and the fastest one Vw of the velocities Vw(i) of the wheels when the vehicle is braked. Whether the vehicle is braked or not is determined based on the value of a brake flag Fb (mentioned later), which is set in response to the depressing operation of the brake pedal 3.

Then, the computing section 34 computes the gravity-center velocity (vehicle body velocity at the center of gravity) Vcg of the vehicle in accordance with the reference wheel velocity Vs. When the vehicle is turning, the gravity-center velocity Vcg is computed in consideration of the difference (inside-outside wheel velocity difference) ΔVif between the respective velocities of the inside and outside wheels in a turn on the front-wheel side, inside-outside wheel velocity difference ΔVir on the rear-wheel side, and a ratio between the front wheel velocity and rear wheel velocity (velocity ratio between front and rear wheels) Rv. More simply, the gravity-center velocity is regarded as substantially equal to an intermediate value between the velocity at the front-axle and that at the rear-axle. In stead of using the inside-outside wheel velocity difference ΔVif on the front-wheel side (or the inside-outside wheel velocity difference ΔVir on the rear-wheel side), moreover, ½ of an average inside-outside wheel velocity difference ΔVia, which is an average of the differences 66 Vif and ΔVir, may be used.

In the case of a front-engine front-drive (FF) car, the reference wheel velocity Vs (velocity of outside rear wheel) is corrected by means of ½ of the average inside-outside wheel velocity difference ΔVia, and is further corrected by means of the reciprocal of the front-rear wheel velocity ratio Rv, which is indicative of the difference between velocities at the rear axle position and gravity-center position. By doing this, the gravity-center velocity Vcg of the vehicle turning without being braked can be obtained (Refer to the following equation where Vcg0 is the gravity-center velocity obtained before the filtering process (mentioned later)).

$$Vcg0=(Vs-\Delta Via/2)\times\{1+(1/Rv)\}/2.$$

On the other hand, the gravity-center velocity Vcg0 of the FF vehicle turning with the brakes on is computed as follows by making correction to the reference wheel velocity Vs (velocity of outside front wheel) by means of ½ of the average inside-outside wheel velocity difference ΔVia and correction thereto by means of the difference between velocities at the front axle position and gravity-center position:

$$Vcg0=(Vs-\Delta Via/2)\times(1+Rv)/2.$$

Whether the vehicle is braked or not is determined based on the brake flag Fb.

In connection with the computation of the gravity-center velocity Vcg0, the inside-outside wheel velocity difference ΔVif between the front wheels, the inside-outside wheel velocity difference ΔVir between the rear wheels, and the average inside-outside wheel velocity difference ΔVia are expressed by the following equations where r, Tf and Tr are the yaw rate, front tread, and rear tread, respectively:

$$\Delta Vif=\gamma\times Tf,$$

$$\Delta Vir=\gamma\times Tr,$$

$$\Delta Via=\gamma\times(Tf+Tr)/2.$$

If the center of turn of the vehicle is on an extension of the rear axle and when the vehicle is turning clockwise, front-rear wheel velocity ratios Rvr and Rvl on the right- and left-wheel sides are expressed by the following equations where δ is the front-wheel steering angle (obtainable by dividing the steering wheel angle by the steering gear ratio):

$$Rvr=\cos(\delta),$$

$$Rvl=\cos(\delta).$$

As is evident from the above equations, the front-rear wheel velocity ratio Rv can be given by cos(δ) irrespective of whether the wheels concerned are on the right side or the left side.

However, the above equations hold true only when the vehicle is running at low velocity (more accurately, when the lateral acceleration Gy is small). Accordingly, the correction of the gravity-center velocity Vcg by means of the front-rear wheel velocity ratio Rv is carried out only when the vehicle is running at low velocity. Thus, the wheel velocity ratio Rv is set at the value cos(δ) if a vehicle body velocity Vbm which is computed in the manner mentioned later in the preceding cycle of the main routine is lower than a discrimination value (e.g., 30 km/h), and at 1 if the vehicle body velocity Vbm is not lower than the discrimination value.

As described above, the gravity-center velocity Vcg0 is computed in accordance with the reference wheel velocity Vs, yaw rate γ, steering wheel angle θ, and the other known values Tf and Tr. Subsequently, a filtered gravity-center velocity Vcg is obtained by continuously filtering the gravity-center velocity Vcg0 twice (fc=6 Hz), as shown in the following equation:

$$Vcg=LPF\ (LPF\ (Vcg0)).$$

Since the gravity-center velocity Vcg is normally equal to the vehicle body velocity Vb, the gravity-center velocity Vcg is set as the vehicle body velocity Vb as follow:

$$Vb=Vcg.$$

In a situation such that the ABS control is started for the selected wheel that rotates at the reference wheel velocity Vs and tends to lock, however, the reference wheel velocity Vs is substantially reduced owing to a slip of the selected wheel, and does not represent the actual vehicle body velocity any longer. Therefore, in the case where the vehicle is driven in this decelerate condition so that a requirement (separation condition) that the vehicle body velocity Vb should be obtained independently of the gravity-center velocity Vcg is fulfilled, i.e., for example, if a gravity-center velocity changing rate dVcg/dt continues to be not higher than a separation discrimination value Gxs for a predetermined period of time (e.g., 50 msec) or if the velocity changing rate dVcg/dt is not higher than a discrimination value (e.g., -1.4 g), then the vehicle body velocity Vb is estimated from the following equation:

$$Vb=Vbm-\Delta G,$$

where ΔG is the gradient of decrease of the vehicle body velocity from the vehicle body velocity Vbm obtained in the control cycle immediately before the establishment of the separation condition.

The gradient ΔG and the separation discrimination value Gxs are computed according to the following equations:

$$\Delta G=(|Gx|+0.15),$$

$$Gxs=-(|Gx|+0.2),$$

provided that $-1.2\ g\leq\Delta G\leq-0.3\ g$ and $-1.4\ g\leq Gxs\leq-0.35\ g$ are given.

If the gravity-center velocity Vcg exceeds the vehicle body velocity Vbm before the establishment of the separation condition while the yaw moment control is being executed using the estimated vehicle body velocity Vb, a separation termination condition is established. In this case, just as before the establishment of the separation condition, the gravity-center velocity Vcg is set as the vehicle body velocity Vb.

Computation of Slip Factor Sl(i)

A reference wheel position velocity Vr(i) for each wheel is computed according to the following equation by making correction to the computed or estimated vehicle body velocity Vb by means of the average inside-outside wheel velocity difference ΔVia and the front-rear wheel velocity ratio Rv:

$$Vr(i)=Vb\times 2/(1+Rv)+(or-)\ Via/2.$$

The above equation includes the arithmetic symbol that connects the first term thereof associated with the vehicle body velocity Vb and the velocity ratio Rv and the second term thereof associated with the average inside-outside wheel velocity difference ΔVia. In case that the vehicle turns clockwise, the sign of the arithmetic symbol is positive (+) at the reference wheel position velocity corresponding to the outside front or rear wheel, so that the first and second terms are added together. The sign of the arithmetic symbol is negative (-) at the reference wheel position velocity corresponding to the inside front or rear wheel, so that the second term is subtracted from the first term. In case that the vehicle turns counterclockwise or makes a left-hand turn, the sign of the arithmetic symbol is the reverse of that of the clockwise vehicle turning.

Subsequently, an unfiltered slip factor Sl0(i) is obtained for each wheel from the reference wheel position velocity Vr(i) and the wheel velocities Vw(i) according to the following equation, and is then filtered (fc=10 Hz) to obtain the factor Sl(i):

$$Sl0(i)=(Vr(i)-Vw(i))/Vr(i),$$

$$Sl(i)=LPF(Sl0(i)).$$

Computation of Gravity-Center Slip angular velocity dβ

If the angular velocity around the center of turn of the vehicle (velocity of vehicle revolution) is ω, the relation between the gravity-center slip angular velocity dβ and the yaw rate γ is expressed by the following equation:

$$\gamma=d\beta(=\beta g)+\omega.$$

If the gravity-center slip angle βg is small, the following equations where V is the vehicle velocity are satisfied:

$$Gy=V\times C,$$

$$Vb=V\times\cos(g)=V.$$

Eliminating ω and V from the above three equations, an unfiltered gravity-center slip angular velocity dβ0 is obtained from the following equation:

$$d\beta=\omega-Gy/Vb.$$

Then, the gravity-center slip angular velocity dβ is obtained by filtering (fc=2 Hz) the slip angular velocity dβ0, as shown in the following equation:

$$d\beta=LPF(d\beta0).$$

In order to make the sign of the gravity-center slip angular velocity dβ positive on the understeer (US) side and negative on the oversteer (OS) side, irrespective of the vehicle turn direction, the computed slip angular velocity dβ is multiplied by -1 to be inverted in sign when the vehicle turns clockwise.

When the vehicle runs at low velocity, e.g., when a condition such that Vb<10 km/h is met, the computation of the gravity-center slip angular velocity dβ is inhibited to prevent overflowing of computations. In this case, the slip angular velocity dβ is regarded as zero.

Judgment of Driving Manipulations

In Step S2 shown in FIG. 4, the judgment section 36 of FIG. 3 computes several pieces of information for the judgment of the driver's manipulations (e.g., driver's manipulations on the steering wheel, brake pedal, etc.) in the following manner, in accordance with the filtered steering wheel angle θ and the filtered pedal stroke St supplied from the filtering section 32.

Computation of Steering Wheel Angular Velocity θa

Figure 5:
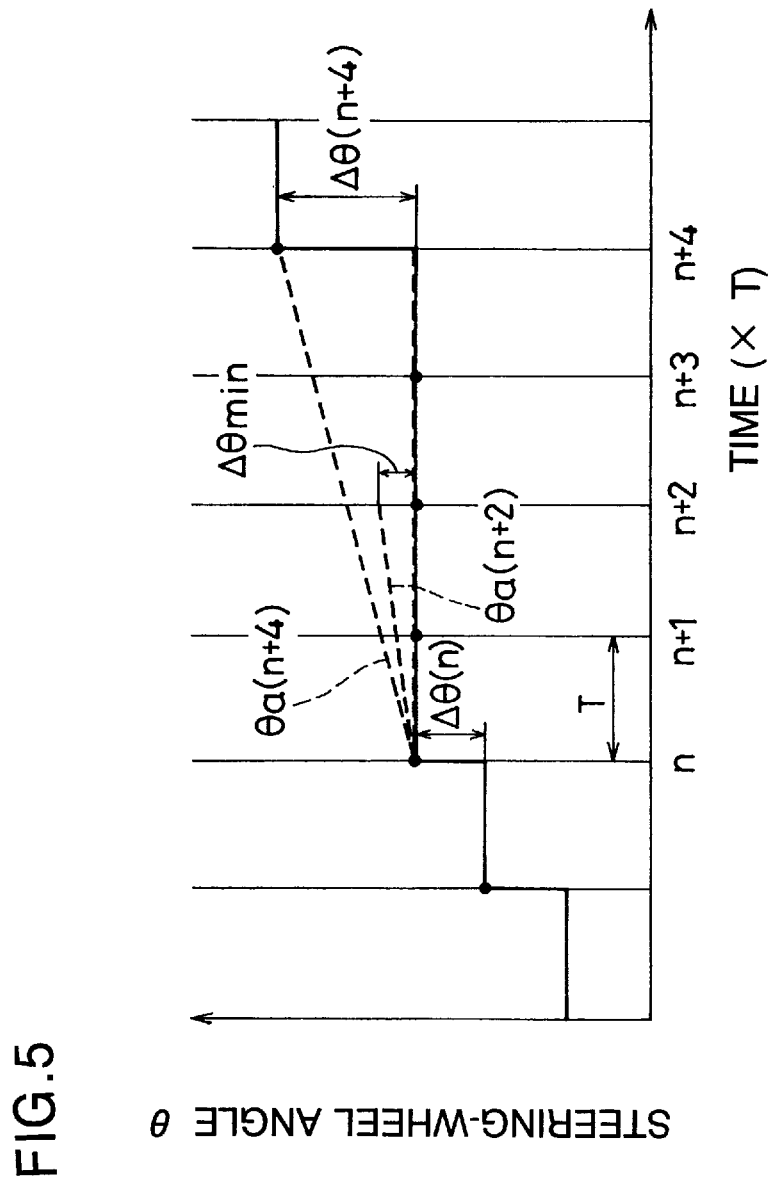
FIG. 5 is a graph showing the time-dependent change of a steering-wheel angle θ caused when a steering wheel is manipulated.

A steering wheel angular velocity θa can be obtained by dividing the amount of change in the steering wheel angle θ by the time required for the change. If the steering wheel angle θ is changed by Δθ(n+4) during the period between times n and n+4, as shown in FIG. 5, for example, a steering wheel angular velocity θa0(n+4) at time n+4 is calculated in accordance with the following equation where T is the control period for the aforementioned main routine:

$$\theta a0(n+4)=\Delta\theta(n+4)/(4\times T).$$

When the steering wheel angle θ is not changed, the steering wheel angular velocity θa is computed on the assumption that the angle θ is changed by a minimum variation Δθmin in the same direction for its last change. The steering wheel angular velocity θa is obtained by dividing the minimum variation Δθmin by a period of time for which the steering wheel angular velocity is computed. For example, a steering wheel angular velocity θa0(n+2) for the period between times n and n+2 is computed in accordance with the following equation:

$$\theta a0(n+2)=\Delta\theta min/(2\times T).$$

Then, the steering wheel angular velocity θa0 is filtered (fc=2 Hz), whereupon the filtered steering wheel angular velocity θa is obtained (refer to the following equation):

$$\theta a=LPF(\theta a0)$$

Computation of Effective Steering Wheel Angular Velocity Value θae

An effective steering wheel angular velocity θae is obtained by filtering the absolute value of the steering wheel angular velocity θa, as shown in the following equation:

$$\theta ae=LPF(|\theta a|).$$

The cutoff frequency fc for this filtering process is changed depending on the changing direction of the steering wheel angle θa. For example, the cutoff frequency fc is set at 20 Hz in the direction for the increase of the steering wheel angle θa and at 0.32 Hz in the direction for the decrease of the angle θa.

Computation of Pedal Stroke Velocity Vst

A stroke velocity Vst of the brake pedal 3 is obtained by filtering (fc=1 Hz) a difference in the pedal stroke St, as shown in the following equation:

$$Vst=LPF(St(n)-St(n-1)),$$

where St(n−1) is a pedal stroke read in Step S1 during the execution of the preceding routine, and St(n) is a pedal stroke read during the present routine.

Setting of Brake Flag Fb

The brake flag Fb is set in accordance with the pedal stroke St and the pedal stroke velocity Vst. Specifically, the brake flag Fb is set at 1 if the pedal stroke St exceeds a depth of depression Ste for actually raising the pressure in the master cylinder 1 as the brake pedal 3 is depressed (St>Ste) or if the pedal stroke velocity Vst is higher than a discrimination value, e.g., 50 mm/s (Vst>50 mm/s). In other cases, the brake flag Fb is set at 0.

The brake flag Fb is used in selecting the reference wheel velocity Vs or computing the gravity-center velocity Vcg.

Setting of Augmented Depression Flag Fpp

Figure 6:
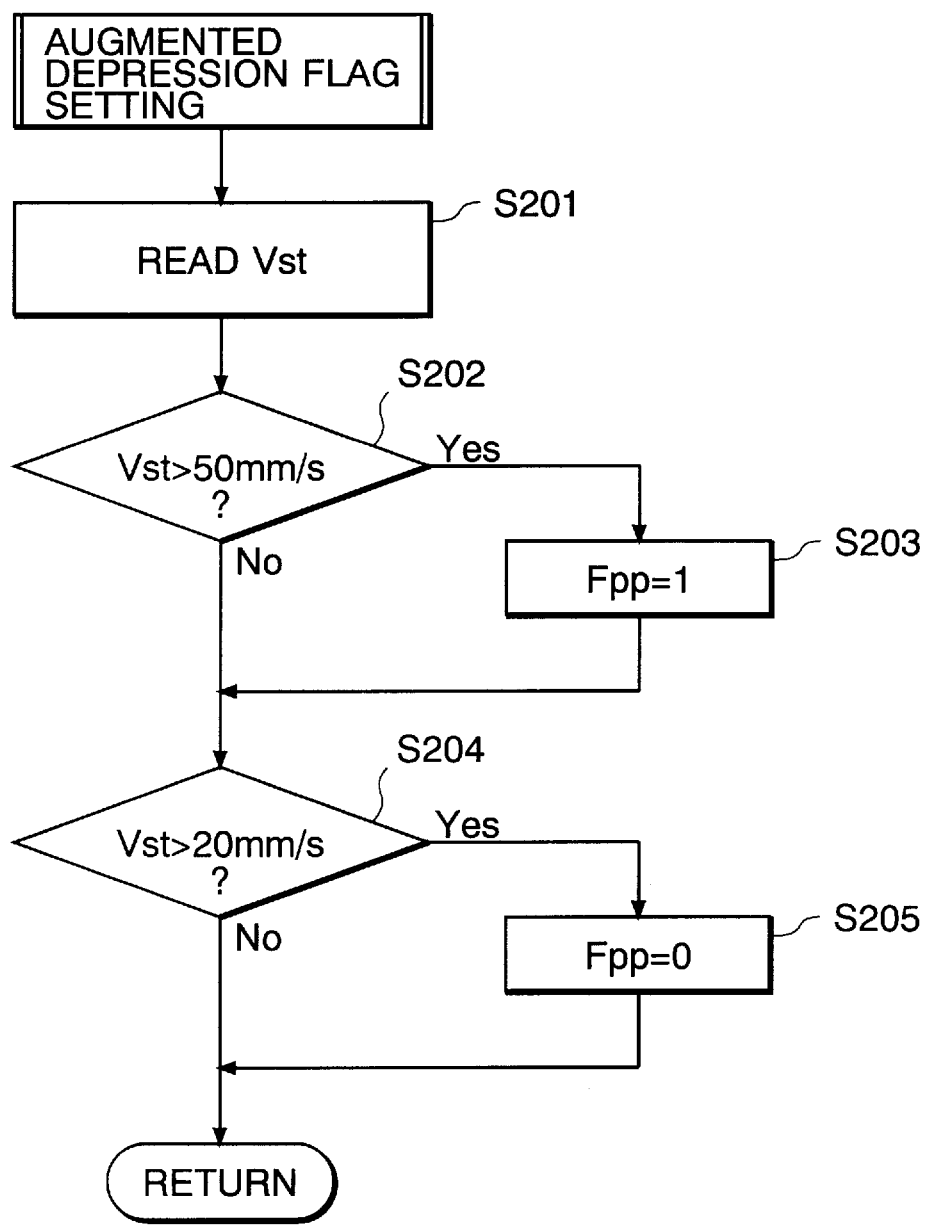
FIG. 6 is a flowchart showing the details of an augmented brake pedal depression flag setting routine executed at Step S2 in FIG. 4.

When the pedal stroke velocity Vst is read (Step S201) in an augmented depression flag setting routine shown in FIG. 6, an augmented brake pedal depression flag Fpp is set (Steps S203 and S205) in accordance with the results of determinations in Steps S202 and S204.

Thus, the augmented depression flag Fpp associated with the brake pedal is reset at 1 if the pedal stroke velocity Vst is higher than the discrimination value 50 mm/s and at 0 if the velocity Vst is lower than a discrimination value 20 mm/s.

Turn Determination

Figure 7:
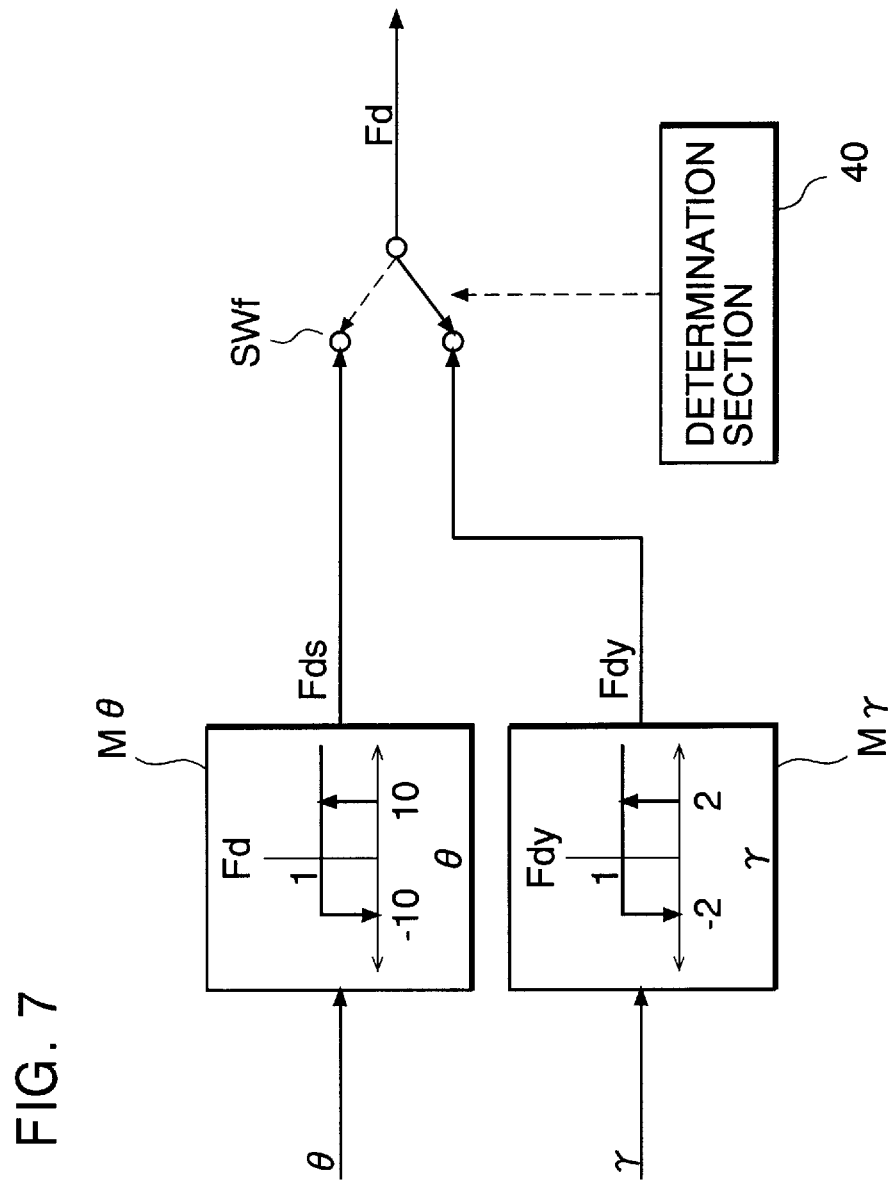
FIG. 7 is a block diagram showing the details of a turn determination section shown in FIG. 3.
Figure 8:
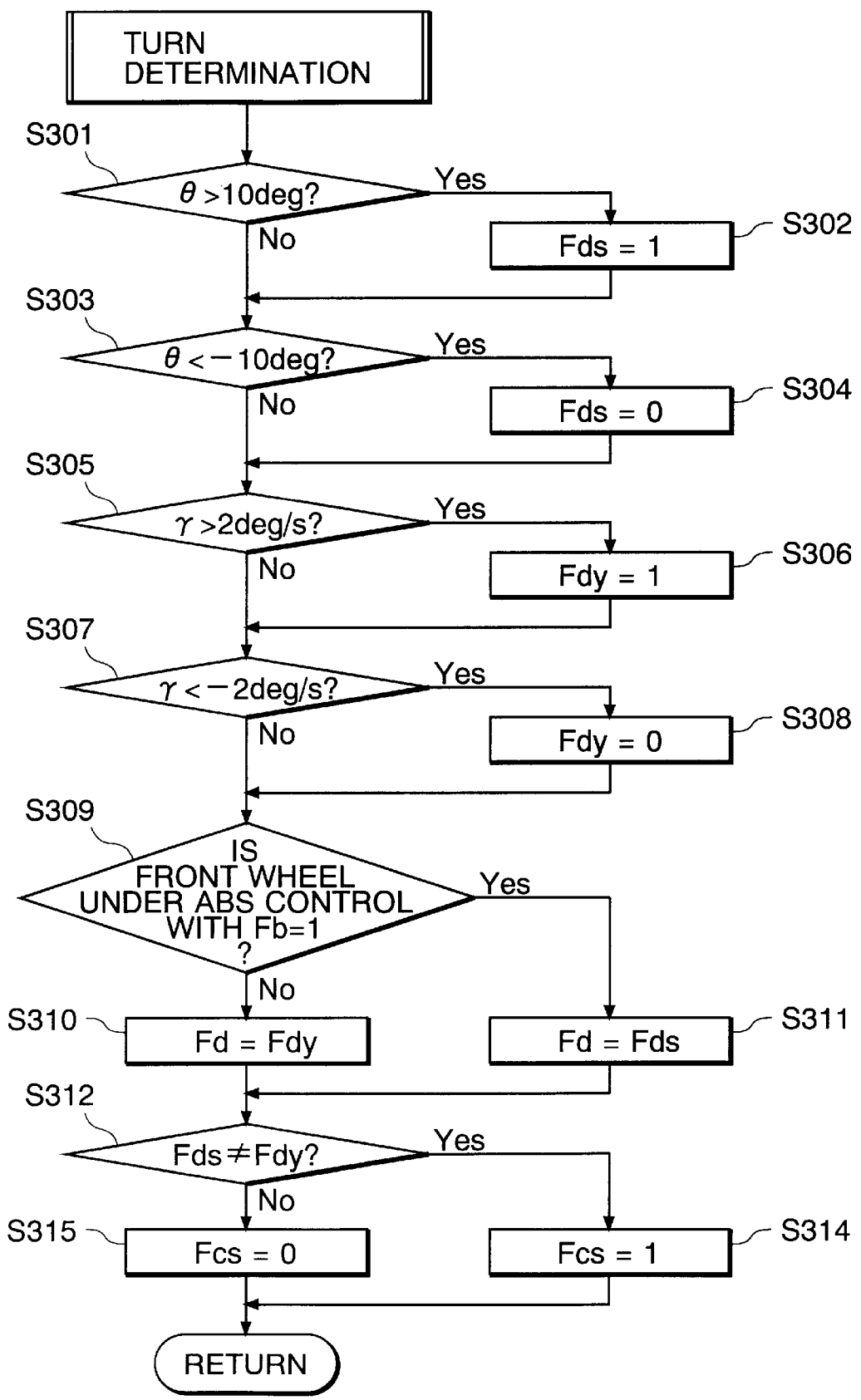
FIG. 8 is a flowchart showing the details of a turn determination routine executed in the turn determination section.

When the various pieces of information indicative of the vehicle operating states and information for the judgment of the driver's manipulations are obtained in the aforementioned manner, turn determination to make determinations on the vehicle turn direction and countersteer is carried out in accordance with the steering wheel angle θ and the yaw rate γ by the determination section 38 shown in FIG. 3 in Step S3 of FIG. 4. FIGS. 7 and 8 show the details of the determination section 38 and Step S3 for turn determination, respectively.

First, a steering-wheel-angle-based turn direction flag Fds is determined on the basis of the steering wheel angle θ according to a map Mθ shown in the block diagram of FIG. 7. Specifically, the turn direction flag Fds is set at 1, which is indicative of a clockwise turn of the vehicle, if the steering wheel angle θ exceeds a discrimination value (e.g., 10 deg) in the positive direction (Steps S301 and S302 of FIG. 8). If the steering wheel angle θ exceeds a discrimination value (e.g., −10 deg) in the negative direction, on the other hand, the flag Fds is set at θ, which is indicative of a counter-clockwise turn of the vehicle (Steps S303 and S304). In the case where the steering wheel angle θ is within the range, −10 deg≦θ≦10 deg, the turn direction flag Fds is kept at the value set in the preceding routine.

Also, a yaw-rate-based turn direction flag Fdy is determined on the basis of the yaw rate γ according to a map Mγ shown in the block diagram of FIG. 7. Specifically, the turn direction flag Fdy is set at 1, which is indicative of a clockwise turn of the vehicle, if the yaw rate γ exceeds a discrimination value, 2 deg/s in the positive direction (Steps S305 and S306). If the yaw rate γ exceeds a discrimination value −2 deg/s in the negative direction, on the other hand, the flag Fdy is set at 0, which is indicative of a counter-clockwise turn of the vehicle (Steps S307 and S308). It is to be understood that the turn direction flag Fdy is kept at the value set in the preceding routine in the case where the yaw rate γ is within the range, −2 deg/s≦γ≦2 deg/s.

When the turn direction flags Fds and Fdy are set in this manner, one of them is selected as a turn flag Fd by a switch SWf shown in FIG. 7. The switch SWf is shifted in response to a switching signal delivered from a determination section 40 shown in FIG. 7.

If a condition that at least one front wheel is under the ABS control with the brake flag Fb set at 1 is met, the determination section 40 delivers a switching signal to shift the switch SWf to an upper operating position, as indicated by broken-line arrow in FIG. 7. In this case, the steering-wheel-angle-based turn direction flag Fds is selected as the turn flag Fd (Fd=Fds). See Steps S309 and S311 of FIG. 8 for this flag setting. If the aforesaid condition is not met, on the other hand, the switch SWf is shifted to a lower operating position, as indicated by full-line arrow in FIG. 7. In this case, the yaw-rate-based turn direction flag Fdy is selected as the turn flag Fd (Fd=Fdy). See Steps S309 and S310 of FIG. 8.

After the turn flag Fd is set in this manner, it is further determined in Step S312 of FIG. 8 whether or not the respective values of the turn direction flags Fds and Fdy are not equal from each other. If the result of the determination in this step is Yes, that is, if the yawing direction of the vehicle does not agree with the operating direction of the steering wheel, 1 is set in a countersteer flag Fcs (Step S314). If the result of the determination in Step S312 is No, on the other hand, 0 is set in the countersteer flag Fcs (Step S315).

Computation of Target Yaw Rate γt

When the routine of FIG. 4 advances from Step S3 to Step S4, the target yaw rate γt of the vehicle is computed in the computing section 39 shown in FIG. 3.

Figure 9:
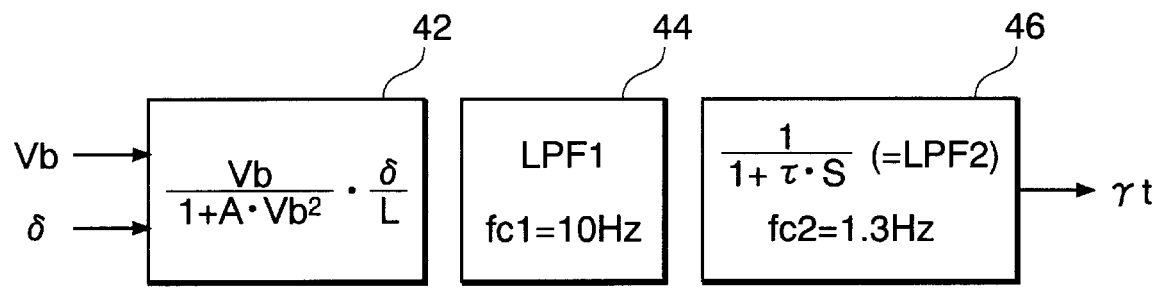
FIG. 9 is a block diagram showing the details of a target yaw rate computing section shown in FIG. 3.

Specifically, the front-wheel steering angle $\delta(\delta=\theta/\rho)$, which is obtained by dividing the steering wheel angle θ by a steering gear ratio ρ, and the vehicle body velocity Vb are first supplied to a computing section 42, as shown in FIG. 9. In the computing section 42, a steady-state gain, which is indicative of a steady-state value of the yaw rate response to the vehicle steering, is obtained from a linear two-wheel model of the vehicle. In a block 44, filtering is carried out using a low-pass filter (LPF1) for noise removal. Then, in a block 46, filtering is carried out using a low-pass filter (LPF2) for the first-order-delay response. Thereupon, the target yaw rate γt is obtained.

Specifically, the target yaw rate γt is computed in accordance with the following equation:

$$\gamma t = LPF2[LPF1\{Vb/(1+A\times Vb^2)\times(\delta/L)\}],$$

where A and L are a stability factor and a wheel base, respectively.

Computation of Required Yaw Moment γd

When the target yaw rate γt is computed in Step S4 of FIG. 4, the required yaw moment γd is computed in Step S5 by the computing section 41 shown in FIG. 3. The details of the computing section 41 and Step S5 are shown in the block diagram of FIG. 10 and the flowchart of FIG. 11, respectively.

Figure 10:
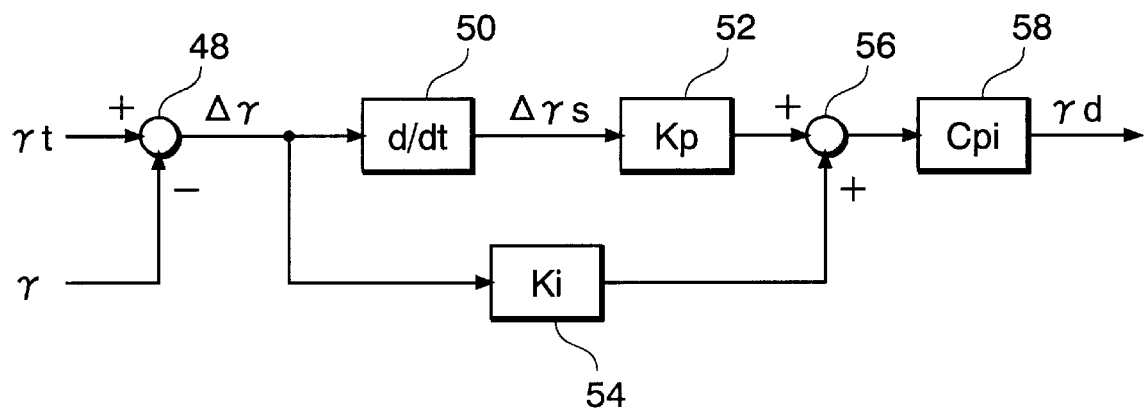
FIG. 10 is a block diagram showing the details of a required yaw moment computing section shown in FIG. 3.
Figure 11:
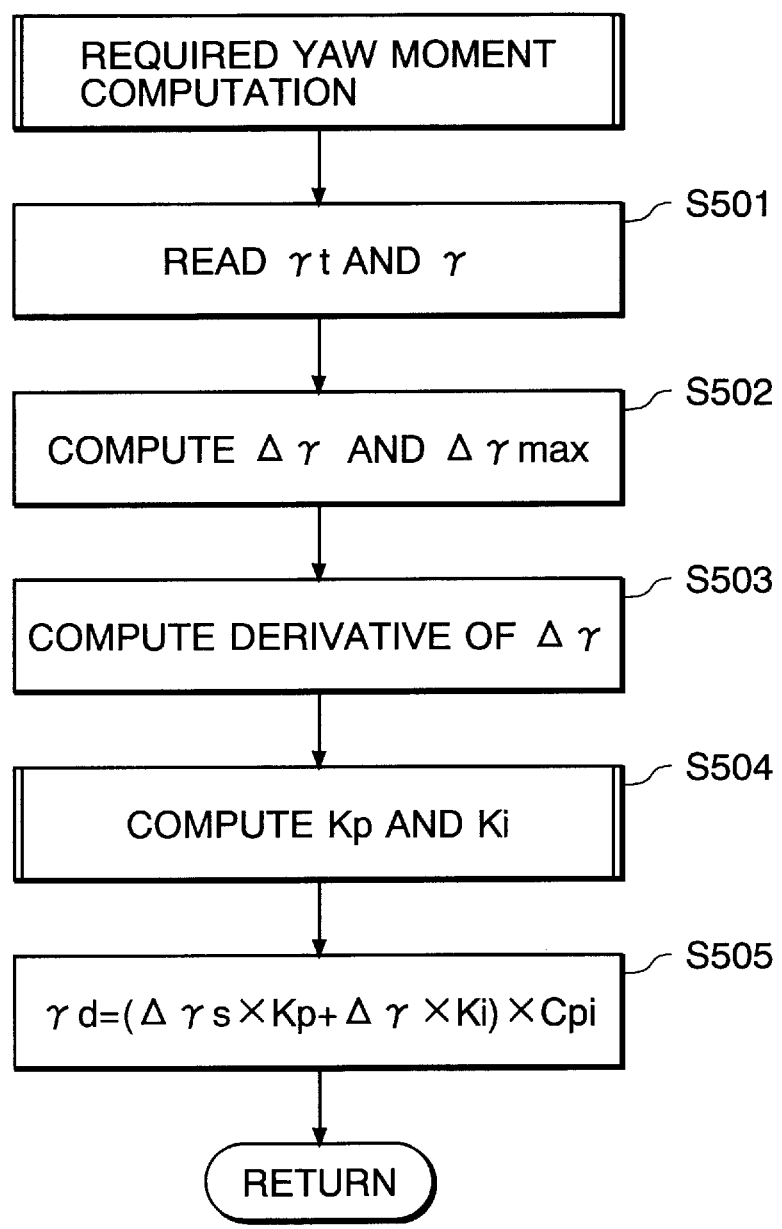
FIG. 11 is a flowchart showing a required yaw moment computation routine.

First, a yaw rate deviation Δγ between the target yaw rate γt and the actual yaw rate γ is computed in a subtractor section 48 shown in FIG. 10 (Steps S501 and S502 of FIG. 11).

In Step S502, the sign of the yaw rate deviation Δγ is inverted when the vehicle turns counterclockwise, so that the sign is positive on the understeer (US) side and negative on the oversteer (OS) side. The vehicle turn direction can be discriminated by the value of the aforesaid turn flag Fd.

In Step S502, a maximum yaw rate deviation Δγmax is computed, as shown in the following equation, by filtering the absolute value of the computed yaw rate deviation Δγ:

$$\Delta\gamma max = LPF(|\Delta\gamma|).$$

In this filtering process, the value of the cutoff frequency fc varies depending on whether the yaw rate deviation Δγ is increased or decreased. It is set at 10 Hz on the increased-deviation side and at 0.08 Hz on the decreased-deviation side.

When the yaw moment control is finished (or when the value of a yaw moment control beginning/ending flag Fym (mentioned later) is 0), the maximum yaw rate deviation Δγ max is set to the absolute value of the yaw rate deviation Δγ as shown in the following equation:

$$\Delta\gamma max = |\Delta\gamma|.$$

After the derivative or difference of the yaw rate deviation Δγ is then computed in a differentiator section 50 shown in FIG. 10, it is filtered (fc=5 Hz) to provide a yaw rate deviation derivative Δγs as shown in the following equation:

$$\Delta\gamma s = LPF(\Delta\gamma - \Delta\gamma m),$$

where Δγm is a yaw rate deviation computed in the preceding routine. Also in this case, the sign of the yaw rate deviation derivative Δγs is inverted when the vehicle turns counterclockwise, for the same reason as in the case of the yaw rate deviation Δγ.

The computing step for the yaw rate deviation derivative Δγs is shown in Step S503 of FIG. 11.

Thereafter, the yaw rate deviation derivative Δγs is multiplied by a feedback gain or proportional gain Kp in a multiplier section 52, the yaw rate deviation Δγ is multiplied by an integral gain Ki in a multiplier section 54, and the resulting products are added together in an adder section 56, as shown in FIG. 10.

Further, the sum outputted from the adder section 56 is multiplied by a correction value Cpi in a multiplier section 58, whereupon the required yaw moment γd is obtained.

The correction value Cpi varies depending on whether the vehicle is braked or not, and is set as follows, for example:

$$Cpi=1.0(\text{when the vehicle is braked}(Fb=1)),$$

$$Cpi=1.5(\text{when the vehicle is not braked}(Fb=0)).$$

The required yaw moment γd is computed in Steps S504 and S505 in the routine shown in FIG. 11.

Step S504 is a step in which the proportional and integral gains Kp and Ki are computed. The procedure of computation for the proportional gain Kp is shown in the block diagram of FIG. 12.

The proportional gain Kp may take different reference values Kpu (e.g., 4 kgm/s/(deg/s²)) and Kpo (e.g., 5 kgm/s/(deg/s²)), depending on whether the vehicle turns with the tendency of understeering or oversteering. A switch SWp is used for the selection between the values Kpu and Kpo.

Figure 12:
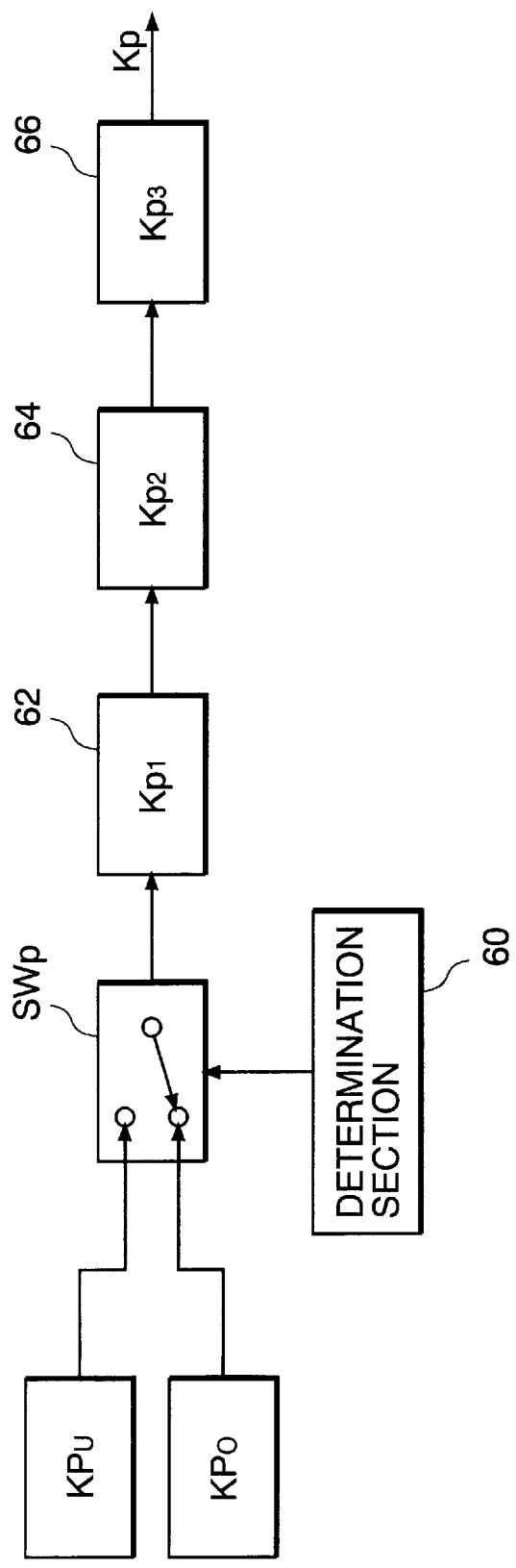
FIG. 12 is a block diagram showing the way a proportional gain Kp for the computation of a required yaw moment is calculated.

The switch SWp is shifted in response to a determination signal delivered from a determination section 60 shown in FIG. 12. The determination section 60 delivers a determination signal such that the switch SWp is shifted to the side of the reference value Kpu at the time of understeering in which the yaw rate deviation derivative Δγs is 0 or more.

The reference value outputted from the switch SWp is multiplied successively by correction factors Kp1, Kp2 and Kp3 in multiplier sections 62, 64 and 66, respectively, whereby the proportional gain Kp is obtained.

Thus, the proportional gain Kp is computed according to the following equations:

$$Kp=Kpu\times Kp1\times Kp2\times Kp3 \text{ (at the time of US)},$$

$$Kp=Kpo\times Kp1\times Kp2\times Kp3 \text{ (at the time of OS)}.$$

If the vehicle body is subjected to the yaw moment control before the vehicle reaches its critical travel region, it will inevitably make the driver feel uneasy. To avoid this, the correction factor Kp1 is used to correct the proportional gain Kp so that the gain Kp effectively acts only when the yaw rate deviation Δγ or the lateral acceleration Gy of the vehicle body is substantial.

Figure 13:
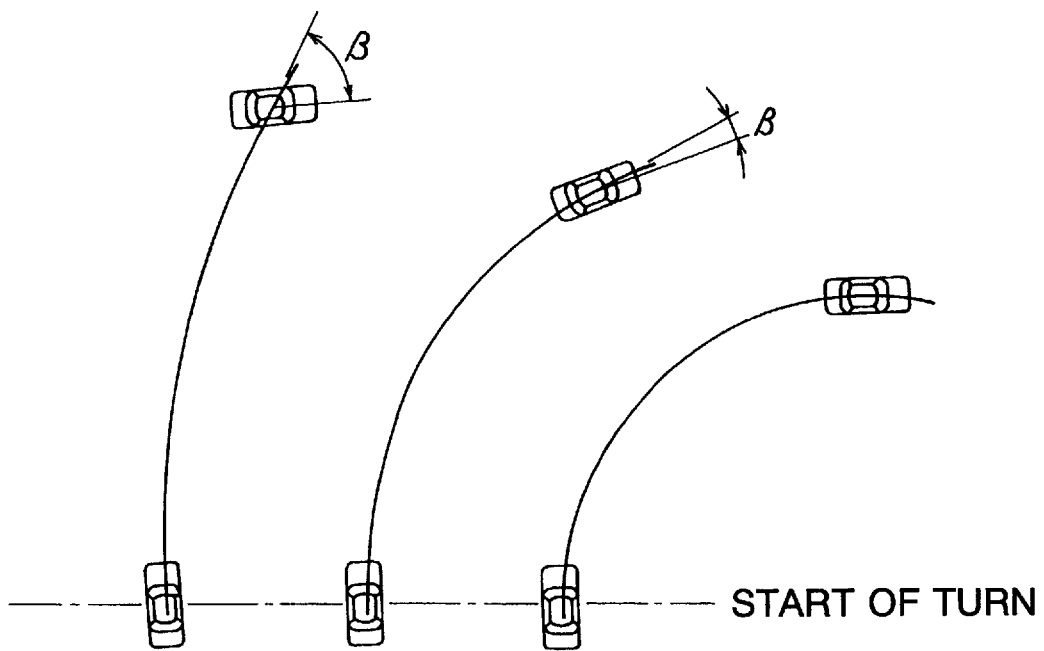
FIG. 13 is a diagram showing the relationship between the gravity-center slip angle β and the turning behavior of the body of a vehicle while the vehicle is turning.

As for the correction factor Kp2, it is used to correct the proportional gain Kp for the following reason. If the actual yaw rate γ is made simply to follow up the target yaw rate γt in the case where the vehicle is running on a low-μ road, the lateral force on the vehicle body reaches its critical value, and the gravity-center slip angle β of the vehicle body increases, as shown in the left-hand portion of FIG. 13, so that the vehicle body may possibly spin. The correction factor Kp2 is set in order to prevent this. If the correction factor Kp2 is set appropriately, it is believed that the gravity-center slip angle β of the vehicle body can be kept small, as shown in the central portion of FIG. 13, so that the vehicle body can be prevented from spinning. The right-hand portion of FIG. 13 shows the case of the vehicle running on a high-$\mu$ road.

The correction factor Kp3 is used to correct the proportional gain Kp for the following reason. If a vibration component acts on the output of the yaw rate sensor 30 when the vehicle is running on a rough road, it greatly influences the yaw rate deviation derivative Δγs, resulting in erroneous control operation or worsened controllability. Accordingly, the correction factor Kp3 serves to reduce the proportional gain Kp, thereby preventing such an awkward situation.

Figure 14:
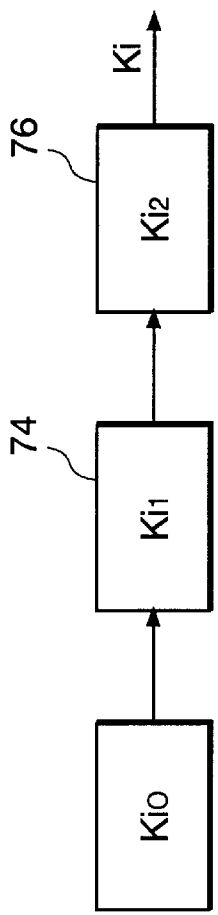
FIG. 14 is a block diagram showing the way an integral gain K1 for the required yaw moment computation is calculated.

Referring now to the block diagram of FIG. 14, there is shown a procedure of computation for the integral gain Ki. The integral gain Ki, like the proportional gain Kp, is computed by multiplying a reference integral gain Ki0 (e.g., 10 kgm/s/(deg/s)) successively by correction factors Ki1 and Ki2 in multiplier sections 74 and 76. Thus, the integral gain Ki is computed as follows:

$$Ki=Ki0 \times Ki1 \times Ki2.$$

The correction factor Ki1 is used to reduce the integral gain Ki for the following reason. If the front-wheel steering angle increases, an error in the target yaw rate γt enlarges an error in the yaw rate deviation Δγ, possibly entailing erroneous control operation. In this situation, therefore, the integral gain Ki is reduced by means of the correction factor Ki1.

The correction factor Ki2 is used to reduce the integral gain Ki for the same reason for the case of the correction factor Kp2 for the proportional gain Kp.

A detailed description of the values Kp1, Kp2, Kp3, Ki1 and Ki2 is omitted herein.

Yaw Moment Control

When the required yaw moment γd is computed in the aforementioned manner, the yaw moment control is carried out by the computing section 78 shown in FIG. 3 in Step S6 of the main routine of FIG. 4. FIG. 15 shows the details of the computing section 78.

First, in a control start/end determination section 80 shown in FIG. 15, the value of a control beginning/ending flag Fymc is settled in accordance with the required yaw moment γd.

Specifically, the value of the control beginning/ending flag Fymc is settled in a determination circuit shown in FIG. 16. This determination circuit includes an OR circuit 81, and on- and off-signals corresponding to the required yaw moment γd are applied to two input terminals of the OR circuit 81.

The flowchart shown in FIG. 16 shows a routine for control start determination. The control start determination procedure will be described below with reference to FIGS. 16 and 17.

As shown in FIG. 16, it is first determined in Step S6000 whether or not the value of the required yaw moment γd is larger than 0, that is, whether or not the vehicle is in the understeer (US) mode or oversteer (OS) mode. If the result of the determination in Step S6000 is No, that is, if it is decided that the vehicle is in the OS mode, it is judged that there is a possibility of necessity for producing a restoration moment M(−) on the vehicle by the turn control, and the procedure proceeds to Step S6002. On the other hand, if it is decided in Step S6000 that the vehicle is in the US mode, it is judged that there is a possibility of necessity for producing a turning moment M(+) on the vehicle by the turn control, and the program advances to Step S6004. The details of the turning moment M(+) and the restoration moment M(−) will be described later.

In Step S6002, it is determined whether or not the required yaw moment γd is smaller than the threshold value γos (for example, −100 kgm/s) on the OS side. On the other hand, in Step S6004, it is determined whether or not the required yaw moment γd is larger than the threshold value γus (for example, 200 kgm/s) on the US side.

Figure 17:
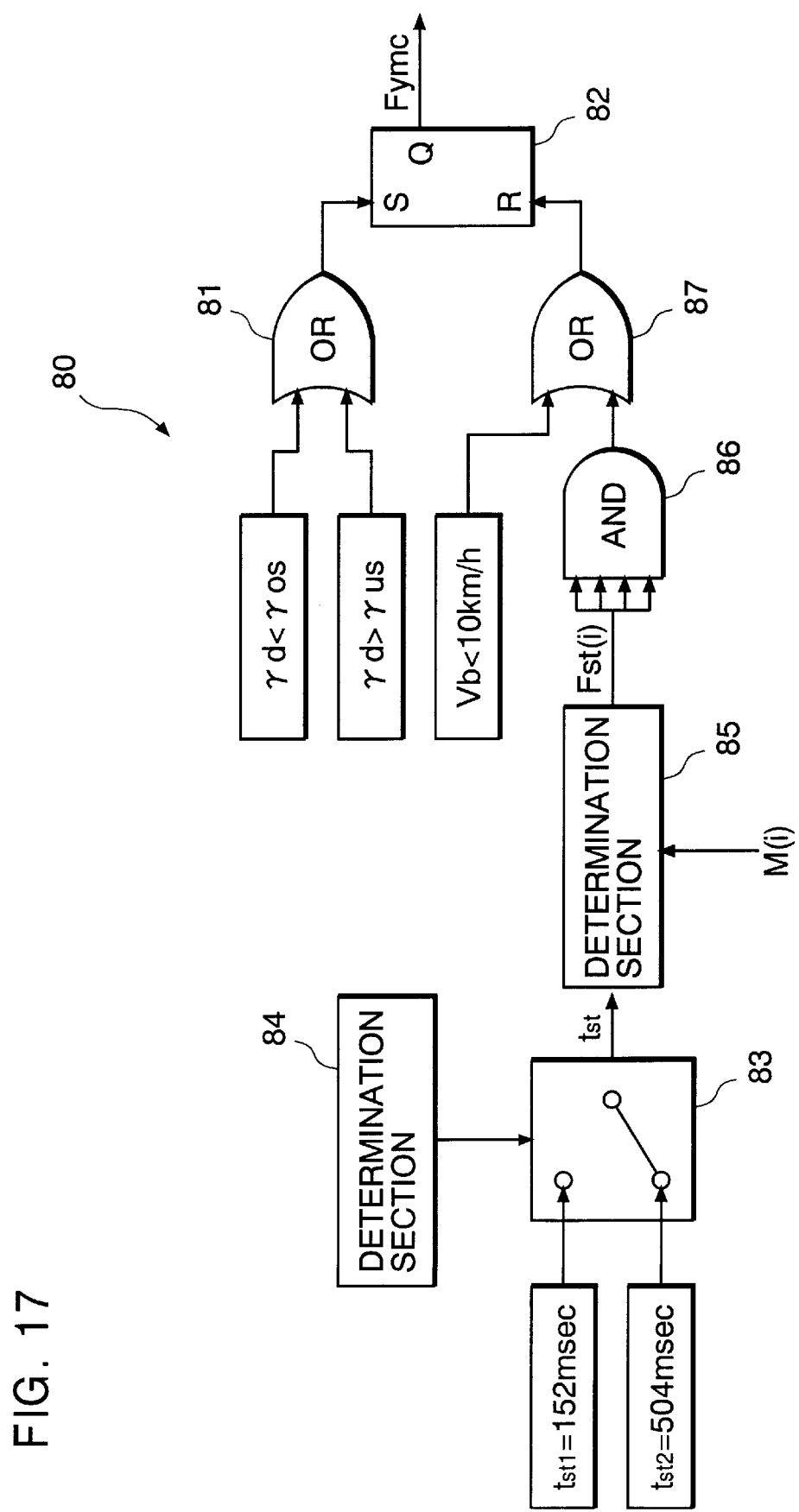
FIG. 17 is a block diagram showing the details of the control start/end determination section shown in FIG. 15.

As shown in FIG. 17, to one input terminal of the OR circuit 81 is inputted an on-signal when the required moment γd is smaller than the threshold value γos on the OS side, that is, when the result of the determination in Step S6002 is Yes. To the other input terminal is inputted an on-signal when the required yaw moment γd is larger than the threshold value γus on the US side, that is, when the result of the determination in Step S6004 is Yes.

When the result of the determination in either Step S6002 or Step S6004 is Yes, an on-signal is outputted from the output terminal of the OR circuit 81 in FIG. 17, and this on-signal is inputted to the set terminal S of the flip-flop 82. As a result, the control beginning/ending flag of value 1 (Fymc=1) indicating the start of control is outputted from the output terminal Q of the flip-flop 82 (Step S6006).

The absolute value (100 kgm/s) of the threshold value γos on the OS side is smaller than the absolute value (200 kgm/s) of the threshold value γus on the US side. Thus, the output timing for the control beginning flag Fymc=1, that is, the start timing for the yaw moment control, is earlier on the OS side than on the US side.

On the other hand, the reset terminal R of the flip-flop 82 is supplied with a reset signal for settling the reset timing for the control beginning/ending flag Fymc, that is, the timing for the delivery of the flag Fymc (=0) from the flip-flop 82.

As shown in FIG. 17, a circuit for generating the reset signal includes a switch 83, which has two input terminals. A first end determination time tst1 (e.g., 152 msec) is supplied to one input terminal of the switch 83, and a second end determination time tst2 (e.g., 504 msec) to the other input terminal.

The switch 83 can be shifted in response to a switching signal from a determination section 84. When the behavior of the vehicle body is stable, that is, if all the following conditions are fulfilled, the determination section 84 delivers a first switching signal, which causes the first end determination time tst1 (e.g., 152 msec) to be outputted as an end determination time tst from the output terminal of the switch 83.

Conditions:
Target yaw rate γt<10 deg/s,
Yaw rate γ<10 deg/s, and
Effective steering wheel angular velocity value θae<200 deg/s.

If any of these three requirements is not fulfilled, the determination section 84 delivers a second switching signal, which causes the second end determination time tst2 (e.g., 504 msec) to be outputted as the end determination time tst from the output terminal of the switch 83.

The aforesaid conditions for the delivery of the first switching signal define a range in which the posture of the vehicle can be regarded as stable. If these conditions are met, it can be concluded that the yaw moment control need not be continued any longer. In this case, therefore, the yaw moment control should be finished without delay, and a short time of, for example, 152 msec is set as the first end determination time tst1. Thus, the yaw moment control can be finished quickly, so that a braking force based on the yaw moment control cannot continue to be applied in vain for a long period of time, and there is no possibility of the vehicle driver having a brake dragging feeling.

If the aforesaid conditions are not met, on the other hand, the vehicle can be regarded as unstable. In this case, the yaw moment control can be supposed to be able to be further continued, and a relatively long time of, for example, 504 msec is used as the second end determination time tst2. Thus, the yaw moment control is finished after the passage of a sufficient period of time.

The output of the end determination time tst is supplied to a determination section 85. If a condition is met such that a brake pressure control signal continues to be held or non-controlled (control mode M(i), mentioned later, is a hold mode or noncontrol mode) for the end determination time tst or longer, the determination section 85 outputs an end indication flag Fst(i)=1. If this condition is not met, the determination section 85 outputs an end indication flag Fst(i)=0. Character i suffixed to each end indication flag Fst represents a corresponding wheel. The brake pressure control signal used in the determination in the determination section 85 will be mentioned later.

The end indication flags Fst(i) are supplied individually to input terminals of an AND circuit 86. The output terminal of the AND circuit 86 is connected to one input terminal of an OR circuit 87, the other input terminal of which is supplied with an on-signal when the vehicle body velocity Vb is lower than a discrimination value 10 km/h. The output terminal of the OR circuit 87 is connected to the reset terminal R of the flip-flop 82.

The AND circuit 86 supplies the on-signal to the OR circuit 87 when all the respective values of the end indication flags Fst(i) are 1. The OR circuit 87 supplies an on-signal to the reset terminal R of the flip-flop 82 when the on-signal is supplied to any one of its input terminals. Thus, the reset signal is supplied to the flip-flop 82 if the vehicle body velocity Vb is lower than 10 km/h or if the aforesaid condition for the brake pressure control signal is fulfilled for any of the four wheels.

On receiving the reset signal, the flip-flop 82 outputs the control beginning/ending flag Fymc=0, which is indicative of the termination of the yaw moment control.

As shown in FIG. 15, the output of the control start/end determination section 80, that is, the control beginning/ending flag Fymc, is supplied to a brake pressure control mode determination section 88. In this determination section 88, the brake pressure control mode for each wheel is determined in accordance with the required yaw moment γd and the turn flag Fd in the case where the value of the control beginning/ending flag Fymc is 1.

Figure 18:
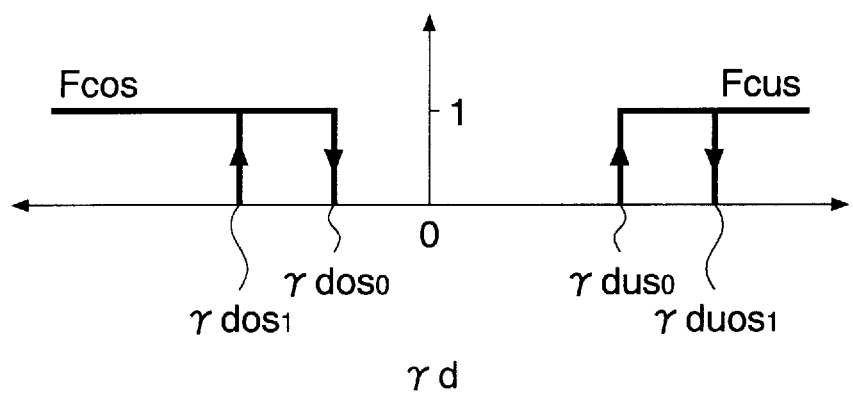
FIG. 18 is a graph showing the relationship between the required yaw moment and control execution flags Fcus and Fcos which are set based on the required yaw moment.

First, referring to the map shown in FIG. 18, brake pressure control execution flags Fcus and Fcos for the US and OS modes are set based on the required yaw moment γd and its threshold values as follows:

US mode:
Fcus=1 (γd>γdus1 (=100 kgm/s)),
Fcus=0 (γd<γdus0 (=80 kgm/s)),
OS mode:
Fcos=1 (γd<γdos1 (=−80 kgm/s)),
Fcos=0 (γd>γdos0 (=−60 kgm/s)).

The absolute value of the threshold value γdos0 (=−60 kgm/s) at which the yaw moment control in the OS mode to generate a restoration moment M(−) is started is smaller than that of the γdus0 (=80 kgm/s) at which the yaw moment control in the US mode to generate a turning moment M(+) is started. Thus, the yaw moment control can be carried out more easily on the side of the restoration moment M(−) than on the side of the turning moment M(+). If the required yaw moment γd reaches the aforesaid threshold value γdos1 (e.g., −100 kgm/s) when the vehicle has a tendency to OS, therefore, then the yaw moment control will be started at once.

Figure 19:
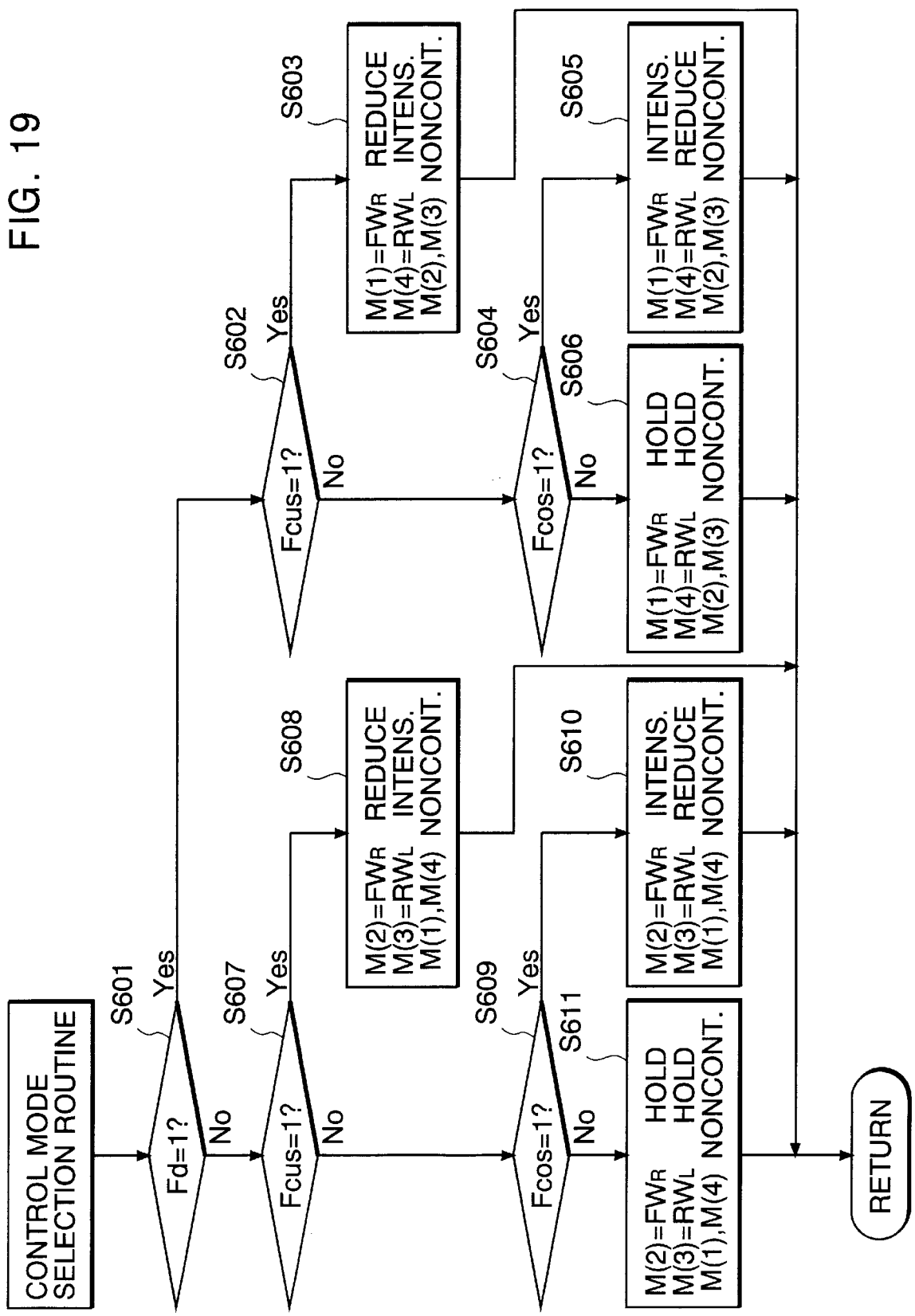
FIG. 19 is a flowchart showing a control mode selection routine.

Subsequently, the brake pressure control modes M(i) for the individual wheels are selected in accordance with the combinations of the turn flag Fd and the control execution flags Fcus and Fcos. FIG. 19 shows a selection routine for these control modes.

In the control mode selection routine of FIG. 19, it is first determined whether or not the value of the turn flag Fd is 1 (Step S601). If the result of this determination is Yes, that is, if it is concluded that the vehicle is turning clockwise, a determination is made as to whether or not the value of the control execution flag Fcus is 1 (Step S602).

If the result of this determination is Yes, then the turning vehicle has a marked tendency to US, the required yaw moment γd is at a great value greater than the threshold value γdus1, and the vehicle requires the turning moment M(+). In this case, a control mode M(1) for the front-left wheel $FW_L$ is set to a reduce-pressure mode, a control mode M(4) for the rear-right wheel $RW_R$ to an intensify-pressure mode, and control modes M(2) and M(3) for the front-right and rear-left wheels $FW_R$ and $RW_L$ to the noncontrol mode (Step S603).

If the result of the determination in Step S602 is No, it is determined whether or not the value of the control execution flag Fcos is 1 (Step S604).

If the result of this determination is Yes, then the turning vehicle has a marked tendency to OS, the required yaw moment γd is at a small value smaller than the threshold value γdos1, and the vehicle requires the restoration moment M(−). In this case, the control mode M(1) for the front-left wheel $FW_L$ is set to the intensify-pressure mode, the control mode M(4) for the rear-right wheel $RW_R$ to the reduce-pressure mode, and the control modes M(2) and M(3) for the front-right and rear-left wheels $FW_R$ and $RW_L$ to the non-control mode (Step S605).

If both the results of the determinations in Steps S602 and S604 are No, then the turning vehicle has no marked tendency either to US or to OS. In this case, therefore, the control modes M(1) and M(4) for the front-left and rear-right wheels $FW_L$ and $RW_R$ are both set to the hold mode, and the control modes M(2) and M(3) for the front-right and rear-left wheels $FW_R$ and $RW_L$ to the noncontrol mode (Step S606).

If the result of the determination in Step S601 is No, that is, if it is concluded that the vehicle is turning counterclockwise, on the other hand, it is determined whether or not the value of the control execution flag Fcus is 1 (Step S607).

If the result of this determination is Yes, then the vehicle requires the turning moment M(+), as in the case of the clockwise turn. In this case, in contrast with the case of the clockwise turn, the control mode M(2) for the front-right wheel $FW_R$ is set to the reduce-pressure mode, the control mode M(3) for the rear-left wheel $RW_L$ to the intensify-pressure mode, and the control modes M(1) and M(4) for the front-left and rear-right wheels $FW_L$ and $RW_R$ to the non-control mode (Step S608).

If the result of the determination in Step S607 is No, it is determined whether or not the value of the control execution flag Fcos is 1 (Step S609). If the result of this determination is Yes, then the vehicle requires the restoration moment M(−), so that the control mode M(2) for the front-right wheel $FW_R$ is set to the intensify-pressure mode, the control mode M(3) for the rear-left wheel $RW_L$ to the reduce-pressure mode, and the control modes M(1) and M(4) for the front-left and rear-right wheels $FW_L$ and $RW_R$ to the noncontrol mode (Step S610).

If both the results of the determinations in Steps S607 and S609 are No, the control modes M(2) and M(3) for the front-right and rear-left wheels $FW_R$ and $RW_L$ are both set to the hold mode, and the control modes M(1) and M(4) for the front-left and rear-right wheels $FW_L$ and $RW_R$ to the noncontrol mode (Step S611).

Table 1 below collectively shows the control modes M(i) described above.

TABLE 1

| | Clockwise Turn (Fd = 1) | | | Counterclockwise Turn (Fd = 0) | | |
|---|---|---|---|---|---|---|
| Fcus | 1 | 0 | 0 | 1 | 0 | 0 |
| Fcos | 0 | 1 | 0 | 0 | 1 | 0 |
| $FW_L$:M(1) | Reduce | Intens. | Hold | Non-cont. | Non-cont. | Non-cont. |
| $FW_R$:M(2) | Noncont. | Noncont. | Non-cont. | Reduce | Intens. | Hold |
| $RW_L$:M(3) | Noncont. | Noncont. | Non-cont. | Intens. | Reduce | Hold |
| $RW_R$:M(4) | Intens. | Reduce | Hold | Non-cont. | Non-cont. | Non-cont. |

When the control modes M(i) for the individual wheels are selected in the aforementioned manner, a valve control signal computing section 89 in the next stage computes control signals for the solenoid valves or the inlet and outlet valves 12 and 13 for controlling the respective brake pressures of the wheel brakes for the individual wheels, in accordance with the control modes M(i) and the required yaw moment γd.

Figure 20:
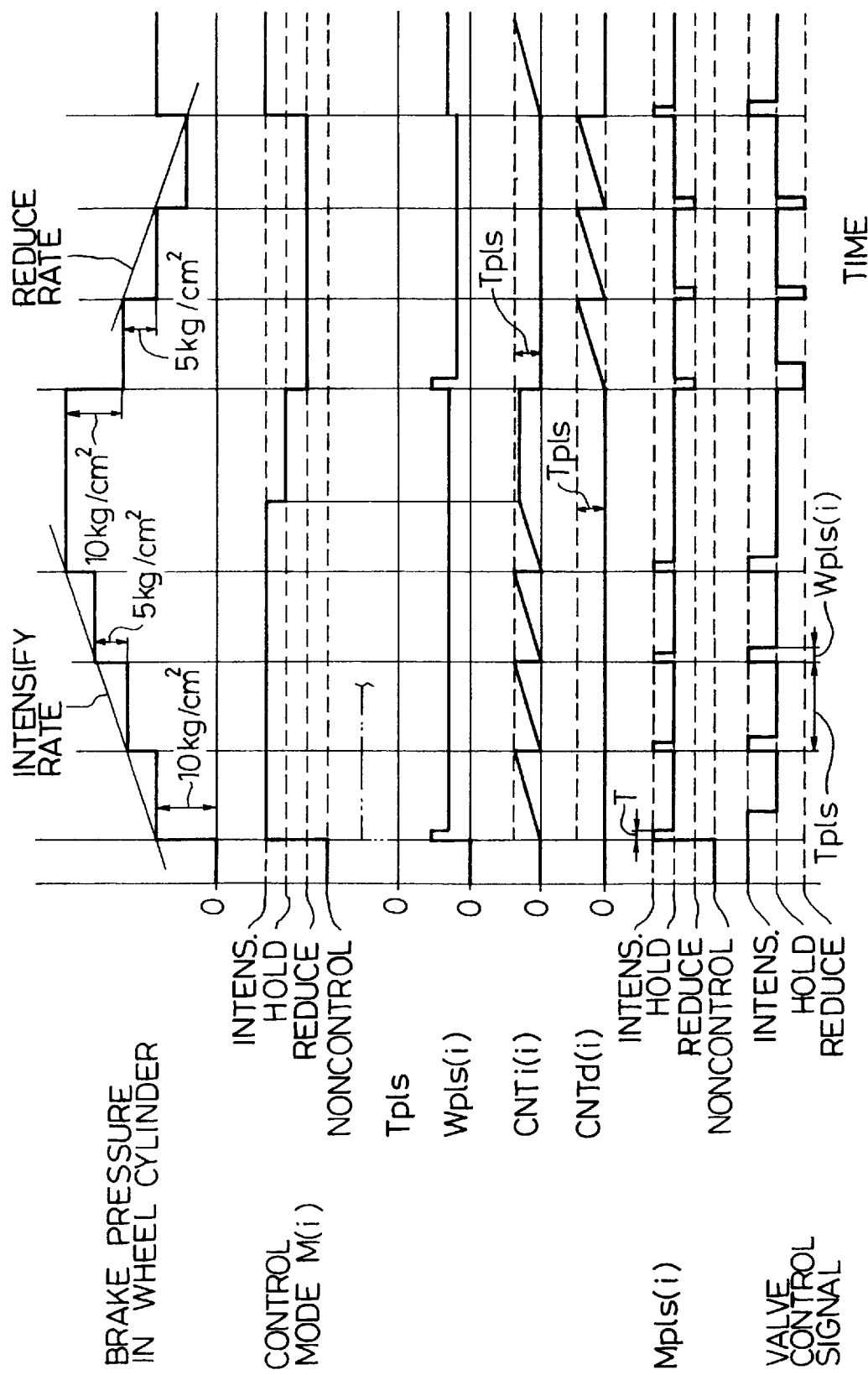
FIG. 20 is a time chart showing the relations between a control mode M(i) set in the selection routine of FIG. 19, actuation mode Mpls(i), and pulse width Wpls(i)

Specifically, the increase/decrease rate (gradient of pressure increase or decrease) for the fluid pressure (brake pressure) in the wheel brake concerned is first computed to obtain the required yaw moment. In order to change the actual brake pressure by a fixed increment or decrement ΔP at a time in accordance with the computed increase/decrease rate, the pulse periods Tpls and pulse widths Wpls(i) of driving pulses (valve control signals) for the inlet or outlet valves 12 or 13 to produce the increment or decrement ΔP are computed. The increment or decrement ΔP is set at ±5 kg/cm², for example. In order to secure good response, however, the increment or decrement ΔP is set at ±10 kg/cm², for example, in the initial cycle only. Referring to FIG. 20, there is shown the way the brake pressure in the wheel brake concerned is increased or decreased with every increment or decrement ΔP.

Based on the hold mode, the inlet and outlet valves 12 and 13 are actuated while being supplied with the valve control signals (or intensify-pressure or reduce-pressure pulse signals). Since the actuation of the valves 12 and 13 is ordered with every control period T (8 msec) for the main routine, an actuation mode Mpls(i) is set so that actual actuation is carried out with every pulse period Tpls.

The following is a detailed description of the pulse period Tpls, pulse width Wpls(i), and actuation mode Mpls(i).

If the lateral force on the vehicle body is ignored, a variation ΔMz of the yaw moment of the vehicle body caused when the brake pressure in the wheel brake for each front wheel is changed by ΔPwc can be expressed by the following equation:

$$\Delta Mz = \Delta Pwc \times BF \times TF/2,$$

where BF and TF are the front brake coefficient (kg/cm²→kg) and front tread, respectively.

Accordingly, the increase/decrease rate Rpwc (kg/cm²/s) of the brake pressure obtained when the required yaw moment γd is given can be expressed by the following equation:

$$Rpwc = 2 \times \gamma d / BF / TF.$$

If the increment or decrement ΔP (5 or 10 kg/cm²) for each cycle is fixed, on the other hand, the relationship between the increase/decrease rate Rpwc and the pulse period Tpls leads to the following equation:

$$|Rpwc| = \Delta P / (Tpls \Delta T(=8\ msec)).$$

Based on these two equations, the pulse period Tpls is expressed by following equation:

$$Tpls = \Delta P \times BF \times TF / (2 \times T \times |\gamma d|),$$

where $2 \leq Tpls \leq 12$ is given.

The pulse period Tpls for the inlet and output valves on the front-wheel side is used as the pulse period on the rear-wheel side.

The pulse width Wpls(i) is previously set in an experiment. According to this experiment, the master cylinder pressure and wheel brake pressure (brake pressure) are adjusted to their respective reference values, the time for the change of the wheel brake pressure by the increment or decrement ΔP (5 or 10 kg/cm²) after the actuation of the valve concerned is measured in this state, and the pulse width Wpls(i) is set on the basis of the measured time.

Since the pressure of discharge from the pump 16 or 17 is utilized for the increase of the wheel brake pressure, it is preferable that the pulse width Wpls(i) is set in consideration of a delay in response of the pump 16 or 17.

Figure 21:
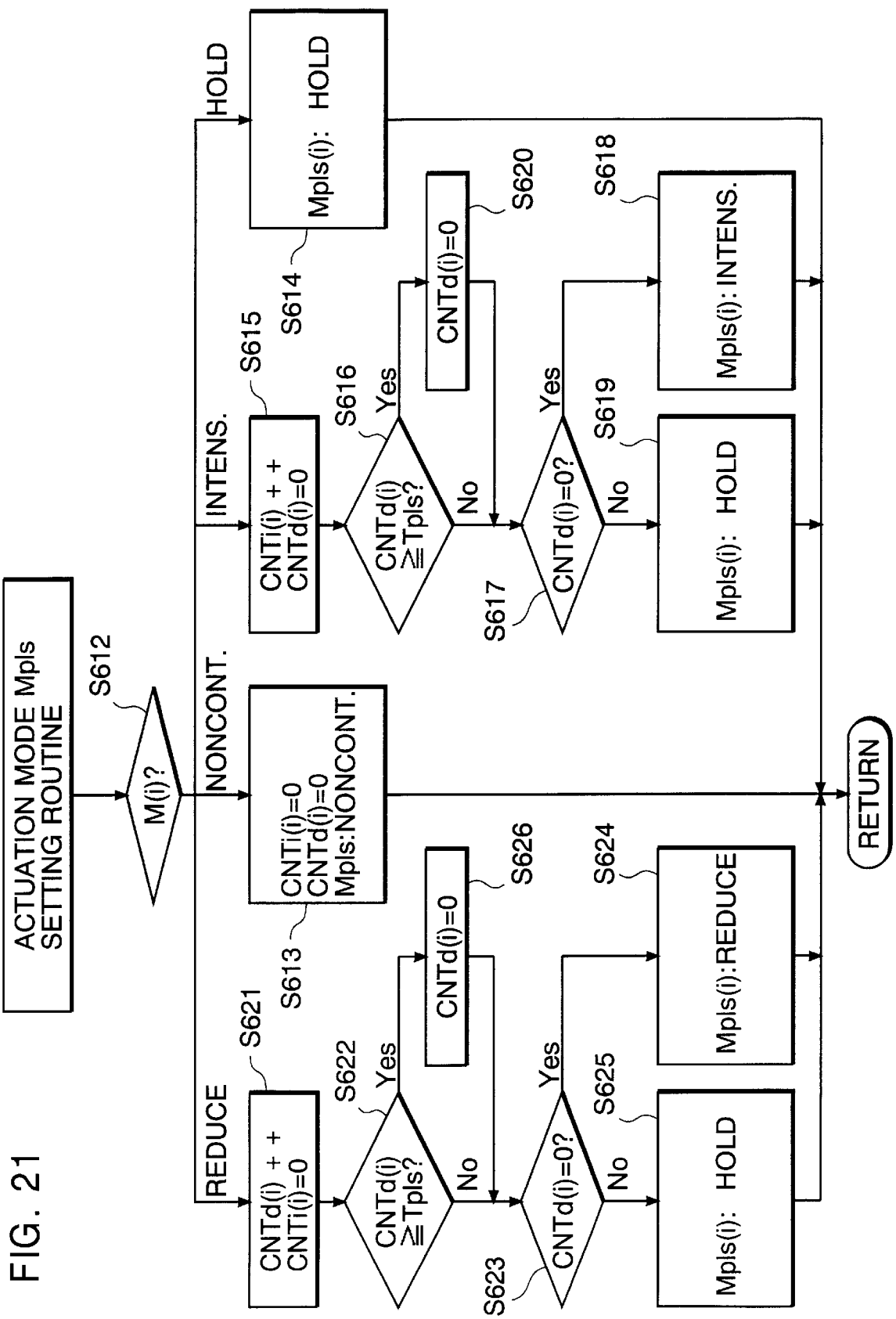
FIG. 21 is a flowchart showing a setting routine for the actuation mode Mpls(i)

The actuation mode Mpls(i) is set in accordance with the control mode M(i) and the pulse period Tpls in a setting routine shown in FIG. 21. In this setting routine, the control mode M(i) is determined first (Step S612). If the control mode M(i) is the noncontrol mode, values in an intensify-pressure period counter CNTi(i) and a reduce-pressure period counter CNTd(i) are both reset to 0, whereupon the noncontrol mode is set as the actuation mode Mpls(i) (Step S613).

If the control mode M(i) is the pressure-hold mode, the hold mode is set as the actuation mode Mpls(i) (Step S614).

If the control mode M(i) is the intensify-pressure mode, only the intensify-pressure period counter CNTi(i) is operated (Step S615), and it is determined whether or not the pulse period Tpls is reached by the value in the counter CNTi(i) (Step S616). Since the result of this determination is No at this point of time, it is then determined whether or not the value in the increase period counter CNTi(i) is 0 (Step S617). In this case, the result of this determination is Yes. Accordingly, the intensify-pressure mode is set as the actuation mode Mpls(i) (Step S618).

Thereafter, if the result of the determination in Step S617 remains No as the routine is executed repeatedly, the hold mode is set as the actuation mode Mpls(i) (Step S619).

If the result of the determination in Step S616 becomes Yes, with the passage of time, so that the value in the intensify-pressure period counter CNTi(i) is reset at 0 (Step S620), the result of the determination in Step S617 becomes Yes, whereupon the intensify-pressure mode is set as the actuation mode Mpls(i) (Step S618). While the control mode M(i) is the intensify-pressure mode, therefore, the intensify-pressure mode is set as the actuation mode Mpls(i) with every pulse period Tpls.

If the control mode M(i) is the reduce-pressure mode, on the other hand, Steps S621 to S625 of FIG. 21 are executed in the same manner as in the case of the intensify-pressure mode, whereupon the reduce-pressure mode is set as the actuation mode Mpls(i) with every pulse period Tpls.

When the actuation mode Mpls(i) and the pulse width Wpls(i) are computed in the aforesaid manner, the pulse width Wpls(i) is corrected in an intensify-pressure/reduce-pressure inhibitory section 90 (see FIG. 15) in the next stage, in order to inhibit increase and decrease of the brake pressure, in consideration of the driver's countersteer operation, excessive slip, or control overshoot. The correction section 90 is shown in detail in the block diagram of FIG. 22.

The pulse width Wpls(i) supplied to the intensify-pressure/reduce-pressure inhibitory section 90 is outputted as a pulse width Wpls1(i) through three switches 91, 92 and 93. The respective outputs of these switches can be changed between Wpls1(i)=Wpls(i) and Wpls1(i)=0, depending on the values of flags set in setting sections 94, 95 and 96. The actuation mode Mpls(i) supplied to the intensify-pressure/reduce-pressure inhibitory section 90 is outputted without change.

First, an intensify-pressure inhibiting flag Fk1(i) for countersteer is set in the setting section 94. Specifically, the setting section 94 includes an AND circuit 97, the output of which is supplied to the switch 91. On-signals are supplied individually to input terminals of the AND circuit 97 if corresponding conditions are met. Input conditions for the individual on-signals involve cases that the target wheel is a rear wheel, the value of a countersteer flag Fcs is 1, and the control mode M(i) is the intensify-pressure mode.

Thus, the AND circuit 97 outputs an intensify-pressure inhibiting flag Fk1(i)=1 if all its inputs are on-signals, and outputs an intensify-pressure inhibiting flag Fk1(i)=0 if not.

When the switch 91 receives the inhibiting flag Fk1(i)=1, it is shifted from the state illustrated, whereupon the pulse width Wpls1(i) is set at 0. Instead of setting the pulse width Wpls(i) at 0, in this case, its value may be reduced.

Figure 22:
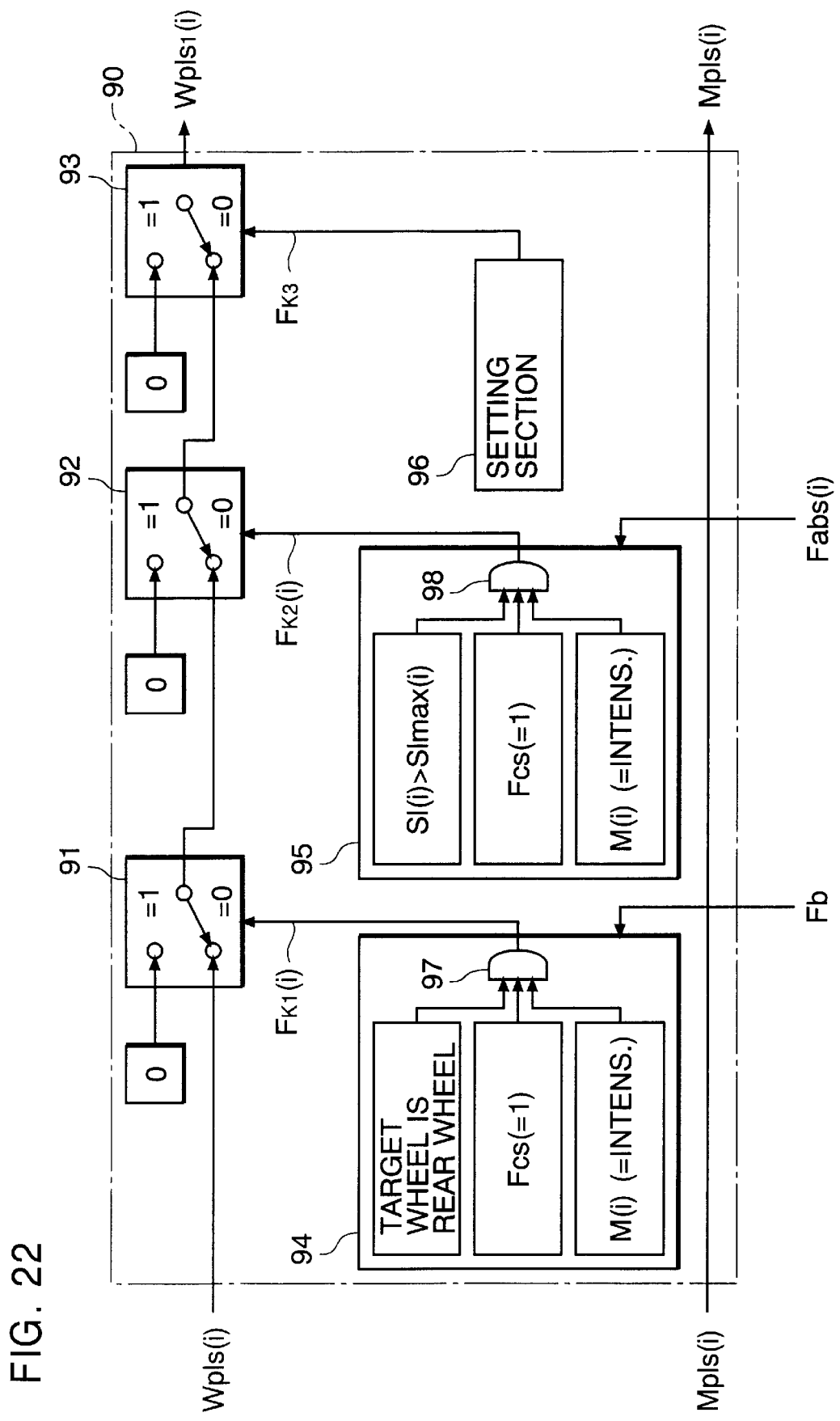
FIG. 22 is a block diagram showing the details of an intensify-pressure/reduce-pressure inhibitory section shown in FIG. 15.
Figure 23:
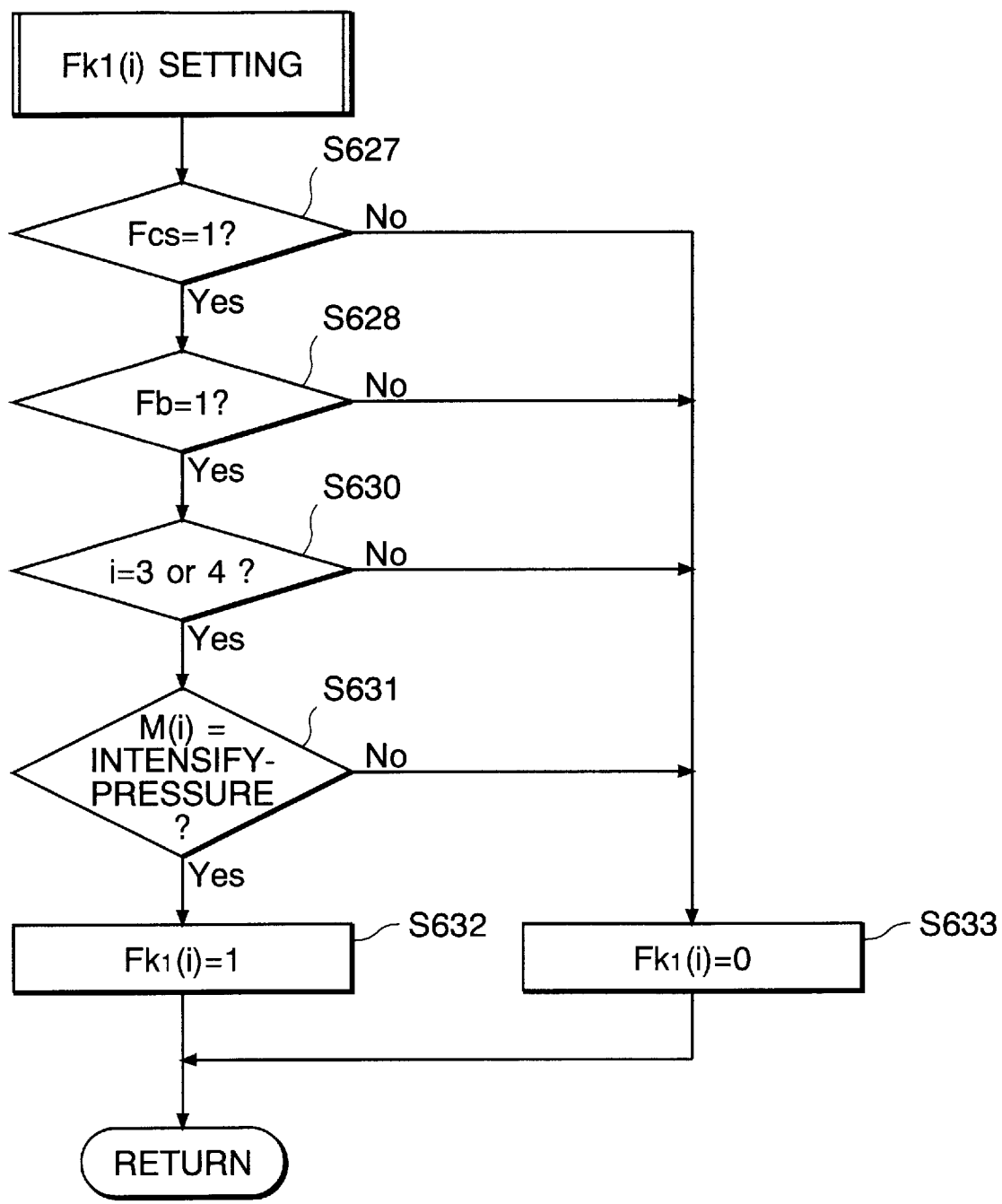
FIG. 23 is a flowchart showing a setting routine for an intensify-pressure inhibiting flag Fk1(i) associated with the intensify-pressure/reduce-pressure inhibitory section.

FIG. 23 shows a setting routine for the intensify-pressure inhibiting flag Fk1(i). In this routine, 1 is set in the inhibiting flag Fk1(i) only when all the results of determinations in Steps S627 to S631 are Yes. In other words, the value of the flag Fk1(i) is set at 1 only in the case where on-signals are applied to all three inputs of the AND circuit 97 shown in FIG. 22 when the vehicle is not braked. In connection with this, the AND circuit 97 is supplied with the flag Fb that indicates whether the vehicle is braked or not. The index i associated with the determination in Step S630 is a numerical value by which the four wheels of the vehicle are discriminated from one another, as mentioned before. If the index i is 3 or 4, the wheel to be discriminated is a rear wheel.

An intensify-pressure inhibiting flag Fk2(i) for the case of an excessive slip is set in the setting section 95. The setting section 95 also includes an AND circuit 98, the output of which is supplied to the switch 92. On-signals are supplied individually to input terminals of the AND circuit 98 if corresponding conditions are met. Input conditions for the individual on-signals involve cases that the slip factor Sl(i) is higher than an allowable slip factor Slmax(i) and that the control mode M(i) is the intensify-pressure mode.

The AND circuit 98 outputs an intensify-pressure inhibiting flag Fk2(i)=1 if all its inputs are on-signals, and outputs an intensify-pressure inhibiting flag Fk2(i)=0 if not.

When the switch 92 receives the intensify-pressure inhibiting flag Fk2(i)=1, it is shifted from the state illustrated, whereupon the pulse width Wpls1(i) is set at 0. Instead of setting the pulse width Wpls(i) at 0, in this case, its value may be reduced.

Figure 24:
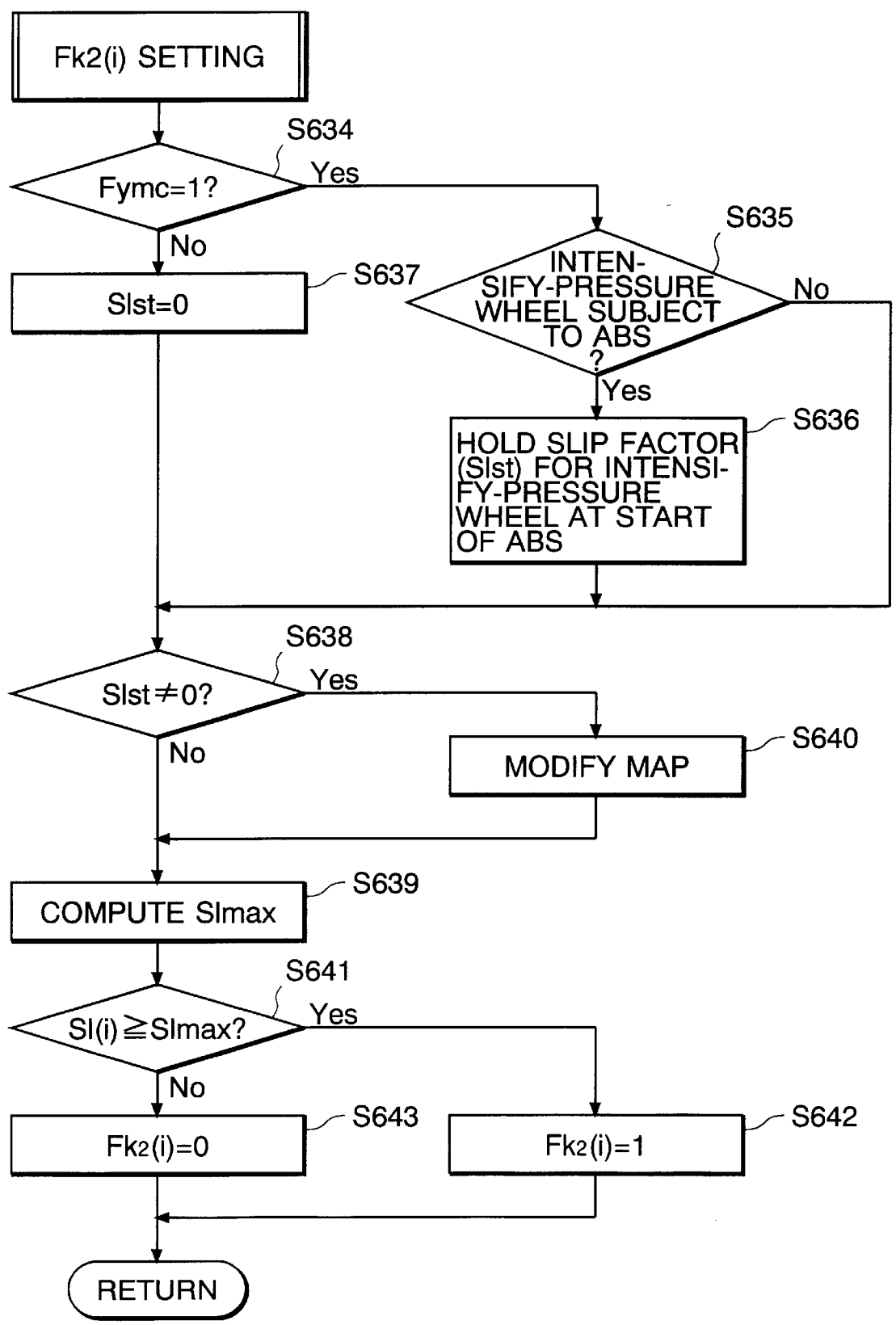
FIG. 24 is a flowchart showing a setting routine for an intensify-pressure inhibiting flag Fk2(i) associated with the intensify-pressure/reduce-pressure inhibitory section.

Referring to FIG. 24, there is shown a detailed routine illustrating a setting sequence for the intensify-pressure inhibiting flag Fk2(i). In this setting routine, it is first determined whether or not the value of the control beginning/ending flag Fymc is 1, that is, whether or not the vehicle is under the yaw moment control (Step S634). If the result of this determination is Yes, it is determined whether or not the wheel (intensify-pressure wheel) for which the intensify-pressure mode is set as its control mode M(i) is subjected to the ABS control (Step S635). For this determination, a flag Fabs(i), mentioned later, is used, so that the setting section 95 of FIG. 22 is also supplied with the flag Fabs(i).

If the result of the determination in Step S635 is Yes, a discrimination slip factor associated with the intensify-pressure wheel at the start of the ABS control is maintained as a discrimination slip factor Slst(i) (Step S636), and Step S638 is then executed. If the result of the determination in Step S635 is No, in contrast with this, Step S638 is executed without carrying out Step S636. The ABS control will be described later.

If the result of the determination in Step S634 is No, that is, if no yaw moment control is carried out, on the other hand, the discrimination slip factor Slst(i) is reset at 0 (Step S637), and Step S638 is then executed.

In Step S638, it is determined whether or not the discrimination slip factor Slst(i) is 0. If the result of this determination is No, that is, if the intensify-pressure wheel is not under the ABS control, the allowable slip factor Slmax(i) is computed (Step S639). Specifically, the allowable slip factor Slmax(i) is read from a map, such as the one shown in FIG. 25, in accordance with the required yaw moment γd. As seen from FIG. 25, the allowable slip factor Slmax(i) has a characteristic such that it increases at a predetermined rate as the required yaw moment γd increases, and its maximum value is set at 20%.

In Step S641, it is determined whether or not the slip factor Sl(i) is equal to or higher than the allowable slip factor Slmax(i). If the result of this determination is Yes, 1 is set in the intensify-pressure inhibiting flag Fk2(i) (Step S642). If the determination result is No, 0 is set in the inhibiting flag Fk2(i) (Step S643).

Figure 25:
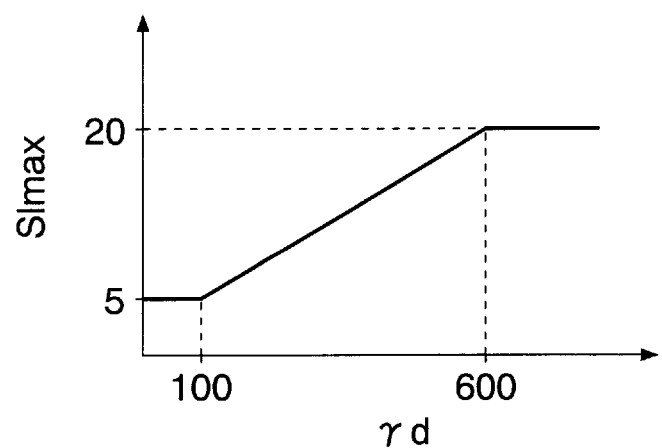
FIG. 25 is a graph showing the relation between the required yaw moment γd and allowable slip factor Slmax.
Figure 26:
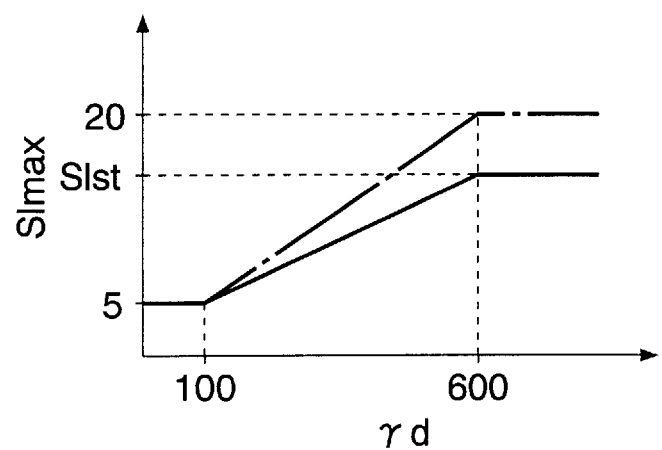
FIG. 26 is a graph showing the relation between the required yaw moment γd and allowable slip factor Slmax after the start of ABS control.

If the result of the determination in Step S638 is Yes, that is, if the intensify-pressure wheel is under the ABS control, on the other hand, the map from which the allowable slip factor Slmax(i) is read is modified (Step S640). Specifically, the map of FIG. 25 is replaced by a map shown in FIG. 26 in Step S640. As seen from FIG. 26, in this case, the maximum value of the allowable slip factor Slmax(i) is set to the discrimination slip factor Slst(i) (or 95% of Slst(i)), and the gradient of its increase is changed in accordance with the discrimination slip factor Slst(i).

When the intensify-pressure wheel is under the ABS control, therefore, the allowable slip factor Slmax(i) is set to the discrimination slip factor Slst(i). Thereupon, the result of the determination in Step S641 is Yes, so that the intensify-pressure inhibiting flag Fk2(i) is kept at 1.

In the setting section 96 (see FIG. 22), a prevention flag Fk3=1 for preventing overshooting of the brake pressure control is delivered to the switch 93 when a condition is met such that the absolute value of the required yaw moment γd tends to decrease to an extent higher than a predetermined degree. If this condition is not met, a prevention flag Fk3=0 is delivered to the switch 93. When the switch 93 is supplied with the flag Fk3=1, also in this case, it is shifted, whereupon the pulse width Wpls1(i) is set at 0.

Figure 27:
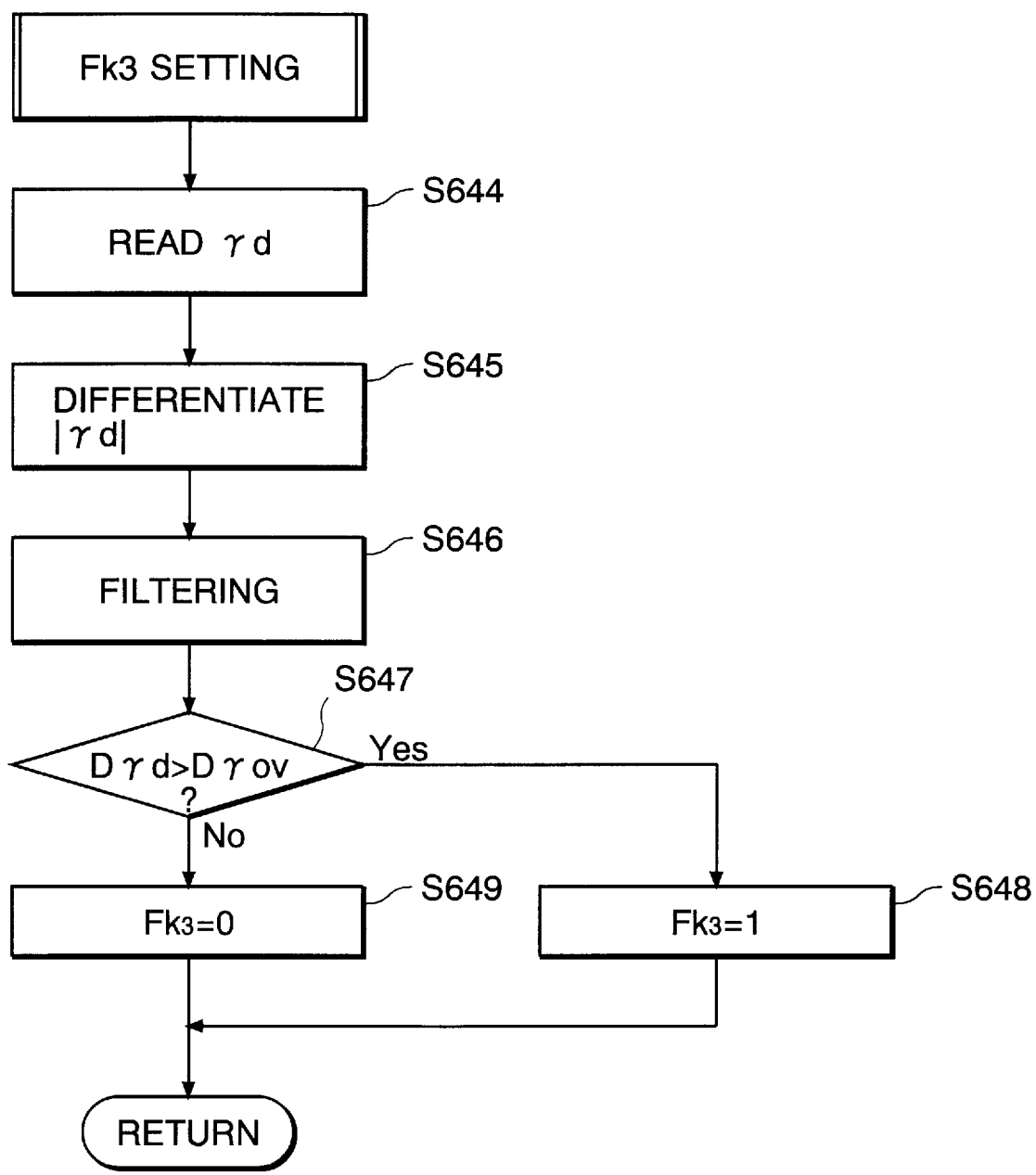
FIG. 27 is a flowchart showing a setting routine for a prevention flag Fk3.

Referring to FIG. 27, there is shown a detailed routine illustrating a setting sequence for the prevention flag Fk3. In this setting routine, the required yaw moment γd is read first (Step S644), and a derivative Dγd of the absolute value of the required yaw moment γd is computed (Step S645). Further, the derivative Dγd is filtered (fc=2 Hz) (Step S646).

The processing in Steps S645 and S646 can be expressed by the following equation:

$$D\gamma d = LPF(|\gamma d| - |\gamma dm|),$$

where γdm is the preceding value.

Then, it is determined whether or not the derivative Dγd is smaller than an overshoot discrimination value Dγov (e.g., −125 kgm/s$^2$, that is, whether or not the required yaw moment γd is reduced at a gradient greater than the one represented by the absolute value of the discrimination value Dγov (Step S647). If the result of this determination is Yes, 1 is set in the prevention flag Fk3 (Step S648). If the determination result is No, on the other hand, 0 is set in the flag Fk3 (Step S649).

Referring again to FIG. 15, the block diagram for the yaw moment control includes a pre-pressurization control determination section 100. In this determination section 100, respective values of pre-pressurization flags Fpre1 and Fpre2, which are referred to during operation control for the pumps 16 and 17, inlet and outlet valves 12 and 13, and cutoff valves 19 and 20, are set in advance of the start of the yaw moment control. Specifically, if the absolute value of the required yaw moment γd or the maximum yaw rate deviation Δγmax is greater than a predetermined value so that the yaw moment control is permitted to start, a pre-pressurization flag Fpre1=1 or Fpre2=1 is set for a fixed period of duration (e.g., 96 msec). When the yaw moment control is started during this period, the pre-pressurization flag Fpre1 or Fpre2 is reset at 0. The pre-pressurization flag Fpre1=1 is set when the vehicle makes a clockwise turn, and Fpre2 =1 is set when the vehicle makes a counterclockwise turn.

Figure 28:
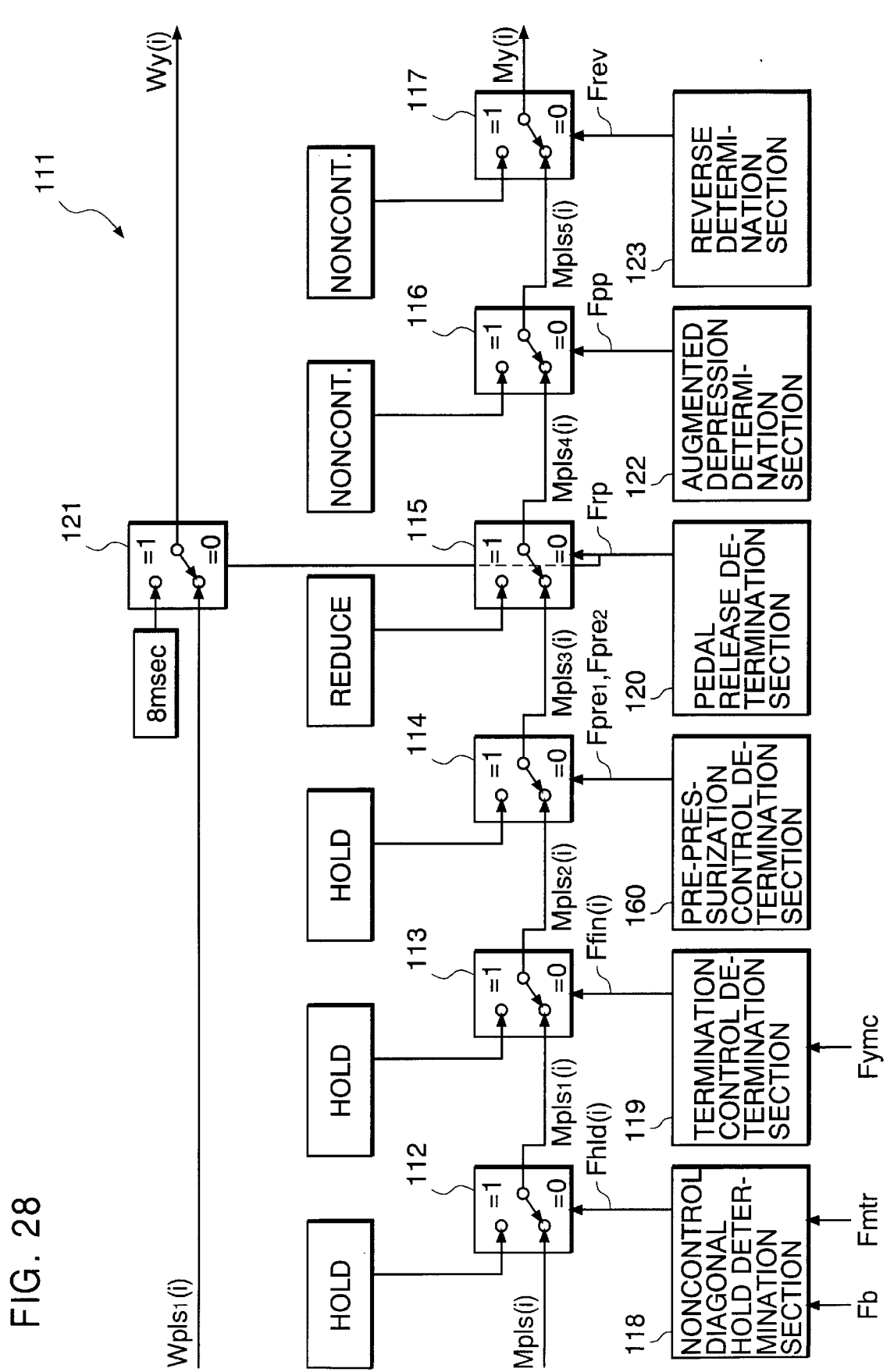
FIG. 28 is a block diagram showing the details of a signal forced-modification section shown in FIG. 15.

The yaw moment control section of FIG. 15 also includes a control signal forced-modification section 111, the details of which are shown in FIG. 28. The forced-modification section 111 can compulsorily modify the pulse width Wpls(i) and the actuation mode Mpls(i), depending on various conditions. Thus, the pulse width Wpls(i) and the actuation mode Mpls(i) are modified as required while they pass through the forced-modification section 111, and are outputted as a pulse width Wy(i) and an actuation mode My(i), respectively.

As seen from FIG. 28, the actuation mode Mpls(i) is converted into the actuation mode My(i) by means of switches 112 to 117, which are supplied with flags and shifted in accordance with the respective values of the flags.

More specifically, the switch 112 is shifted according to a flag Fhld(i) delivered from a noncontrol diagonal hold determination section 118. In the determination section 118, the value of that flag, among other flags Fhld(i), which corresponds to the wheel for which the noncontrol mode is set as the control mode M(i) is set at 1 when the pump 16 or 17 is operated (or if a motor actuation flag Fmtr, mentioned later, is 1 (Fmtr=1)) with the vehicle not braked (Fb=0). In this case, therefore, the switch 112 outputs an actuation mode Mpls1(i), which is obtained by compulsorily changing the noncontrol mode, among the control modes set in the actuation mode Mpls(i), to the hold mode. If the value of the flag Fhld(i) is 0, on the other hand, the actuation mode Mpls(i) is outputted as it is from the switch 112. In the actuation mode Mpls(i), the pressure of discharge from the pump 16 or 17 cannot be supplied to the wheel brakes of the wheels in the noncontrol mode, although the control mode of those wheels is compulsorily changed to the hold mode.

The switch 113 is shifted according to termination flags Ffin(i) delivered from a termination control determination section 119. In the determination section 119, the termination control to terminate the yaw moment control is carried out in such a manner that the brake pressure is gradually decreased to the master cylinder pressure by setting the termination flags Ffin(i) at 1 for a predetermined time (e.g., 24 msec) with every predetermined cycle (e.g., 40 msec) in a fixed period (e.g., 304 msec) since the delivery of a termination command (Fymc=0) for the yaw moment control.

Figure 29:
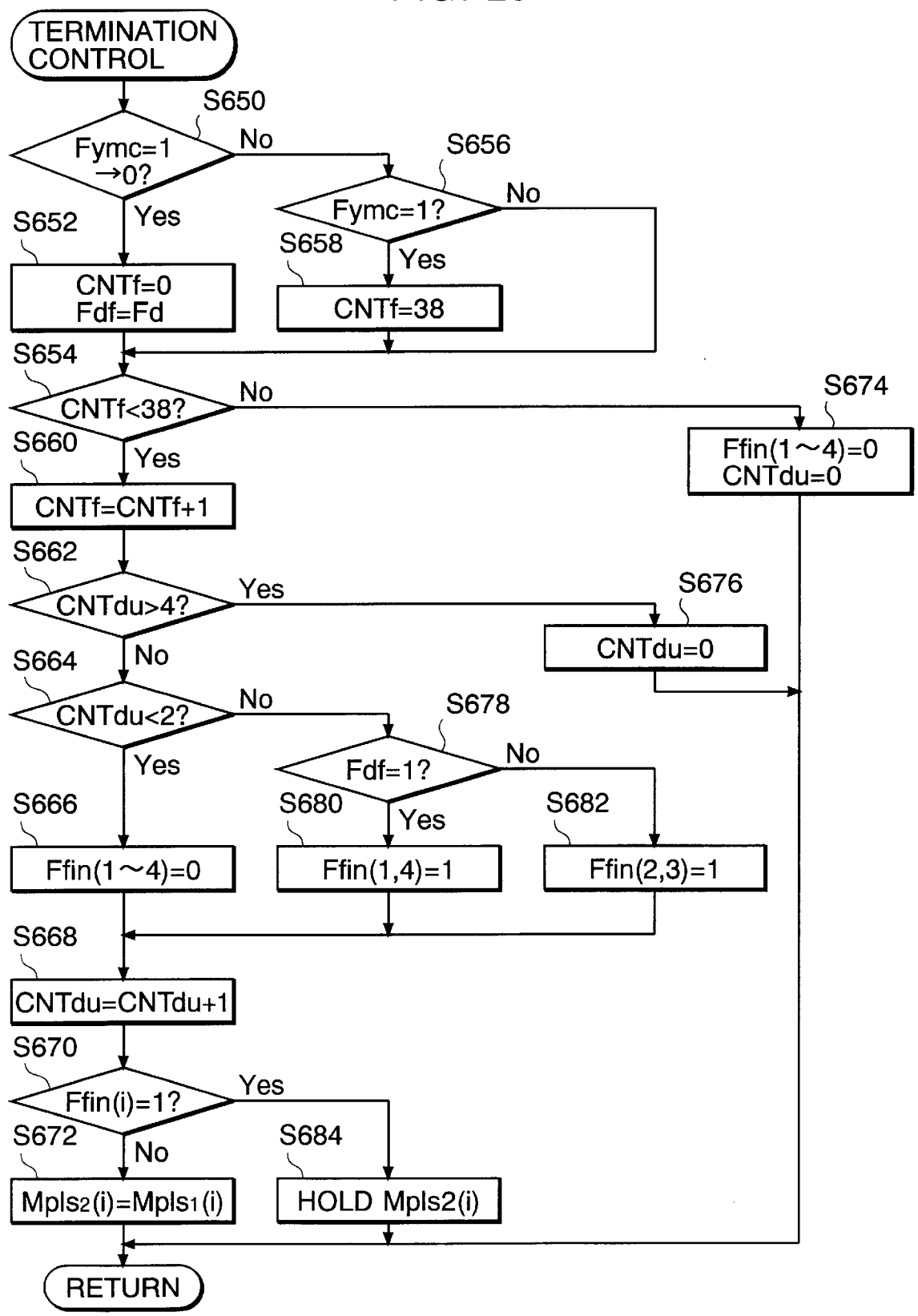
FIG. 29 is a flowchart showing a termination control routine.
Figure 30:
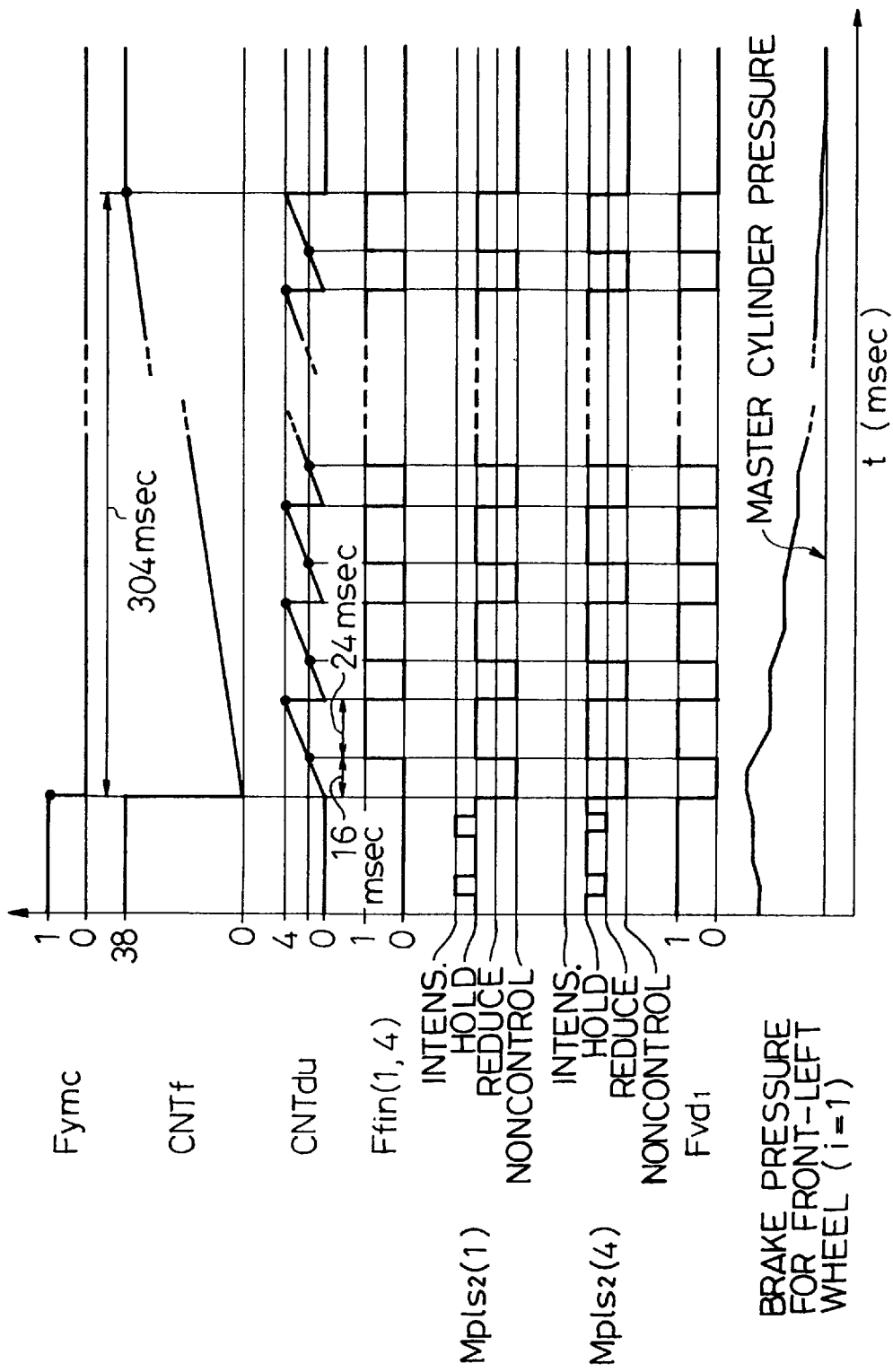
FIG. 30 is a time chart showing the time-dependent changes of termination flags Ffin(i) and the like set in accordance with the terminal control routine of FIG. 29 when the vehicle turns clockwise.

FIG. 29 is a flowchart showing a termination control routine, and FIG. 30 shows the time-dependent changes of the termination flags Ffin(i) and the like set with reference to the flowchart of FIG. 29 when the vehicle turns clockwise. Referring now to FIGS. 29 and 30, the termination control will be described.

In Step S650 shown in FIG. 29, it is first determined whether or not the value of the control beginning/ending flag Fymc has been changed from 1 to 0, that is, whether or not the yaw moment control termination command is delivered. If the determination result is Yes, that is, if the value of the flag Fymc is concluded to have been changed from 1 to 0, the program advances to Step S652.

In Step S652, the value in the counter CNTf, which is counted up for the aforesaid fixed period (e.g., 304 msec), is reset at 0. Also, the turn flag Fd at the time of delivery of the yaw moment control termination command is held as a termination turn flag Fdf, whereupon the program advances to Step S654.

If the result of the determination in Step S650 is No, that is, if the value of the flag Fymc is not concluded to have been changed from 1 to 0, on the other hand, the program advances to Step S656. In Step S656, it is determined whether or not the value of the control beginning/ending flag Fymc is 1, to thereby make a determination as to whether or not the yaw moment control is being carried out. If the result of this determination is Yes, the program advances to Step S658, whereupon the maximum value of 38 is set in the counter CNTf, and the program then advances to Step S654. If the result of the determination in Step S656 is No, the program advances directly to Step S654.

In Step S654, it is determined whether or not the value in the counter CNTf is 38. If the determination result is Yes, that is, if 38 is not reached by the value in the counter CNTf or if the time elapsed since the delivery of the yaw moment control termination command is shorter than 304 (38×8) msec, the program advances to Step S660, whereupon the counter CNTf is counted up.

In Step S662, it is determined whether or not the value in a counter CNTdu for counting up to a value corresponding to a predetermined time (e.g., 40 msec) is greater than 4, that is, at 5 or more, which corresponds to 40 (=5×8) msec or more. If the result of this determination is No, that is, if the value in the counter CNTdu is not greater than 4 or if the time elapsed since the resetting of this counter is not concluded to have reached 40 msec, the program advances to Step S664.

In Step S664, it is determined whether or not the value in the counter CNTdu is smaller than 2. If the determination result is Yes, that is, if the value in the counter CNTdu is smaller than 2, the program advances to Step S666.

In Step S666, respective values of all the termination flags Ffin(i) or flags Ffin(1) to Ffin(4), which are control variables for the termination control, are set at 0. In next Step S668, the value in the counter CNTdu is counted up, whereupon the program advances to Step S670.

In Step S670, it is determined whether or not the values of the termination flags Ffin(i) are 1. Since the values of the termination flags Ffin(i) are all 0, as mentioned before, the determination result is No, whereupon the program advances to Step S672.

In Step S672, the actuation mode Mpls1(i) is set and outputted directly as an actuation mode Mpls2(i). Accordingly, in this case, the switch 113 of FIG. 28 is held in the state illustrated, and the actuation mode Mpls(i) based on the control mode M(i) set in accordance with the value of the output Fymc of the control start/end determination section 80 shown in FIG. 15 is outputted as it is. Since the end of the control is already determined in the determination section 80 so that the value of Fymc is 0, in this case, the actuation mode Mpls(i) or Mpls1(i) is set to the noncontrol mode, so that the actuation mode Mpls2(i) is set to the noncontrol mode when it is outputted (see FIG. 30).

When the value in the counter CNTdu is counted up to 2 as this routine is executed repeatedly, the result of the determination in Step S664 becomes No. In this case, the program advances to Step S678, whereupon it is determined whether or not the value in the termination turn flag Fdf is 1. If the determination result is Yes, that is, if the value of the flag Fdf is 1, which is indicative of a clockwise turn of the vehicle, the program advances to Step S680, whereupon the respective values of only the flags Ffin(1) and Ffin(4), among the other termination flags Ffin(i), are set at 1. If the value of the termination turn flag Fdf is 0, which is indicative of a counterclockwise turn of the vehicle, on the other hand, the program advances to Step S682, whereupon the respective values of only the termination flags Ffin(2) and Ffin(3) are set at 1.

If the values of the termination flags Ffin(1) and Ffin(4) or Ffin(2) and Ffin(3) are set at 1 in this manner, the result of the determination in Step S670, which is executed directly after Step S668, is Yes, whereupon the program advances to Step S684. In this case, the switch 113 of FIG. 28 is shifted to the hold side, and the actuation mode Mpls2(i) set to the hold mode is delivered from the switch 113. Thereafter, the routine concerned is executed repeatedly, and the hold mode continues to be outputted for a predetermined time (e.g., 24 msec) until the result of the determination in Step S662 becomes Yes, that is, a predetermined cycle (e.g., 40 msec) is over. When the result of the determination in Step S662 becomes Yes, the value in the counter CNTdu is reset at 0 in next Step S676.

In this manner, the hold mode continues to be set as the actuation mode Mpls2(i) for the predetermined time (e.g., 24 msec) with every predetermined cycle (e.g., 40 msec). The value of a cut actuation flag Fvd1, which is referred to in actuating the cutoff valve 19 as will be mentioned later, is kept at 0 while the noncontrol mode is set as the actuation mode Mpls2(i). On the other hand, while the hold mode is set as the actuation mode Mpls2(i), the value of the flag Fvd1 is 1. As described in detail later, therefore, the brake pressure applied to an intensify-pressure-side wheel, e.g., the front-left wheel (i=1) in this case, is repeatedly reduced and held in the manner shown in FIG. 30. Thus, the brake pressure gradually attenuates without a drastic change.

If the result of the determination in Step S654 is No, that is, if the value in the counter CNTf reaches 38, which indicates that a fixed period (e.g., 304 msec) is over, Step S674 is executed. Thereupon, the respective values of the flags Ffin(1) and Ffin(4) are set at 0, and the value in the counter CNTdu is also reset at 0. Thus, the termination control for terminating the yaw moment control is completed, whereupon the brake pressure becomes equal to the fluid pressure in the master cylinder 1, as shown in FIG. 30.

Referring again to FIG. 15, the switch 114 is shifted according to the pre-pressurization flags Fpre1 and Fpre2 that are delivered from the pre-pressurization control determination section 100, already described with reference to FIG. 15. When the switch 114 receives the pre-pressurization flag Fpre1=1 or Fpre2=1, it outputs an actuation mode Mpls3(i), which is obtained by compulsorily changing the control mode for the wheel to be subjected to the turn control in the actuation mode Mpls(i) to the hold mode. In the case of Fpre1=Fpre2=0, on the other hand, the actuation mode Mpls(i) is outputted as it is.

According to the above description referring to FIG. 15, the control mode M(i) and the actuation mode Mpls(i) are set in response to the output of the control beginning/ending flag Fymc=1 from the control start/end determination section 80. However, setting the modes M(i) and Mpls(i) is executed irrespective of the value, 1 or 0, of the flag Fymc. Even if the actuation mode Mpls3(i) is set as the actuation mode Mpls(i) so that the pre-pressurization control is started, therefore, the brake pressure for the target wheel to be subject to the yaw moment control cannot be adversely affected before the start of the yaw moment control.

The switch 115 is shifted in accordance with a release flag Frp delivered from a pedal release determination section 120. When the brake pedal 3 is released during the yaw moment control while braking, the determination section 120 sets the release flag Frp at 1 for a predetermined time (e.g., 64 msec). When the switch 115 receives the release flag Frp=1, it outputs an actuation mode Mpls4(i) in which the reduce-pressure mode is set as the control mode for each of the front-left, front-right, rear-left and rear-right wheels, instead of the actuation mode Mpls(i). In the case of a release flag Frp=0, the actuation mode Mpls(i) is outputted as it is.

The release flag Frp is also supplied to a switch 121. In the case of Frp=1, the switch 121 outputs the pulse width Wy(i), which is obtained by compulsorily modifying the value of the pulse width Wpls(i) into the control period T (=8 msec). In the case of Frp=0, the pulse width Wpls(i) is outputted as the pulse width Wy(i) as it is.

The switch 116 is shifted according to an augmented depression flag Fpp delivered from an augmented depression determination section 122. The flag Fpp is set in the aforementioned manner in accordance with the routine shown in FIG. 6. When the switch 116 receives Fpp=1, it outputs an actuation mode Mpls5(i) in which the noncontrol mode is set as the control mode for each of the front-left, front-right, rear-left and rear-right wheels, instead of the actuation mode Mpls(i). In the case of Fpp=0, the actuation mode Mpls(i) is outputted as it is. When the actuation mode Mpls5(i) is set as the actuation mode, the driver's brake pedal operation can be reflected in the brake pressure for each wheel.

The switch 117 is shifted according to a reverse flag Frev delivered from a reverse determination section 123. The determination section 123 sets the reverse flag Frev at 1 when the reverse gear is selected in the transmission of the vehicle, and otherwise, at 0. When the switch 117 receives the flag Frev=1, it outputs the actuation mode My(i) in which all the control modes for the wheels are compulsorily switched to the noncontrol mode, in place of the actuation mode Mpls(i). In the case of Frev=0, the actuation mode Mpls(i) is outputted as the actuation mode My(i).

As shown in FIG. 15, the actuation mode My(i) delivered from the control signal forced-modification section 111 and the flags delivered from the pre-pressurization control determination section 100 are also supplied to an actuation determination section 124. FIGS. 31 to 34 show the details of the determination section 124.

Figure 31:
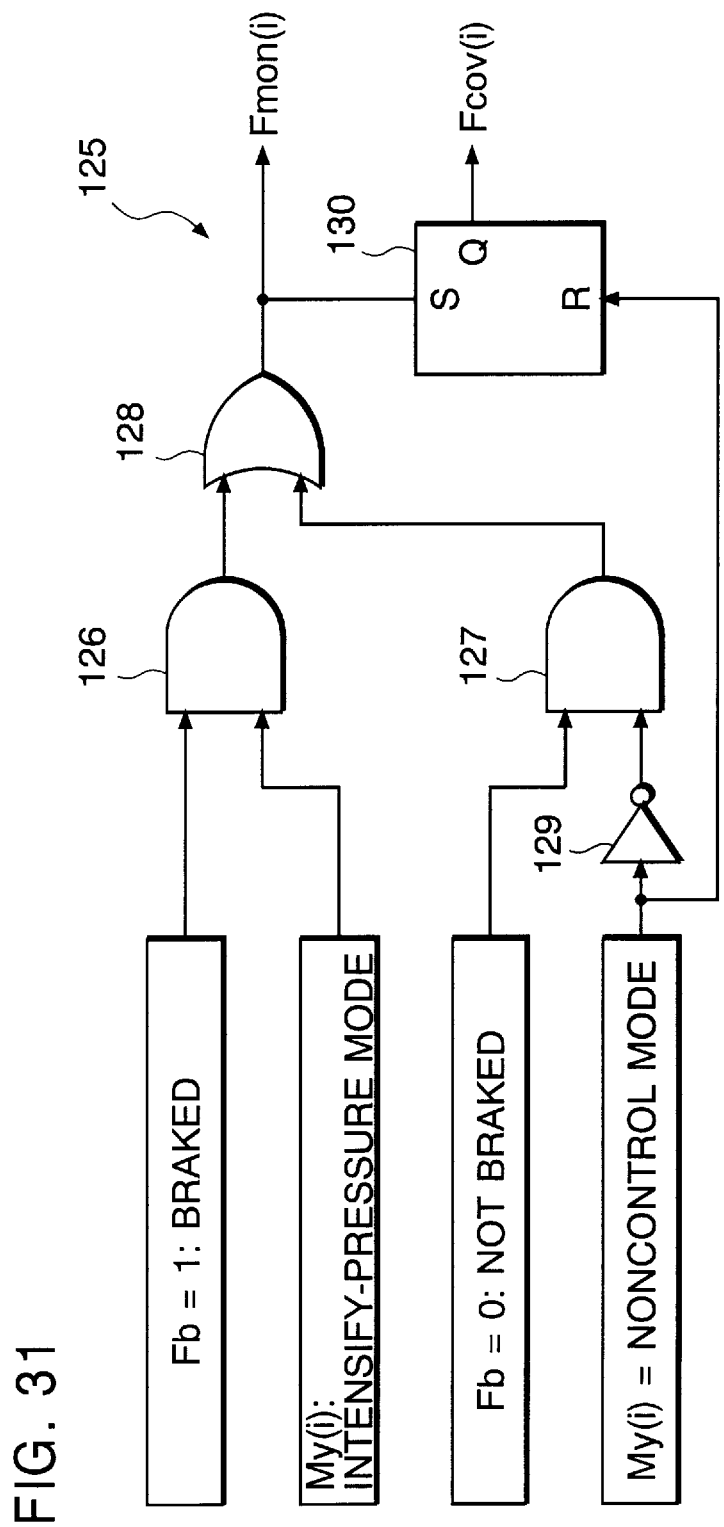
FIG. 31 is a block diagram showing part of an actuation determination section shown in FIG. 15.

First, in a determination circuit 125 shown in FIG. 31, flags Fcov(i) and Fmon(i), which individually indicate requests for the actuation of the cutoff valves 19 and 20 and the motor 18, are set for the wheel cylinder of each wheel.

The determination circuit 125 includes two AND circuits 126 and 127. The one AND circuit 126 delivers the index i, which specifies a wheel for which the intensify-pressure mode is set, to an OR circuit 128 if its input is the brake flag Fb=1 and if the actuation mode My(i) is the intensify-pressure mode.

The other AND circuit 127 delivers the index i, which is indicative of a wheel for which the noncontrol mode is not set, to the OR circuit 128 if its input is the brake flag Fb=0 and if the actuation mode My(i) is not the noncontrol mode. The input on the actuation-mode side of the AND circuit 127 is supplied through a NOT circuit 129.

When the OR circuit 128 receives outputs from the AND circuits 126 and 127, it sets 1 in a request flag Fmon(i) which corresponds to the supplied index i, among other request flags Fmon(i) for requesting the actuation of the motor 18, and outputs the request flag Fmon(i).

The output of the OR circuit 128 is also supplied to the set terminal of the flip-flop 130. The reset terminal is supplied with a reset signal for an index I for which the noncontrol mode is set as the actuation mode My(i).

When the set terminal of the flip-flop 130 is supplied with the request flag Fmon(i)=1, the flip-flop 130 sets 1 in a request flag Fcov(i) which corresponds to the index i among the request flags Fcov(i) requesting the actuation of the cutoff valves 19 and 20, and continues to output the request flag Fcov(i). When a reset signal is received, the values of all request flags Fcov(i) are reset at 0.

Figure 32:
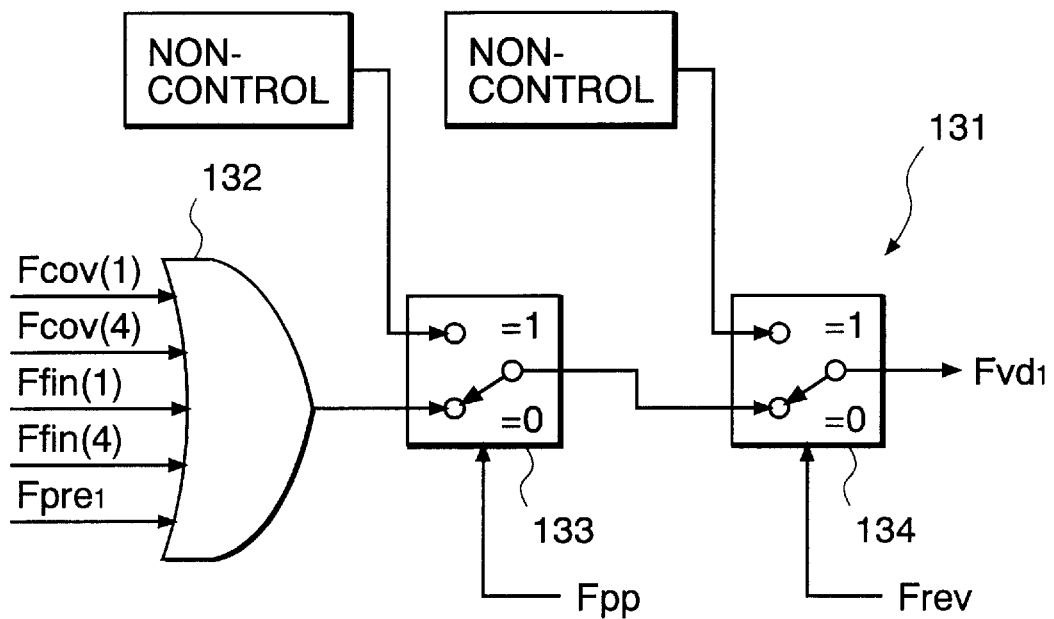
FIG. 32 is a diagram similar to FIG. 31.

A determination circuit 131 shown in FIG. 32 includes an OR circuit 132. The circuit 132 outputs 1 as the value of the cut actuation flag Fvd1 for actuating the cutoff valve 19, if any of the values of request flags Fcov(1) and Fcov(4), termination flags Ffin(1) and Ffin(4), and pre-pressurization flag Fpre1 is 1, which flag values are inputted to this circuit and associated with the cutoff valve 19 on the side of the front-left and rear-right wheels $FW_L$ and $RW_R$.

The cut actuation flag Fvd1 from the OR circuit 132 is outputted via switches 133 and 134. The switches 133 and 134 are shifted according to the augmented depression flag Fpp and the reverse flag Frev, respectively. Thus, even though the output of the OR circuit 132 is Fvd1=1, the cut actuation flag Fvd1 is reset at 0 (noncontrol mode) if either of the flags Fpp and Frev is set at 1.

Figure 33:
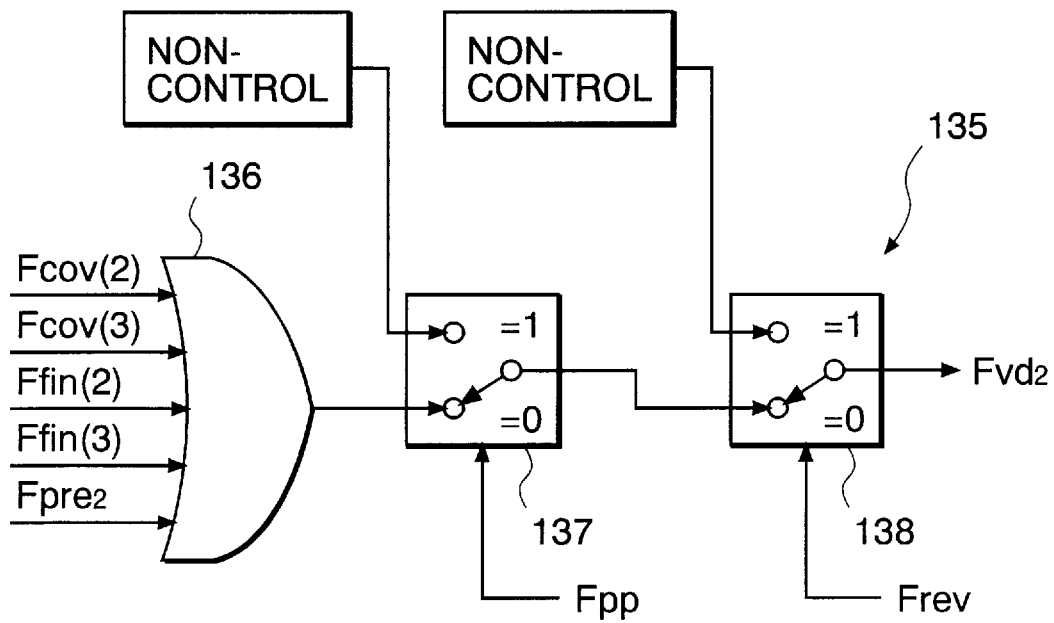
FIG. 33 is a diagram similar to FIG. 31.

A determination circuit 135 shown in FIG. 33 has the same construction and function as the determination circuit 131 of FIG. 32. However, the circuit 135 differs from the circuit 131 in that its OR circuit 136 is supplied with request flags Fcov(2) and Fcov(3), termination flags Ffin(2) and Ffin(3), and pre-pressurization flag Fpre2, which are associated with the cutoff valve 20 on the side of the front-right and rear-left wheels $FW_R$ and $RW_L$. The OR circuit 136 outputs a cut actuation flag Fvd2 for actuating the cutoff valve 20 via switches 137 and 138.

Figure 34:
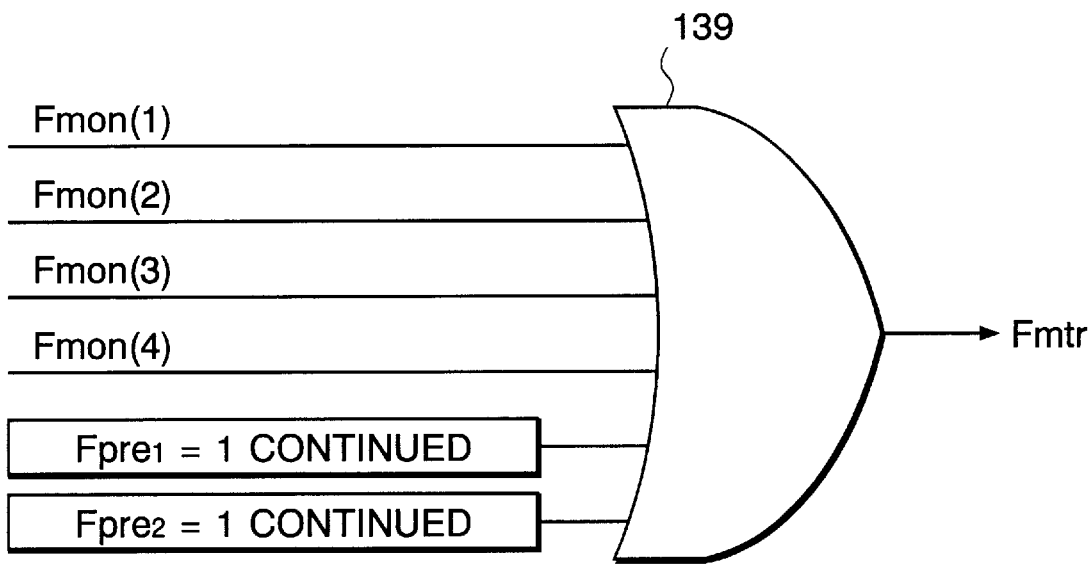
FIG. 34 is a diagram similar to FIG. 31.

The determination circuit or OR circuit 139 of FIG. 34 is supplied with the request flag Fmon(i), which indicates the presence/absence of the request for the actuation of the motor 18 for each wheel, and the pre-pressurization flags Fpre1 and Fpre2, which are indicative of the execution of the pre-pressurization control. If any of the flag values is 1, the value of the motor actuation flag Fmtr is outputted as 1.

ABS Cooperation Control

When the actuation mode My(i), pulse width Wy(i), cut actuation flags Fvd1 and Fvd2, and motor actuation flag Fmtr are set in the yaw moment control described above, ABS cooperation control is carried out (see determination section 78a of FIG. 3 and Step S7 of FIG. 4).

When the ABS control is effected, the ABS cooperation control is carried out to execute the yaw moment control in cooperation with the ABS control. In this ABS cooperation control, actuation modes Mabs(i) and pulse widths Wabs(i) for the individual wheels are set in consideration of the ABS control.

A detailed description of the setting of the actuation modes Mabs(i) and the pulse widths Wabs(i) will be omitted. It is to be noted, however, that the functions of the intensify-pressure/reduce-pressure inhibitory section 90 (see FIGS. 15 and 22) and the control signal forced-modification section 111 (see FIGS. 15 and 28) are reflected also in the actuation modes Mabs(i) and the pulse widths Wabs(i).

The following is a description of a function of the ABS cooperation control. In the case where the vehicle requires the turning moment (M+) or restoration moment M(−) while it is turning under the ABS control, the actuation modes Mabs(i) and the pulse widths Wabs(i) are set in the following manner in the ABS cooperation control.

Figure 35:
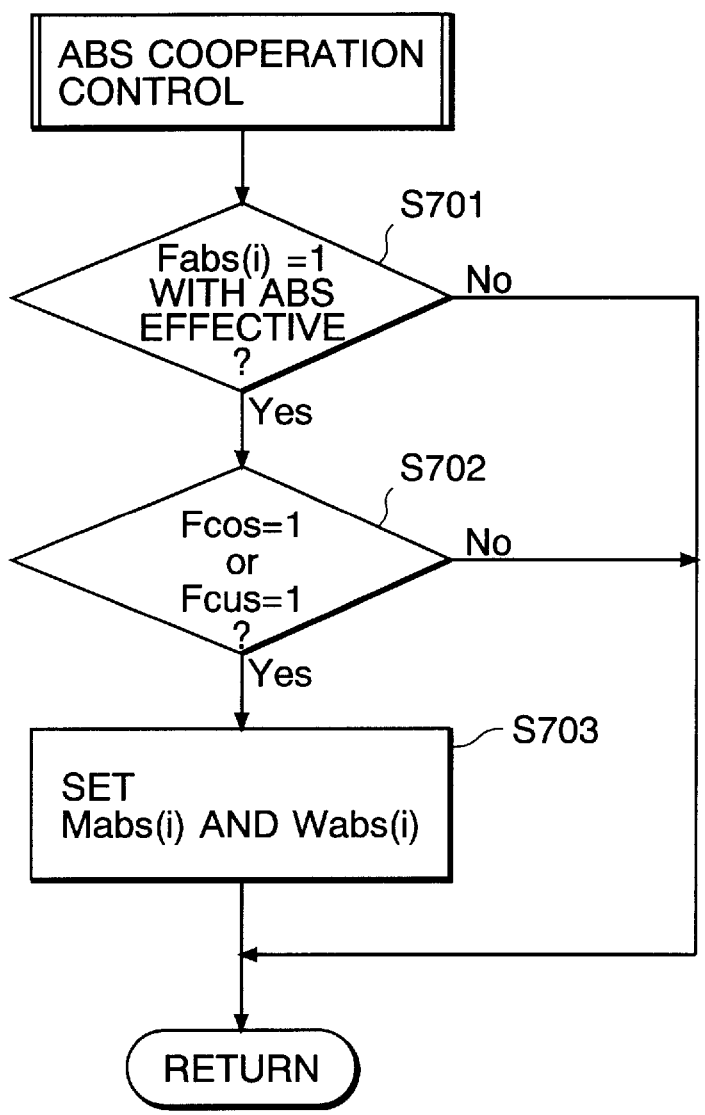
FIG. 35 is a flowchart showing an ABS cooperation control routine.

In Step S701 of an ABS cooperation routine shown in FIG. 35, it is determined whether or not the ABS control is being carried out. This determination is made based on whether or not the flag Fabs(i), which indicates the execution of the ABS control for each wheel, is 1. As is generally known, the flag Fabs(i) is set in an ABS control routine (not shown) in accordance with the trend of change of the slip factor of the wheel concerned.

If the result of the determination in Step S701 is Yes, it is determined whether or not the control execution flag Fcus or Fcos for the brake pressure control is 1 (Step S702). If the result of this determination is Yes, that is, if it is concluded that the vehicle requires the turning moment (M+) or restoration moment M(−) while it is turning, the actuation modes Mabs(i) and the pulse widths Wabs(i) are set in the following manner in next Step S703.

In the case where the yaw moment control is executed for a diagonal pair of wheels:

(1) To obtain the turning moment (M+) further, the outside front wheel FW in a turn is set in the reduce-pressure mode, and the pulse width concerned is set at the same value as that of the inside front wheel FW.

(2) To obtain the restoration moment M(−) further, the inside rear wheel RW in a turn is set in the reduce-pressure mode, and the pulse width concerned is set at the same value as that of the outside rear wheel RW.

The yaw moment control can be executed to a pair of right and left wheels on the front or rear side, as well as to the diagonal pair.

In executing the yaw moment control on the basis of the difference in braking force between left- and right-hand wheels, the restoration moment M(−) can be generated in the vehicle by setting the braking forces for the outside and inside wheels in the intensify-pressure and reduce-pressure modes, respectively. On the other hand, the turning moment M(+) can be generated in the vehicle by setting the braking forces for the outside and inside wheels in the reduce-pressure and intensify-pressure modes, respectively.

In order to obtain the turning moment M(+) further, in the case where the yaw moment control is executed for the rear-left and rear-right wheels, therefore, the outside rear wheel is set in the reduce-pressure mode, and the pulse width for the outside rear wheel is set to the same width as that for the inside rear wheel. In order to obtain the restoration moment M(−) further, in the case where the yaw moment control is executed for the front-left and front-right wheels, in contrast with this, the inside front wheel is set in the reduce-pressure mode, and the pulse width for the inside front wheel is set to the same width as that for the outside front wheel.

If either of the results of the determinations in Step S701 and S702 is No, on the other hand, this routine is terminated without the execution of Step S703.

Selection of Control Signals

Figure 36:
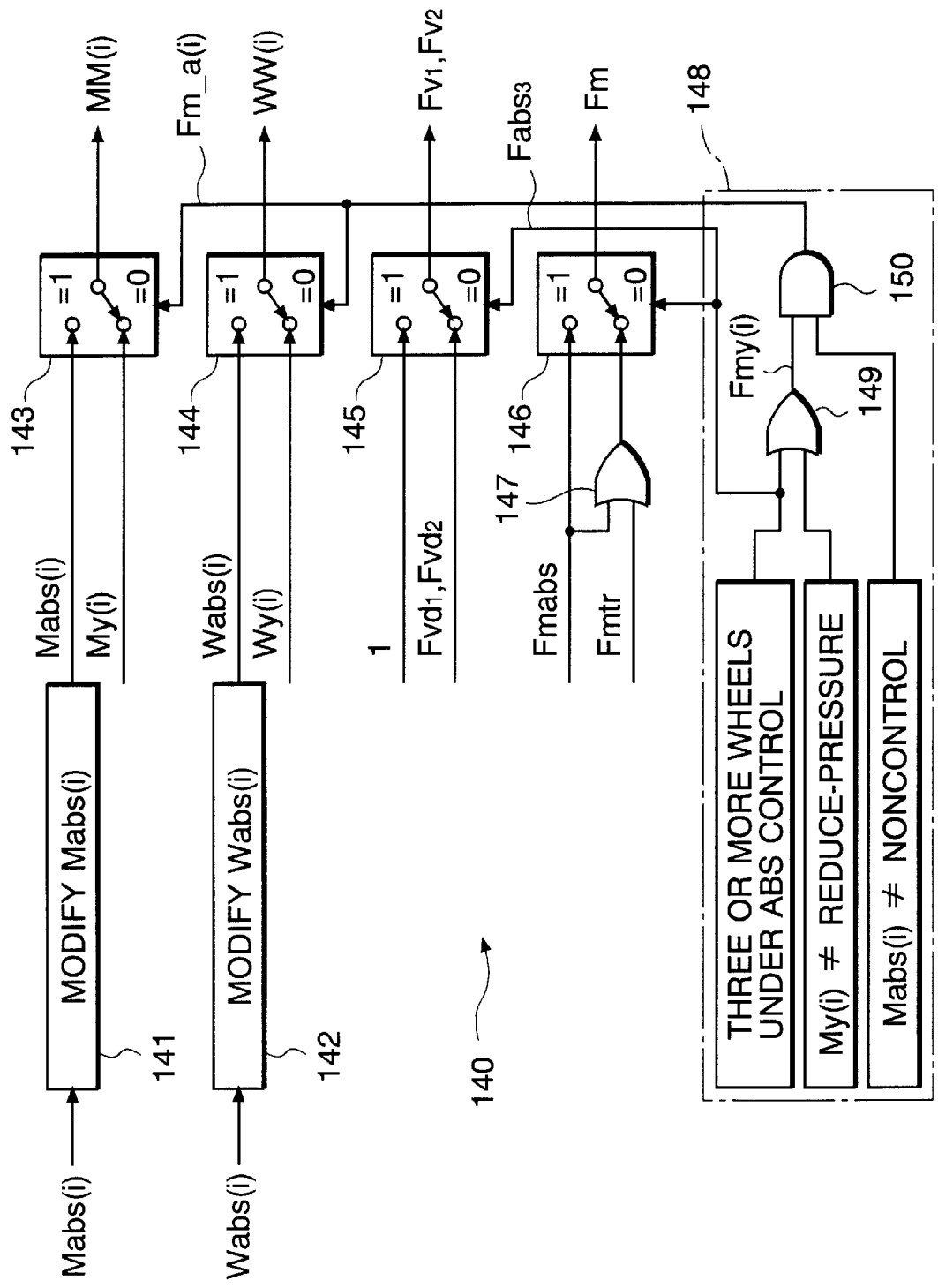
FIG. 36 is a block diagram showing the details of a control signal selecting section shown in FIG. 3.

When the routine for cooperation with ABS control, that is, Step S7 of FIG. 4, is finished, a control signal selection routine is carried out in next Step S8 by means of a selecting circuit 140 shown in FIGS. 3 and 36. FIG. 36 also shows blocks 141 and 142 for carrying out the ABS cooperation routine of FIG. 35.

The selecting circuit 140 is provided with four switches 143 to 146. The switch 143 is supplied with the actuation modes Mabs(i) passed through the block 141 and the actuation mode My(i) set during the aforesaid yaw moment control. The switch 144 is supplied with the pulse width Wabs(i) passed through the block 142 and the pulse width Wy(i) set during the yaw moment control.

The switch 145 is supplied with the cut actuation flags Fvd1 and Fvd2, set during the yaw moment control, and a value of 1. The switch 146 is supplied with the motor actuation flag Fmtr, set during the yaw moment control, through an OR circuit 147, and also with a motor actuation flag Fmabs for the ABS control. The flag Fmabs is also supplied to the other input terminal of the OR circuit 147. The motor actuation flag Fmabs is a flag that is set by the ABS control itself, and Fmabs=1 is set at the start of the ABS control.

The switches 143 to 146 are shifted in response to flags delivered from a determination section 148. The determination section 148 includes an OR circuit 149, which delivers a flag Fmy(i)=1, in respect of the index i corresponding to a wheel for which the reduce-pressure mode is set, to an AND circuit 150 in the case where three or more wheels are under the ABS control or the actuation mode My(i) for the yaw moment control is not the reduce-pressure mode. When three or more wheels are under the ABS control, a flag Fabs3=1 is supplied to the switches 145 and 146.

When the actuation mode Mabs(i) for the ABS cooperation control is not the noncontrol mode, an actuation mode Mabs(i)=1 is applied to the AND circuit 150. If the AND circuit 150 is supplied with both the flag Fmy(i)=1 and Mabs(i)=1 with respect to a certain index i, a flag Fm_a(i)=1 for this index i is delivered from the AND circuit 150 to the switches 143 and 144.

If three or more wheels are under the ABS control, the flag Fabs3=1 is supplied from the determination section 148 to each of the switches 145 and 146. Accordingly, the switch 145 outputs a value of 1 as flags Fv1 and Fv2 (Fv1=Fv2=1), while the switch 146 outputs the motor actuation flag Fmabs as Fm. In the case where a flag Fabs3=0 is supplied to the switches 145 and 146, on the other hand, the switch 145 outputs the cut actuation flags Fvd1 and Fvd2 as the flags Fv1 and Fv2, respectively, while the switch 146 outputs the motor actuation flag Fmtr as Fm. Since the motor actuation flag Fmabs is supplied to the switch 146 through the OR circuit 147, the motor actuation flag Fm=1 is delivered from the switch 146 when either the flag Fmabs or Fmtr is set at 1 without regard to the shift of the switch 146.

If input conditions for the AND circuit 150 are met, on the other hand, the flag Fm_a(i)=1 is supplied from the circuit 150 to the switches 143 and 144. In this case, the switch 143 outputs the actuation mode Mabs(i) as an actuation mode MM(i), while switch 144 outputs the pulse width Wabs(i) as a pulse width WW(i). In the case where a flag Fm_a(i)=0 is supplied to the switches 143 and 144, in contrast with this, the switch 143 outputs the actuation mode My(i) as the actuation mode MM(i), while switch 144 outputs the pulse width Wy(i) as the pulse width WW(i).

Drive Signal Initial Setting

When the actuation mode MM(i) and the pulse width WW(i) are delivered from the control signal selecting circuit 140, they are set as an actual actuation mode Mexe(i) and an actual pulse width Wexe(i), respectively, by the drive signal initial setting section 151 of FIG. 3 in Step S9 of FIG. 4, and initial values are given to the actual actuation mode Mexe(i) and the actual pulse width Wexe(i), individually.

Figure 37:
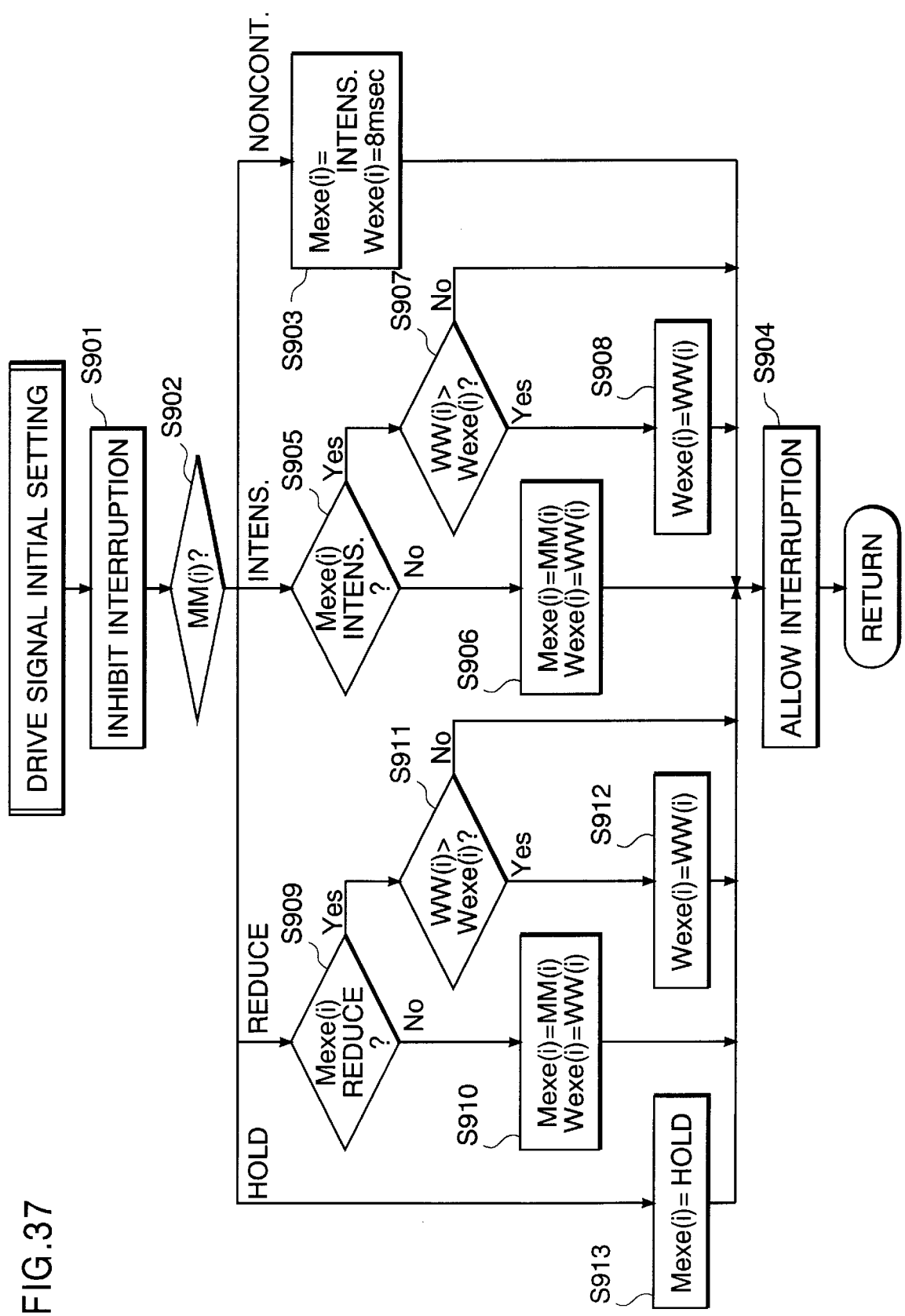
FIG. 37 is a flowchart showing a drive signal initial setting routine.

Step S9 is shown in detail in the flowchart of FIG. 37. After an interruption inhibiting process is first executed (Step S901), the actuation mode MM(i) is discriminated (Step S902).

If the result of the determination in Step S902 indicates the noncontrol mode, the intensify-pressure mode is set as the actual actuation mode Mexe(i), and the control period T (=8 msec) for the main routine is set as the actual pulse width Wexe(i) (Step S903). After an interruption permitting process is executed (Step S904), the routine concerned is finished.

If the result of the determination in Step S902 indicates the intensify-pressure mode, it is determined whether or not the actual actuation mode Mexe(i) is the intensify-pressure mode (Step S905). Since the actual actuation mode Mexe(i) is not set as yet at this point of time, the determination result is No. In this case, the actuation mode MM(i) or intensify-pressure mode is set as the actual actuation mode Mexe(i), and the pulse width WW(i) is set as the actual pulse width Wexe(i) (Step S906). Thereafter, the routine concerned is terminated after the execution of Step S904.

If it is concluded in Step S902 that the intensify-pressure mode is also maintained when the routine is executed at the next cycle, the result of the determination in Step S905 is Yes, whereupon it is determined whether or not the pulse width WW(i) is greater than the actual pulse width Wexe(i) (Step S907). Since the main routine is executed with every control period T, the pulse width WW(i) is newly set with every control period T. As mentioned later, however, the actual pulse width Wexe(i) decreases as the inlet or outlet valve is actually actuated. If it is concluded in Step S907 that the newly set pulse width WW(i) is longer than the remaining actual pulse width Wexe(i) at the present point of time, therefore, a new pulse width WW(i) is set as the actual pulse width Wexe(i) (Step S908). If the result of the determination in Step S907 is No, however, the remaining actual pulse width Wexe(i) is maintained without resetting the new pulse width WW(i) as the actual pulse width Wexe(i).

If the result of the determination in Step S902 indicates the reduce-pressure mode, on the other hand, Steps S909 to S912 are executed, whereupon the actual actuation mode Mexe(i) and the actual pulse width Wexe(i) are set in the same manner as in the case of the intensify-pressure mode.

If the result of the determination in Step S902 indicates the reduce-pressure mode, moreover, the hold mode is set as the actual actuation mode Mexe(i) (Step S913).

Drive Signal Outputting

When the actual actuation mode Mexe(i) and the actual pulse width Wexe(i) are set in the manner described above, they are delivered from the drive signal initial setting section 151 to the valve actuating section 152, as shown in FIG. 3, and Step S10 of the main routine shown in FIG. 4 is executed.

In Step S10, drive signals for driving the cutoff valves 19 and 20 and the motor 18 are also outputted in accordance with the cut actuation flags Fv1 and Fv2 and the motor actuation flag Fm set in the foregoing control signal selection routine, as well as the actual actuation mode Mexe(i) and the actual pulse width Wexe(i).

A drive signal for closing the cutoff valve 19 is outputted if the cut actuation flag Fv1 is 1 (Fv1=1), while a drive signal for closing the cutoff valve 20 is outputted if the cut actuation flag Fv2 is 1 (Fv2=1). If the cut actuation flags F1 and Fv2 are reset at 0, in contrast with this, the cutoff valves 19 and 20 are kept open. In the case where the motor actuation flag Fm is 1 (Fm=1), on the other hand, a drive signal for actuating the motor 18 is outputted. In the case of Fm=0, the motor 18 is not actuated.

Actuation of Inlet and Outlet Valves

Figure 38:
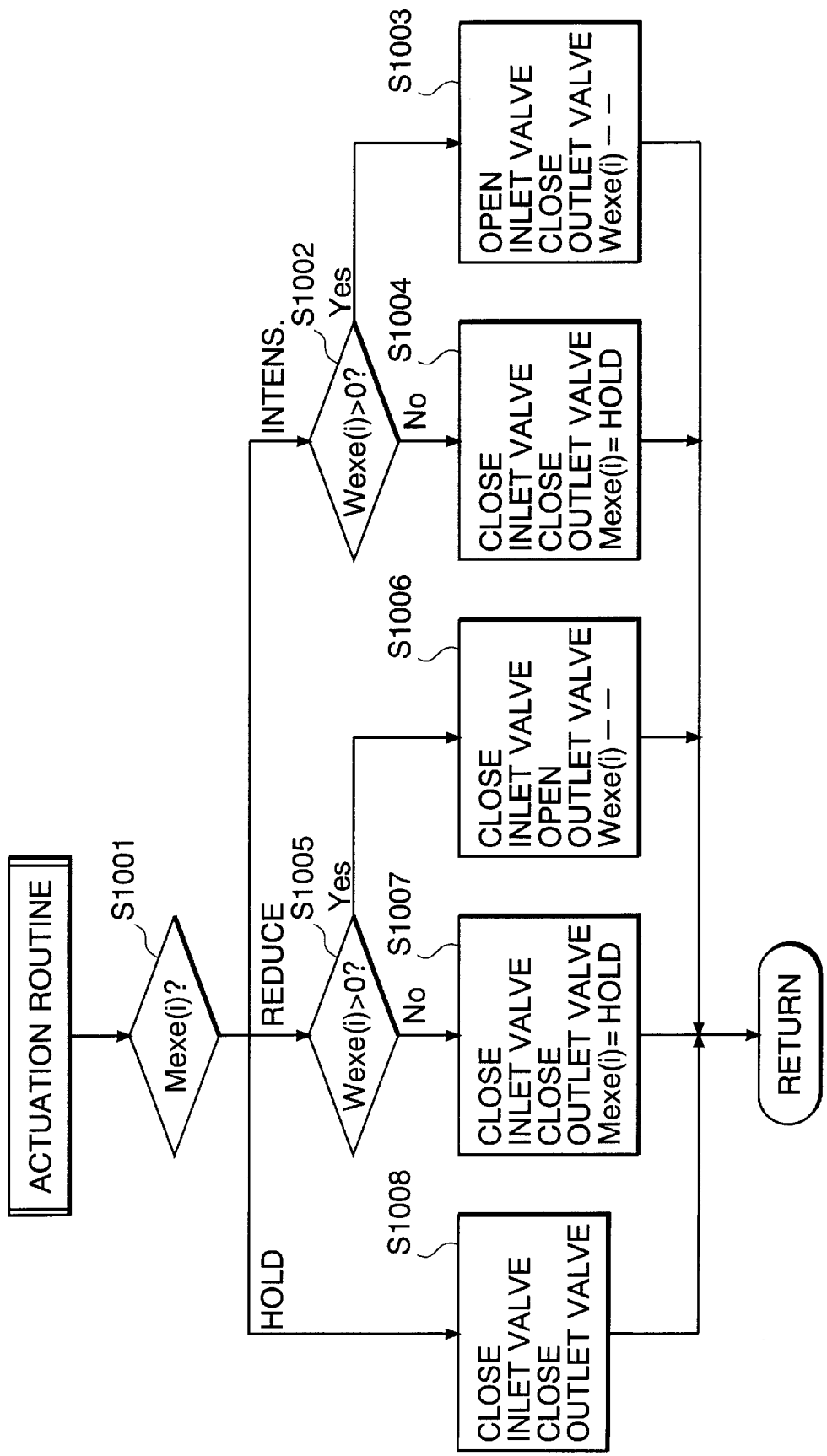
FIG. 38 is a flowchart showing an actuation routine.

When the valve actuating section 152 is supplied with the actual actuation mode Mexe(i) and the actual pulse width Wexe(i), it actuates the inlet and outlet valves 12 and 13 according to an actuation routine shown in FIG. 38. The actuation routine of FIG. 38 is executed independently of the main routine of FIG. 4, and its execution period is, for example, 1 msec.

In the actuation routine, the actual actuation mode Mexe(i) is first determined (Step S1001). If the actual actuation mode Mexe(i) is determined in this determination as being the intensify-pressure mode, a determination is made as to whether or not the actual pulse width Wexe(i) is greater than 0 (Step S1002). If the result of this determination is Yes, the inlet valve 12 for the wheel concerned is opened and the outlet valve 13 therefor is closed. The actual pulse width Wexe(i) is reduced by its execution period (Step S1003). When Step S1003 is carried out, therefore, the pressure for the wheel brake corresponding to the target wheel is increased if the motor 18 is already actuated and if the corresponding cutoff valve 19 or 20 is closed.

If the result of the determination in Step S1002 becomes No as the actuation routine is executed repeatedly with the intensify-pressure mode maintained as the actual actuation mode Mexe(i), both the inlet and outlet valves 12 and 13 for the wheel concerned are closed, and the pressure-hold mode is set as the actual actuation mode Mexe(i) (Step S1004).

If it is concluded in Step S1001 that the actual actuation mode Mexe(i) is the reduce-pressure mode, it is determined whether or not the actual pulse width Wexe(i) is greater than 0 (Step S1005). If the result of this determination is Yes, the inlet valve 12 for the wheel concerned is closed, whereas the outlet valve 13 therefor is opened, and the actual pulse width Wexe(i) is reduced by its execution period (Step S1006). When Step S1006 is carried out, therefore, the pressure for the wheel brake corresponding to the target wheel is decreased.

Also in this case, the actuation routine is executed repeatedly with the reduce-pressure mode maintained as the actual actuation mode Mexe(i). If the result of the determination in Step S1005 then becomes No, both the inlet and outlet valves 12 and 13 for the wheel concerned are closed, and the pressure-hold mode is set as the actual actuation mode Mexe(i) (Step S1007).

If it is concluded in Step S1001 that the actual actuation mode Mexe(i) is the pressure-hold mode, both the inlet and outlet valves 12 and 13 for the wheel concerned are closed (Step S1008).

Figure 39:
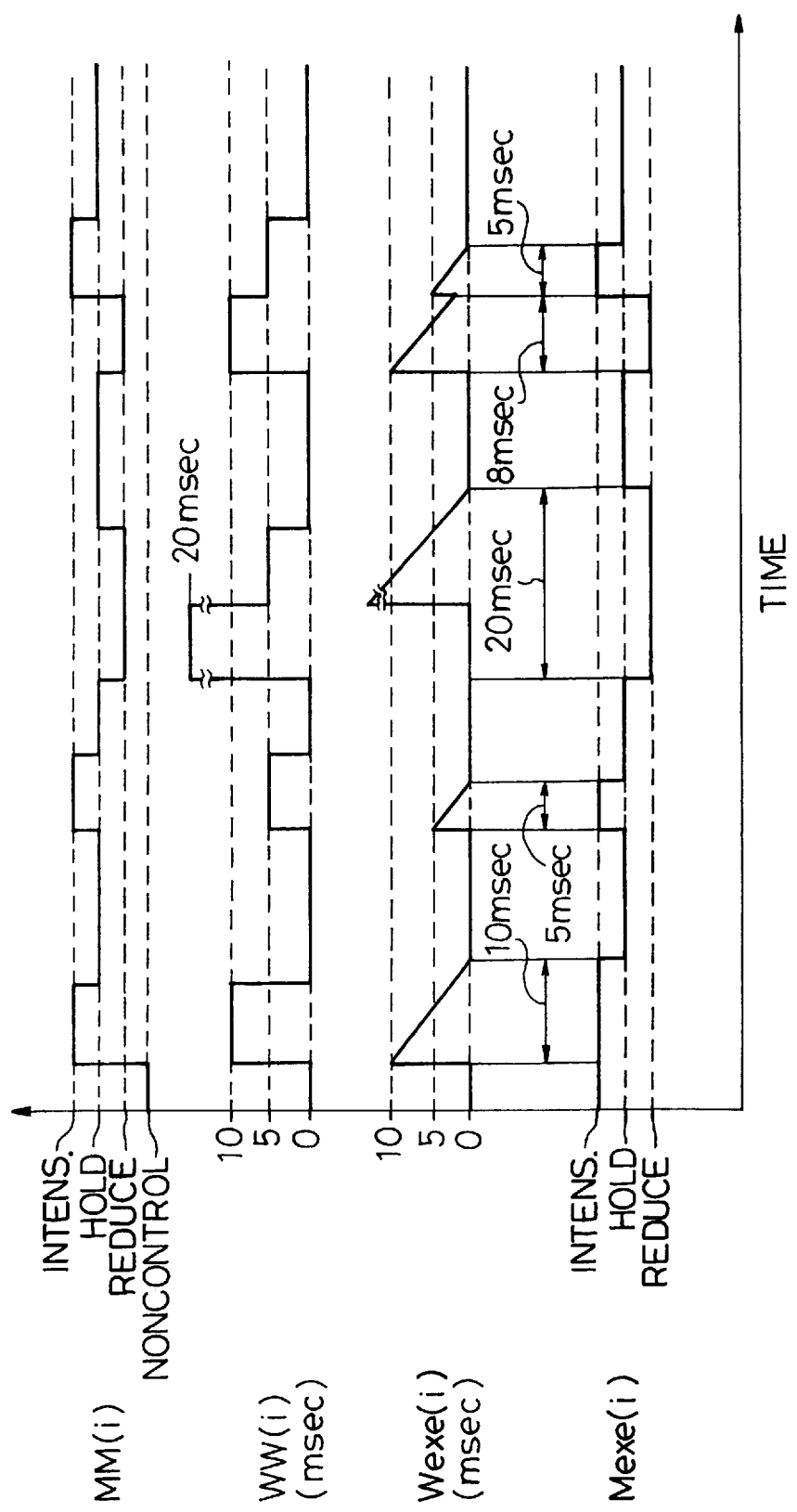
FIG. 39 is a time chart showing the relations between actuation mode MM(i), pulse width WW(i), actual actuation mode Mexe(i), and actual pulse width Wexe(i)

Referring to FIG. 39, there is shown a time chart illustrating the relations between the actuation mode MM(i), pulse width WW(i), actual actuation mode Mexe(i), and actual pulse width Wexe(i).

Effect of Yaw Moment Control

Diagonal Wheel Control

Let it be supposed that the vehicle is running and the main routine of FIG. 4 is being executed repeatedly. It can be concluded that the vehicle is turning clockwise if the turn flag Fd indicative of a turn of the vehicle is set at 1 (Fd=1) in Step S3 of the main routine or in a turn determination routine shown in FIG. 8 in accordance the steering-wheel angle $\theta$ and the yaw rate $\gamma$.

Clockwise Turn

Thereafter, the required yaw moment $\gamma$d is obtained by executing Steps S4 and S5 of the main routine. When the yaw moment control of Step S6 is executed, the control mode selection routine of FIG. 19 is executed to set the control mode M(i) for each wheel on condition that the control beginning/ending flag Fymc (see the determination circuit of FIG. 17) is 1 (Fymc=1) in the yaw moment control.

Since the vehicle is supposed to be turning clockwise, the result of the determination in Step S601, in the selection routine of FIG. 19, is Yes, whereupon Step S602 and the subsequent steps are carried out.

US-Prone Clockwise Turn

In this case, if the result of the determination in Step S602 is Yes, that is, if the vehicle has a marked tendency to US with the control execution flag Fcus=1, the reduce-pressure and intensify-pressure modes are set as the control modes M(1) and M(4) for the front-left (outside front) wheel $FW_L$ and the rear-right (inside rear) wheel $RW_R$, respectively, and the noncontrol mode as the control modes M(2) and M(3) for the other two wheels (see Table 1 and Step S603).

Based on the control mode M(i) and the required yaw moment $\gamma$d for each wheel, thereafter, the actuation mode Mpls(i) is set in the aforementioned manner (see the setting routine of FIG. 21), and the pulse width Wpls(i) for each wheel is set. The actuation mode Mpls(i) and the pulse width Wpls(i) are brought into the actuation mode My(i) and the pulse width Wy(i), respectively, by the intensify-pressure/reduce-pressure inhibitory section 90 and the forced-modification section 111 of FIG. 15.

In the determination circuit 125 (FIG. 31) of the actuation determination section 124 of FIG. 15 (the determination circuits shown in FIGS. 31 to 34), on the other hand, the request flag Fmon(i) for each wheel, which requires the actuation of the motor 18, is set at 1 by the AND circuit 126 and the OR circuit 128, while the request flag Fcov(i) for each wheel, which requires the actuation of the cutoff valves 19 and 20, is set at 1 by the flip-flop 130, in the case where the brake flag Fb and the actuation mode My(i) are Fb=1 (brakes on) and the intensify-pressure mode, respectively.

When the vehicle is turning clockwise showing a marked tendency to US with the brake pedal 3 depressed, specifically, the output of the determination circuit 125 is Fmon(4)=Fcov(4)=1, the cut actuation flag Fv1=1 is outputted from the determination circuit 131 (OR circuit 132) of FIG. 32, and the motor actuation flag Fmtr at 1 is delivered from the determination circuit of FIG. 34 or the OR circuit 139. Since the request flag Fcov(2)=Fcov(3)=0 is satisfied, the cut actuation flag Fv2 outputted from the determination circuit 135 (OR circuit 136) of FIG. 33 is 0 (Fvd2=0).

When the vehicle is braked, therefore, only one cut actuation flag, Fvd1 in this case, is set at 1. Thereafter, the cut actuation flag Fvd1=1 and the motor actuation flag Fmtr=1 are brought into Fv1=1, Fv2=0, and Fm=1 by the control signal selecting circuit 140 of FIG. 3 (or switches 145 and 146 in FIG. 36), and these flags are supplied as drive signals to the cutoff valves 19 and 20 and the motor 18. Thus, in this case, the motor 18 is actuated in a state such that only the cutoff valve 19, which is associated with the wheel brakes for the front-left and rear-right wheels $FW_L$ and $RW_R$, is closed, and the cutoff valve 20, which is associated with the wheel brakes for the front-right and rear-left wheels $FW_R$ and $RW_L$, is left open. As the motor 18 is driven in this manner, a pressurized fluid is discharged from the pumps 16 and 17.

When the brake pedal 3 is not depressed, that is, when the vehicle is not braked, the control modes M(1) and M(4) for the front-left and rear-right wheels $FW_L$ and $RW_R$ are not the noncontrol mode, so that a request flag Fmon(1)=Fmon(4) =1 is delivered from the determination circuit 125 through the AND circuit 127 and the OR circuit 128 thereof, and Fcov(1)=Fcov(4)=1 from the flip-flop 130. Also in this case, therefore, the motor actuation flag Fmtr is Fmtr=1, so that the motor 18 or the pumps 16 and 17 are actuated, and only the cut actuation flag Fvd1 is set at 1, whereupon only the cutoff valve 19 is closed.

If the actuation mode Mpls(i) is processed in the control signal forced-modification section 111 (FIG. 15) when the vehicle is not braked, however, the flag Fhld delivered from the noncontrol diagonal hold determination section 118 (FIG. 28) is set at 1, so that the switch 112 is shifted. To be noted, the actuation mode Mpls(i) which is the noncontrol mode is then compulsorily changed to the hold mode.

When the vehicle is not braked (Fb=0), moreover, the correction value Cpi in respect of the calculation of the required yaw moment γd (see FIG. 10) is set at 1.5, which is greater than 1.0 for the case where the vehicle is braked, so that the level of the required yaw moment γd is raised. This rise in level shortens the pulse period Tpls during which the actuation mode Mpls(i) or My(i) is executed. It is to be noted, therefore, that the pressure increase or decrease is executed strongly if the actuation mode My(i) is the intensify-pressure or reduce-pressure mode.

Thereafter, the actuation mode My(i) and the pulse width Wy(i) are set as the actuation mode MM(i) and the pulse width WW(i), respectively, by the control signal selecting circuit 140, as mentioned before. Moreover, the actual actuation mode Mexe(i) and the actual pulse width Wexe(i) are set in accordance with the set values. As a result, the corresponding inlet and outlet valves 12 and 13 are actuated in accordance with the actual actuation mode Mexe(i) and the actual pulse width Wexe(i) (see the actuation routine of FIG. 38).

Specifically, the actual actuation mode Mexe(1) for the wheel brake for the front-left wheel $FW_L$ is the reduce-pressure mode when the vehicle is braked as it makes a clockwise turn showing a marked tendency to US. Accordingly, the inlet and outlet valves 12 and 13 corresponding to the wheel brake concerned are closed and opened, respectively (Step S1006 of FIG. 38), so that the brake pressure for the front-left wheel $FW_L$ is decreased. On the other hand, in this case, the actual actuation mode Mexe(4) for the wheel brake for the rear-right wheel $RW_R$ is the intensify-pressure mode, so that the inlet and outlet valves 12 and 13 corresponding to the wheel brake concerned are opened and closed, respectively (Step S1003 of FIG. 38). At this point of time, the cutoff valve 19 is closed, and the pumps 16 and 17 are actuated by the pump 18, as mentioned before. Accordingly, the pressure in the branch brake line 8 (see FIG. 1), which leads to the wheel brake for the rear-right wheel $RW_R$, is already raised independently of the master cylinder pressure, so that the wheel brake for the rear-right wheel $RW_R$ is supplied with the pressurized fluid from the branch brake line 8 through the inlet valve 12. Thus, the brake pressure for the rear-right wheel $RW_R$ is increased.

Figure 40:
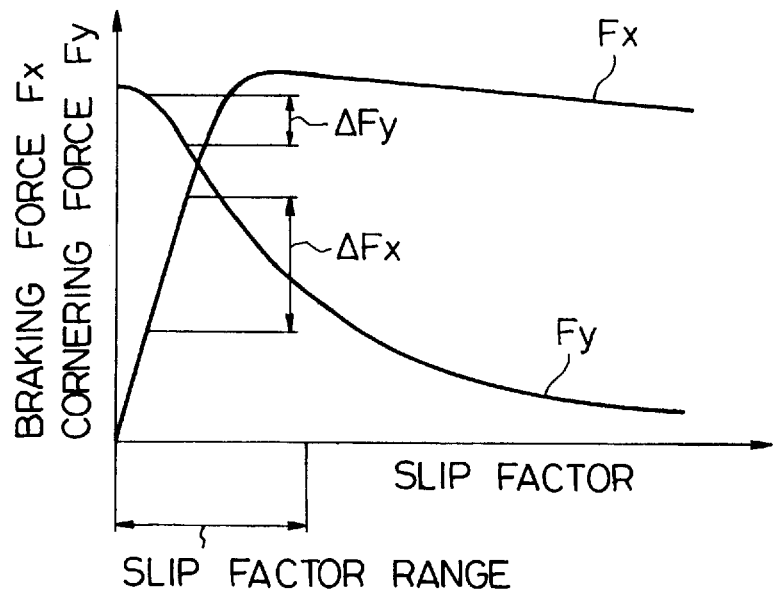
FIG. 40 is a graph showing braking force and cornering force characteristics versus the slip factor.

Referring to FIG. 40 which shows braking force/cornering force characteristics with respect to the slip factor, if the brake pressure or braking force Fx for a wheel decreases, the slip factor also decreases within a slip factor range for the case where the vehicle is in normal running states. If the braking force Fx increases, in contrast with this, the slip factor also increases. The decrease and increase of the slip factor cause the cornering force to increase and decrease, respectively.

Figure 41:
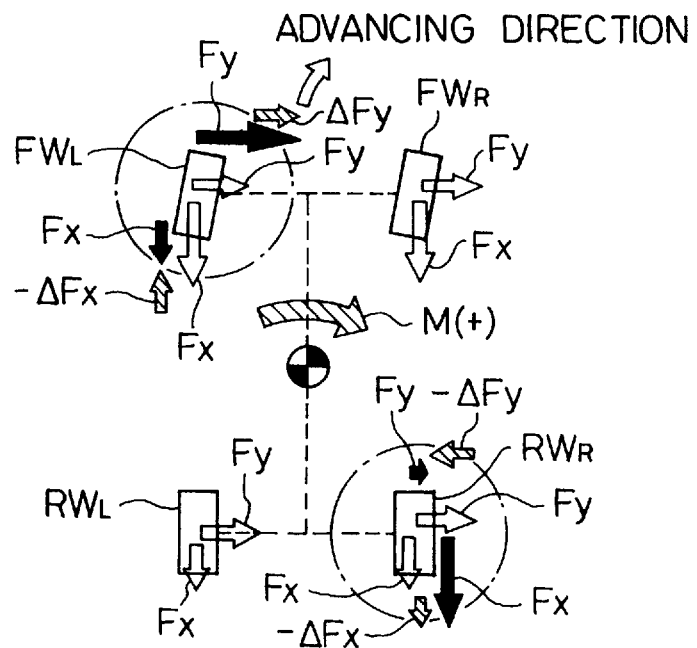
FIG. 41 is a diagram for illustrating the result of execution of yaw moment control obtained when the vehicle is braked while making a US-prone clockwise turn.

If the braking force Fx for the front-left wheel $FW_L$ is decreased from the magnitude indicated by white arrow to the magnitude indicated by black arrow, as shown in FIG. 41, therefore, the cornering force Fy increases from the magnitude indicated by white arrow to the magnitude indicated by black arrow. If the braking force Fx for the rear-right wheel $RW_R$ is increased as indicated by white and black arrows, on the other hand, the cornering force Fy decreases from the magnitude indicated by white arrow to the magnitude indicated by black arrow. Thus, the smaller the braking force Fx on the front-left wheel $FW_L$, the more heavily the cornering force Fy acts on the wheel. The greater the braking force Fx on the rear-right wheel $RW_R$, on the other hand, the smaller the cornering force Fy on the wheel is. Accordingly, the vehicle is subjected to the turning moment M(+) in the direction of its turn.

In FIG. 41, hatched arrows indicate variations ±ΔFx and ±ΔFy of the braking force Fx and the cornering force Fy, respectively.

The inlet and outlet valves 12 and 13 for the front-left and rear-right wheels $FW_L$ and $RW_R$, a diagonal pair of vehicle wheels, are opened and closed in accordance with the actual actuation mode Mexe(i) and the actual pulse width Wexe(i) set on the basis of the required yaw moment γd, so that the turning moment M(+) can be applied properly to the vehicle. Thus, the tendency of the vehicle to US can be removed, so that the vehicle can be prevented from drifting out.

Since the required yaw moment γd is computed in consideration of the operating states and manipulations of the vehicle (see Steps S504 and S505 in the computation routine of FIG. 11), fine yaw moment control can be effected according to the way the vehicle turns by increasing or decreasing the braking forces for the diagonal pair of wheels in accordance with the required yaw moment γd.

For this yaw moment control, moreover, in performing the control end determination, when the vehicle behavior is not stabilized, the control is ended after waiting the elapse of a second end determination time tst2 (for example, 504 msec). On the other hand, when the vehicle behavior is stabilized, the control is ended after waiting the elapse of a first end determination time tst1 (for example, 152 msec), which is shorter than the second end determination time. Therefore, when the vehicle behavior is stabilized, the yaw moment control can be finished quickly without the occurrence of brake dragging feeling.

When the yaw moment control is finished, an end control is carried out in which the actuation mode of wheels to be controlled is periodically switched to the hold mode to gradually decrease the brake pressure (see FIGS. 29 and 30), so that the vehicle behavior can be stabilized very satisfactorily without suddenly changing the brake pressure for the target wheels to be controlled.

OS-Prone Clockwise Turn

If the results of the determinations in Steps S602 and S604 in the control mode selection routine of FIG. 19 are No and Yes, respectively, that is, if the vehicle has a marked tendency to OS with Fcos=1, the intensify-pressure and reduce-pressure modes are set as the control modes M(1) and M(4) for the front-left wheel $FW_L$ and the rear-right wheel $RW_R$, respectively (see Table 1 and Step S605). The OS-prone clockwise turn differs from the US-prone clockwise turn in this respect.

Figure 42:
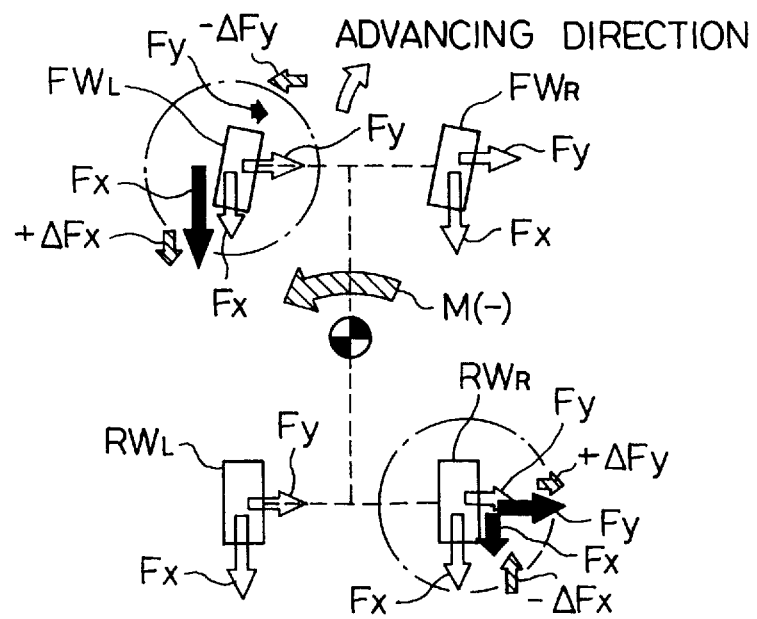
FIG. 42 is a diagram for illustrating the result of execution of yaw moment control obtained when the vehicle is braked while making an OS-prone clockwise turn.

When the vehicle is braked, the braking force Fx and cornering force Fy for the front-left wheel $FW_L$ increase and decrease, respectively, while the forces Fx and Fy for the rear-right wheel $RW_R$ decrease and increase, respectively, as shown in FIG. 42. In this case, therefore, the vehicle is subjected to the restoration moment M(−). The restoration moment M(−) serves to remove the tendency of the vehicle to OS, thereby preventing spinning of the vehicle attributable to a tack-in.

In particular, in this case, the return control start timing on the restoration moment M(−) occurrence side is earlier than the timing on the turning moment M(+) occurrence side as described above (see FIGS. 16 and 17), so that spinning of the vehicle can be prevented surely.

Counterclockwise Turn

When the yaw moment control is executed for a counterclockwise turn with the turn flag Fd=0 and control beginning/ending flag Fymc=1, the turning moment M(+) is generated in the case where the vehicle has a marked tendency to US, as in the case of the clockwise turn. If the vehicle has a marked tendency to OS, on the other hand, the brake pressures for the front-right and rear-left wheels $FW_R$ and $RW_L$ are controlled in order to generate the restoration moment M(−). Thus, the same effect for the case of the clockwise turn can be obtained (see Table 1 and Steps S607 to S611 of FIG. 19 and actuation routine of FIG. 38).

In effecting the yaw moment control, according to the embodiment described herein, the required yaw moment γd is computed in accordance with the information from the yaw rate sensor 30, and yaw rate feedback control is carried out on the basis of the computed moment. Alternatively, however, open control may be effected in accordance with the lateral acceleration Gy or the combination of the vehicle velocity V and the steering-wheel angle δ.

I claim:

1. A turn control apparatus for a vehicle, which selectively carries out yaw acceleration control where a braking force difference to generate a turning moment on the vehicle is produced between target wheels to be controlled and yaw inhibition control where a braking force difference to generate a restoration moment on the vehicle is produced between the target wheels to be controlled, comprising:

yaw rate detection means for detecting an actual yaw rate for the vehicle;

target yaw rate computing means for computing a target yaw rate for the vehicle in accordance with an operating condition of the vehicle and driver's manipulations on the vehicle;

required control variable derivation means for deriving a required controlled variable associated with the yaw inhibition control and the yaw acceleration control in accordance with the actual yaw rate detected by said yaw rate detection means and the target yaw rate computed by said target yaw rate computing means; and timing means for setting start timing of the yaw inhibition control and start timing of the yaw acceleration control, wherein the start timing of the yaw inhibition control is set so as to be earlier than the start timing of the yaw acceleration control.

2. A turn control apparatus for a vehicle according to claim 1, wherein said timing means sets a discrimination value associated with the start timing of the yaw inhibition control at a first predetermined value, and sets a discrimination value associated with the start timing of the yaw acceleration control at a second predetermined value which is larger than the first predetermined value, and wherein said turn control apparatus further comprises brake force difference producing means for producing a brake force difference between the target wheels to be controlled in accordance with the required control value under control of the control unit.

3. A turn control apparatus for a vehicle according to claim 1, wherein said required control variable derivation means derives the required control variable in accordance with a yaw rate deviation between the actual yaw rate and the target yaw rate or a time derivative of the yaw rate deviation.

4. A turn control apparatus for a vehicle according to claim 2 or 3, wherein said turn control apparatus selects only an outside front wheel and inside rear wheel in a turn as the target wheels to be controlled when the vehicle is braked while turning, and wherein said brake force difference producing means increases the braking force of one of these wheels and decreases the braking force of the other wheel.

5. A turn control apparatus, which selectively increases a turning moment of a vehicle in a yaw acceleration control, and decreases the turning moment of the vehicle in a yaw inhibition control, the apparatus comprising:

first detecting means for detecting a first parameter associated with the vehicle;

second detecting means for detecting a second parameter associated with the vehicle;

target yaw rate calculating means for calculating a target yaw rate based on said first parameter and said second parameter;

calculating means for calculating a required control value associated with the yaw inhibition control and the yaw acceleration control based on said first parameter and said calculated target yaw rate; and start timing setting means for setting a yaw inhibition control start timing when the yaw inhibition control is required and a yaw acceleration control start timing when the yaw acceleration control is required, said start time setting means setting said yaw inhibition control start timing shorter than said yaw acceleration control start timing such that the yaw inhibition control starts within a shorter period of time than the yaw acceleration control.

6. The turn control apparatus of claim 5, wherein said first detecting means detects at least one of a vehicle speed and an actual yaw rate of the vehicle as said first parameter.

7. The turn control apparatus of claim 5, wherein said second detecting means detects at least one of a steering angle and a stroke of a brake pedal as said second parameter.

8. The turn control apparatus of claim 5, wherein said start timing setting means includes, mode determining means for determining whether the vehicle is in an understeer mode or an oversteer mode based on the calculated required control value, first comparing means for comparing the calculated required control value with a first threshold value when the vehicle is in the understeer mode, and second comparing means for comparing the calculated required control value with a second threshold value when the vehicle is in the oversteer mode, said second threshold value being set at a smaller value than said first threshold value.

* * * * *